US012790857B2

(12) United States Patent
Gulick et al.

(10) Patent No.: US 12,790,857 B2
(45) Date of Patent: Nov. 10, 2026

(54) TABLE TOP SECURITY APPARATUS FOR A PORTABLE ELECTRONIC DEVICE

(71) Applicant: Scorpion Security Products, Inc., Vestal, NY (US)

(72) Inventors: Franklyn W. Gulick, Binghamton, NY (US); Gary R. Page, Chenango Forks, NY (US); Patrick McEwen, Greene, NY (US); Andy Bartoszewski, Syracuse, NY (US); Patrick Dunleavy, Endwell, NY (US); Adam Bixby, Endicott, NY (US)

(73) Assignee: Scorpion Security Products, Inc., Vestal, NY (US)

( * ) Notice: Subject to any disclaimer, the term of this patent is extended or adjusted under 35 U.S.C. 154(b) by 223 days.

(21) Appl. No.: 18/614,263

(22) Filed: Mar. 22, 2024

(65) Prior Publication Data

US 2024/0229516 A1 Jul. 11, 2024

Related U.S. Application Data

(63) Continuation-in-part of application No. 18/097,883, filed on Jan. 17, 2023, now Pat. No. 12,134,919, which is a continuation-in-part of application No. 17/241,678, filed on Apr. 27, 2021, now Pat. No. 11,553,790.

(60) Provisional application No. 63/471,892, filed on Jun. 8, 2023, provisional application No. 63/453,955, filed on Mar. 22, 2023, provisional application No. 63/405,652, filed on Sep. 12, 2022, provisional
(Continued)

(51) Int. Cl.
*E05B 73/00* (2006.01)

(52) U.S. Cl.
CPC ................................ *E05B 73/0082* (2013.01)

(58) Field of Classification Search
None
See application file for complete search history.

(56) References Cited

U.S. PATENT DOCUMENTS 3,991,967 A * 11/1976 Sack .................... A47B 23/043 248/456
5,607,135 A * 3/1997 Yamada ............... A47G 1/1646 248/463
(Continued)

FOREIGN PATENT DOCUMENTS

WO WO-9638070 A1 * 12/1996 ............. A47B 23/00

*Primary Examiner* — Steven M Marsh
(74) *Attorney, Agent, or Firm* — Barclay Damon LLP

(57) ABSTRACT

A security apparatus for securing a portable electronic includes a base assembly and a body pivotally coupled to the base assembly. The body includes a first body portion including two retainers the each have first and second securing members. A first body support configured to slidably couple to the retainers. A second body portion includes first and second body portion elements. The body portion elements are configured to slidably mate with the retainer. When the first securing member is in an unlocked position, a width dimension of the body is enabled to be increased and decreased. When the second securing member is in an unlocked position, a height dimension of the body is enabled to be increased and decreased. When the first and second securing members are in a locked position, the width and height dimensions are inhibited from being increased, respectively.

15 Claims, 78 Drawing Sheets

Related U.S. Application Data application No. 63/341,054, filed on May 12, 2022, provisional application No. 63/048,367, filed on Jul. 6, 2020, provisional application No. 63/015,767, filed on Apr. 27, 2020.

(56) References Cited

U.S. PATENT DOCUMENTS

| | | | | |
|---|---|---|---|---|
| 6,971,622 | B2 * | 12/2005 | Ziegler | H04M 1/12 248/455 |
| 7,762,519 | B2 * | 7/2010 | Kunii | F16M 11/10 248/688 |
| 9,062,821 | B2 * | 6/2015 | Jensen | F16M 11/041 |
| 11,523,684 | B1 * | 12/2022 | Huang | A47B 23/043 |
| 2009/0159769 | A1 * | 6/2009 | Lee | E05B 73/0082 248/316.1 |
| 2019/0038018 | A1 * | 2/2019 | Hill | F16B 2/12 |
| 2019/0326767 | A1 * | 10/2019 | Fan | F16M 11/041 |
| 2020/0107653 | A1 * | 4/2020 | Leyden | F16B 2/12 |
| 2020/0359811 | A1 * | 11/2020 | Hyma | F16B 33/002 |
| 2023/0404256 | A1 * | 12/2023 | Olander | A47B 23/043 |

* cited by examiner

TABLE TOP SECURITY APPARATUS FOR A PORTABLE ELECTRONIC DEVICE

CROSS-REFERENCE TO RELATED APPLICATIONS

This application claims the benefit of and priority to U.S. Provisional Application No. 63/453,955, filed Mar. 22, 2023 and U.S. Provisional Application No. 63/471,892, filed on Jun. 8, 2023, which is a continuation-in-part application of U.S. patent application Ser. No. 18/097,883, filed on Jan. 17, 2023, which claims the benefit of and priority to U.S. Provisional Patent Application No. 63/341,054, filed May 12, 2022 and U.S. Provisional Patent Application No. 63/405,652, filed Sep. 12, 2022, and is a continuation-in-part application of U.S. patent application Ser. No. 17/241,678, filed Apr. 27, 2021, which claims priority to and the benefit of U.S. Patent Application No. 63/015,767, filed Apr. 27, 2020, and U.S. Patent Application No. 63/048,367, filed on Jul. 6, 2020. The entire contents of these applications are hereby incorporated by reference.

TECHNOLOGICAL FIELD

This disclosure and the claimed device relates to a table top security apparatus (security apparatus) for a portable electronic device that does not require the security device to be fastened to a display surface, such as table top, and further enables a customer to pick up the portable electronic device while it is secured by the security apparatus, but inhibits the customer from removing the secured portable electronic device from the retail area. Specifically, the security apparatus does not require direct securing to the display surface or table top and therefore, inhibits damage to the surface of the display fixture. Moreover, the security apparatus is tailored to secure laptop computers as well as tablet devices with detachable keyboards.

BACKGROUND

Retailers sell a wide range of portable or hand held electronic devices that can assist in or perform a multitude of tasks for the a user or customer. Portable electronic devices such as laptop computers and tablet computers or tablets have become more and more popular. Tablets have specifically become more popular due to the introduction of detachable keyboards because they enable the tablet to be used like a laptop computer when the keyboard is attached, but also allow detachment of the keyboard for use a tablet. The detachable keyboard can couple to the tablet in a variety of manners, including a magnetic connection. Another part of the attraction of the detachable keyboard is that it can be articulated in a variety of positions with respect to the tablet in order to suit the needs and comfort of the user. Part of the purchasing experience is having the ability to examine and test the tablet along with the detachable keyboard. This is done using floor models that are fitted with some form of security apparatus to prevent theft of the portable electronic device.

The current security apparatuses used to secure tablet computers with detachable keyboards and laptop computers in the retail setting are either overly complicated and cumbersome, and/or they sacrifice security for functional display, and/or they damage the display fixture. Cumbersome and overly complicated security apparatuses tend to be very good at preventing theft of portable electronic devices, but limit the customer interaction with such devices. These security apparatuses are also expensive to manufacture and purchase. Conversely, simpler and less complex security apparatuses can allow for improved customer interaction with the portable electronic device, however are less effective at preventing theft of these devices.

These are just some of the problems associated with current security apparatuses for portable electronic devices.

SUMMARY

An embodiment of a security apparatus comprises a display support and a keyboard retainer. The display support comprises a first retaining portion including a first holder, a second retaining portion pivotally coupled to the first retaining portion and includes a second holder, and a lock assembly defining a locked state and an unlocked state. They keyboard retainer comprises a first base pivotally coupled to the first retaining portion and including a top surface extending along a top surface plane, and an opposing bottom surface. The first base comprises one or more securing members extending from the bottom surface of the first base and one or more retainers extending above the top surface plane of the first and each retainer comprises a retaining member extending away from the first base. A second base pivotally couples to the second retaining portion and includes a top surface extending along a top surface plane, and an opposing bottom surface. One or more securing members extend from the bottom surface of the second base and one or more retainers extending above the top surface plane of the second base and each retainer comprises a retaining member extending away from the second base. When the lock assembly is in the unlocked state, the first holder and the second holder are enabled to pivot relative to each other. When the lock assembly is in the locked state, the first holder and the second holder are inhibited from pivoting relative to each other.

In an embodiment, the first holder further comprises a first brace extending from the first support, wherein the first brace and first support extend along a same plane. In an embodiment, the second holder further comprises a second brace extending from the second support, wherein the second brace and second support extend along a same plane. In a further embodiment, the first holder further comprises at least one side extending along a side axis, the at least partially defines a pocket, the second holder further comprises at least one side that at least partially defines a pocket, and at least one of the sides defines an opening. In another embodiment, the one or more securing members comprise a threaded surface. In an embodiment, the first holder and the second holder each comprise an end portion, wherein the end portion extends along an axis that intersects the side axis.

In another embodiment, a security apparatus for a portable electronic device comprises a support assembly and a keyboard retainer. The support assembly comprises a first retaining portion, a second retaining portion pivotally coupled to the first retaining portion, and a lock assembly defining a locked state and an unlocked state. When in the unlocked state, the first retaining portion and the second retaining portion are enabled to pivot relative to each other, and when in the locked state, the first retaining portion and the second retaining portion are inhibited from pivoting relative to each other. The keyboard retainer comprises a first base pivotally coupled to the first retaining portion and included a top surface extending along a top surface plane, and an opposing bottom surface. The first base comprises one or more securing members extending from the bottom surface of the first base, and one or more retainers extending above the top surface plane of the first and each retainer comprising a retaining member extending away from the first base. A second base is pivotally coupled to the second retaining portion and includes a top surface extending along a top surface plane, and an opposing bottom surface. The second base comprises one or more securing members extending from the bottom surface of the second base, and one or more retainers extending above the top surface plane of the second base and each retainer comprising a retaining member extending away from the second base.

In an embodiment, the first retaining portion defines a pocket configured to retain a portion of a portable electronic device. In an embodiment, the second retaining portion defines a pocket configured to retain a portion of a portable electronic device. In an embodiment, the one or more securing members comprise a threaded surface.

An embodiment of a security system for a portable electronic device comprises a mounting plate defining one or more openings and a security apparatus. The security apparatus comprises a first retaining portion, a second retaining portion pivotally coupled to the first retaining portion, and a lock assembly defining a locked state and an unlocked state. When in the unlocked state, the first retaining portion and the second retaining portion are enabled to pivot relative to each other, and when in the locked state, the first retaining portion and the second retaining portion are inhibited from pivoting relative to each other. The security apparatus further includes a keyboard retainer comprising at least one base member pivotally coupled to the first retaining portion and the second retaining portion. The at least one base member includes a top surface extending along a plane and an opposing bottom surface. The at least one base member comprises one or more securing members extending from the bottom surface and configured to couple to the mounting plate, and one or more retainers extending above the top surface plane and each retainer comprising a retaining member extending away from the at least one base member. The mounting plate is configured to support the portable electronic device and the security apparatus.

In an embodiment, the mounting plate further comprises one or more anchors configured to couple the mounting plate to a display fixture. In an embodiment, the first retaining portion defines a pocket configured to retain a portion of a portable electronic device. In an embodiment, the second retaining portion defines a pocket configured to retain a portion of a portable electronic device. In an embodiment, the one or more securing members comprise a threaded surface.

Another embodiment of a security apparatus for securing a portable electronic device for retail display includes a base assembly extending along a base assembly axis and configured to couple to a display fixture. The base assembly includes a first base assembly portion and a second base assembly portion moveably coupled to the first base assembly portion and moveable along the base assembly axis. A body extends along a body axis and is structured to couple to one of the first and second base assembly portions. The security apparatus further includes a first securing member coupled to the body and a second securing member coupled to the body, where at least one of the first and second securing members is structured to move along the body axis relative to the body. The first and second securing members each include a body engagement portion including a lock member and a device engagement portion structured to at least partially surround a portion of the portable electronic device. The base assembly axis intersects the body axis and the second portion of the base assembly is structured to move along the base assembly axis to move the body along the base assembly axis.

In another embodiment, the security apparatus includes a base assembly extending along a base assembly axis and structured to couple to a display fixture. The base assembly includes a base portion that is structured to move along the base assembly axis. The security apparatus further includes a body extending along a body axis and structured to couple to the base portion. A first securing member is coupled to the body and a second securing member is coupled to the body. At least one of the first and second securing members is structured to move along the body axis relative to the body. The first and second securing members each include a device engagement portion that at least partially surrounds a portion of the portable electronic device. The base portion is structured to move along the base assembly axis to move the body along the base assembly axis.

In an embodiment, the base assembly axis intersects the body axis. In an embodiment, the body is moveably coupled to the base portion and wherein the first and second securing members are structured to pivot about the body axis. In an embodiment, the device engagement portion includes two retainers structured to engage the portable electronic device. In an embodiment, the two retainers are structured to move in a first direction towards each other and in a second direction away from each other. In an embodiment, the device engagement portion further includes at least one engagement portion lock structured to inhibit movement of the retainers relative to each other. In a further embodiment, the base assembly further includes an anchor portion pivotally coupled to the base portion and structured to contact the display fixture.

An embodiment of a method of manufacturing a security apparatus for securing a portable electronic device includes structuring a base assembly to: (i) extend along a base assembly axis; (ii) couple to a display fixture; and (iii) comprise a base portion configured to move along the base assembly axis. A body is structured to extend along a body axis and to couple to the base portion. A first securing member is structured to couple to the body and a second securing member is structured to couple to the body. At least one of the first and second securing members is structured to move along the body axis relative to the body. The first and second securing members are structured to each comprise a device engagement portion to at least partially surround a portion of the portable electronic device. The base portion is further structured to move the body along the base assembly axis.

Another embodiment of a security apparatus for securing a portable electronic device for retail display includes a base assembly and a body. The base assembly includes a first end configured to couple to a display fixture, and a second end. The body is configured to pivotally couple to the second end of the base assembly. The body includes a first body portion including two retainers. Each retainer comprises a first retainer portion and a second retainer portion. The first retainer portion comprises a first securing member pivotally coupled to the retainer and the second retainer portion comprises a second securing member pivotally coupled to the retainer. A first body support is configured to slidably couple to the first retainer portions of the first and second retainers. The body further includes a second body portion with first and second body portion elements that each include a mating portion and a retaining portion. The mating portion is configured to slidably mate with the second retainer portion. When the first securing member is pivoted to an unlocked position, the two retainers are enabled to move away from each other and towards each other in order to adjust a width dimension of the body. When the second securing member is pivoted to an unlocked position, the retainer of the first body portion and the retaining portion of the second body portion are enabled to move away from each other and towards each other in order to adjust a height dimension of the body. When the first securing member is pivoted to a locked position, the first body support is inhibited from being removed from the first retainer portion and the two retainers are inhibited from being moved away from each other. When the second securing member is pivoted to a locked position, the mating portion of the second body portion is inhibited from being removed from the second retainer portion and the retainer of the first body portion and the retaining portion of the second body portion are inhibited from being moved away from each other.

Another embodiment of a security apparatus for securing a portable electronic device for retail display includes a base assembly configured to couple to a display fixture and a body configured to pivotally couple to the base assembly. The body includes a first body portion including two retainers that each include a first securing member pivotally coupled to the retainer and a second securing member pivotally coupled to the retainer. A first body support is configured to slidably couple to at least one of the two retainers. The body further includes a second body portion including first and second body portion elements that each comprise a mating portion and a retaining portion. Each mating portion is configured to slidably mate with one of the two retainers. When the first securing member is pivoted to an unlocked position, a width dimension of the body is enabled to be increased and decreased and when the second securing member is pivoted to an unlocked position, a height dimension of the body is enabled to be increased and decreased. When the first securing member is pivoted to a locked position, the width dimension of the body is inhibited from being increased, and when the second securing member is pivoted to a locked position, the height dimension of the body is inhibited from being increased.

BRIEF DESCRIPTION OF DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which.

DETAILED DESCRIPTION

The following discussion relates to various embodiments of a tablet security apparatus. It will be understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as “upper”, “lower”, “forward”, “rearward”, “interior”, “exterior”, “front”, “back”, “top”, “bottom”, “inner”, “outer”, “first”, “second”, and the like are not intended to limit these concepts, except where so specifically indicated. The terms “about” or “approximately” as used herein may refer to a range of 80%-125% of the claimed or disclosed value. With regard to the drawings, their purpose is to depict salient features of the tablet security apparatus and are not specifically provided to scale.

Figure 1:
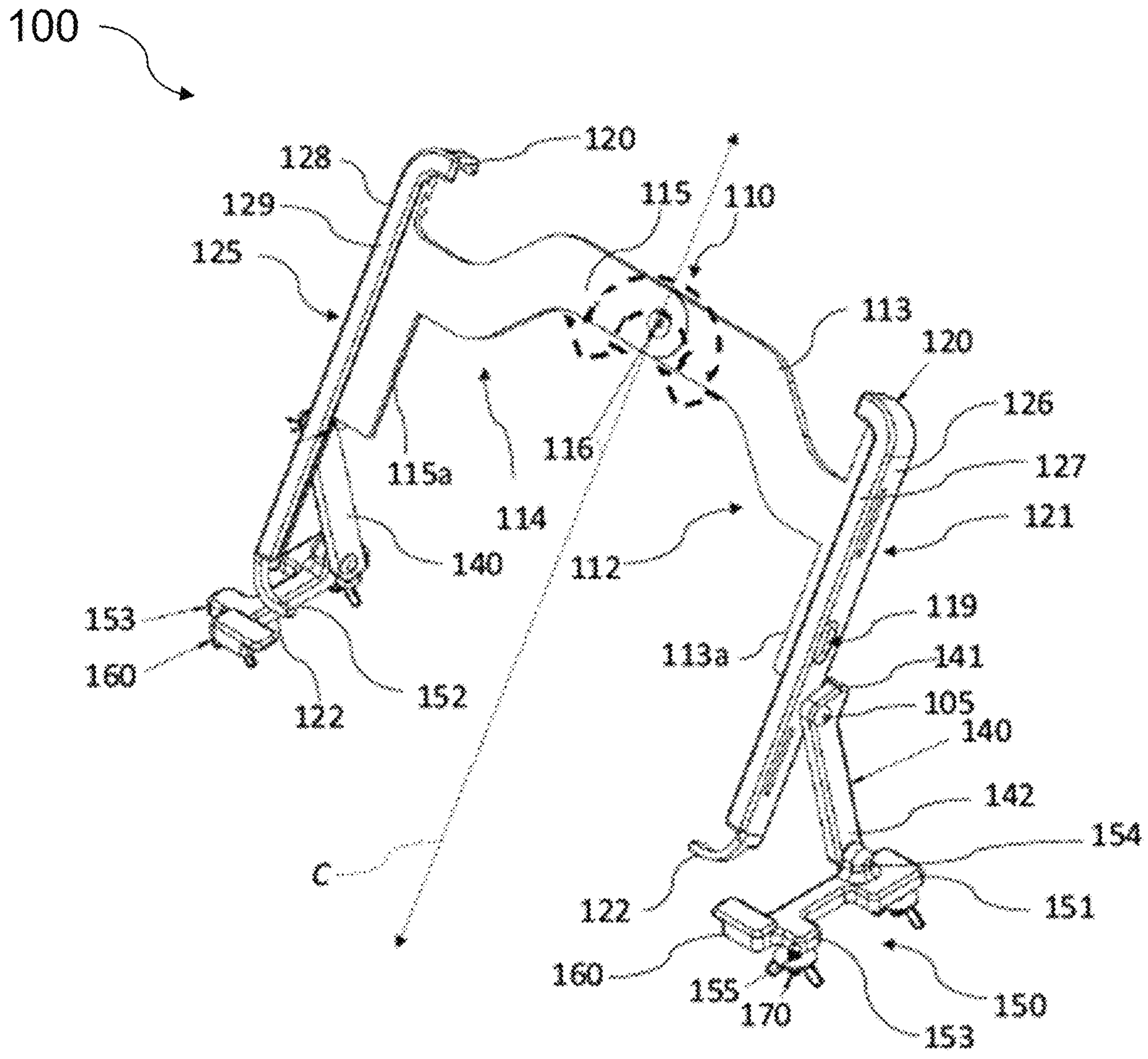
FIG. 1 illustrates a perspective front view of an embodiment of a security apparatus for a portable electronic device.
Figure 2:
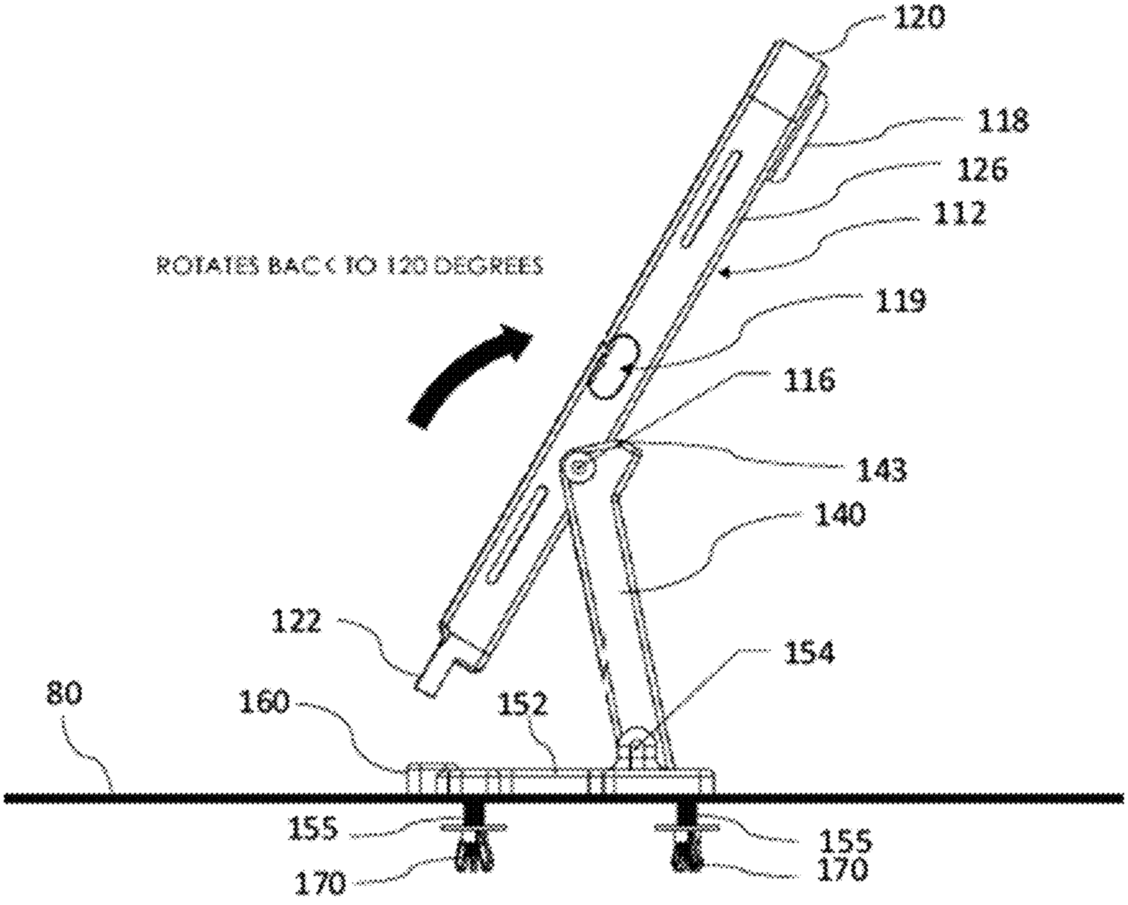
FIG. 2 a left side elevation view of the embodiment of the tablet security apparatus of FIG. 1.

FIGS. 1 and 2 illustrate an embodiment of the tablet security assembly comprising a tablet security apparatus ("security apparatus") 100 without a tablet 50 or detachable keyboard or keyboard accessory 60 installed. FIGS. 3-13 show the security apparatus 100 in various positions while the tablet 50 and the detachable keyboard accessory 60 are installed.

As shown in FIGS. 1 and 2, the security apparatus 100 generally comprises a tablet or display support 110 that is pivotally coupled to a base 150 by one or more support extensions 140. The tablet support 110 includes a first retaining portion 112 and a second retaining portion 114. The first retaining portion 112 comprises a first support 113 and a first brace 113*a*. The first brace 113*a* extends from the first support 113 and acts to provide structural rigidity as well as surface for the tablet 50 to rest on when it is installed in the security apparatus 100. The first support 113 and the first brace 113*a* extend along the same plane. The second retaining portion 114 includes a second support 115 and a second brace 115*a*. The second brace 115*a* extends from the second support 115 and provides structural rigidity as well as surface for the tablet 50 to rest on when it is installed in the security apparatus 100. The second support 115 and the second brace 115*a* extend along the same plane.

The first retaining portion 112 and the second retaining portion 114 are configured to be pivotally coupled together at a pivot point 30. The coupling may be done using a fastening means that enables the first retaining portion 112 and the second retaining portion 114 to pivot relative to each other. The first retaining portion 112 and the second retaining portion 114 exist in an unlocked state and a locked state. In the unlocked state, the first and second retaining portions 112, 114 are enabled to pivot relative to each other. In a locked state, the first and second retaining portions 112, 114 are inhibited from pivoting relative to each other. The pivoting motion acts to move one set of opposing ends of the first and second retaining portions towards each other, while at the same time moving the second set of opposing ends of the first and second retaining portions 112, 114 away from each other, similar to a clam shell opening. The fastening means may comprise a lock that is moved between the locked and unlocked state using a key. In an embodiment, the key is magnetic and locks and/or unlocks the lock via a magnetic field. In another embodiment, the lock comprises a biometric sensor that senses a biometric input, such as a finger print, or retinal scan, and locks and/or unlocks the lock when the biometric input matches a stored biometric input. In still another embodiment, the lock may be controlled using a Bluetooth® key or signals over a Bluetooth® connection or using radio-frequency identification technology.

The first retaining portion 112 further includes a first holder 121 having a side 126 extending from the first brace 113*a* or the first support 113 along a plane that intersects the plane of the first brace 113*a*. A lip 127 extends from the side 126 along a plane above the plane of the first brace 113*a* to create a pocket. The ends 120, 122 of the first holder 121 may be curved, bent, or otherwise pointed towards the center line C. The second retaining portion 114 further includes a second holder 125 having a side 128 extending from the second brace 115*a* along a plane that intersects the plane of the second brace 115*a*. A lip 129 extends from the side 128 along a plane above the plane of the second holder 125 or second brace 115*a* to create a pocket. The ends 120, 122 of the second holder 125 are similar to those of the first holder 121 and may be curved, bent, or otherwise pointed towards the center line C. The first and/or second holders 121, 125 may define one or more openings 119 that allow access to buttons and/or ports of the tablet while the tablet is installed in the security apparatus 100. One or more components of the first retaining portion 112 and the second retaining portion 114 may be formed as a single unitary component.

Still referring to FIGS. 1 and 2, the base 150 comprises a base body 152 having a first end 151 and an second end 153. The embodiments of the security apparatus 100 that are depicted in the figures comprise two identical bases 150 coupled to the tablet support 110 via two support extensions 140 such that it will only be necessary to describe one base 150 and one support extension 140. Of course, other embodiments may comprise bases 150 and/or support extensions 140 that differ from each other in one or more aspects. In still other embodiments, one or more support extensions 140 couple the tablet support 110 to a single base. A support extension mount 154 is positioned proximate the first end 151 of the base body 152 and a keyboard retainer 160 is positioned proximate the second end 153 of the base body 152. One or more securing members 155 extend from the bottom surface of the base body 152. The one or more securing members 155 may define surface features, such as threads, and are configured to traverse a display fixture or display surface 80 or display fixture. A securing member coupler 170 is configured to couple to and secure the base body 152 to the display surface 80. The securing member coupler 170 may be a wingnut, other nut, or any other means to couple to the securing members 155 and secure the base body 152 to the display surface 80. The securing member couplers 170 secure to the underside of the display surface 80 and cannot be accessed by an unauthorized person since access to the underside of the display surface is inhibited by one or more locked doors or a wall.

A support extension 140 pivotally couples the display support or tablet support 110 to the base 150. A first end 141 of the support extension 140 is pivotally coupled the first holder 121 at a pivot point 105. A fastener may be positioned at the pivot point 105 to couple the support extension 140 to the first holder 121 in a manner that enables the first holder 121 to pivot relative to the support extension 140. The second end 142 of the support extension 140 pivotally couples to the support extension mount 154 of the base body 152. When the base body 152 is secured to the display surface 80, the support extension 140 is configured to pivot relative to the base body 152.

Figure 3:
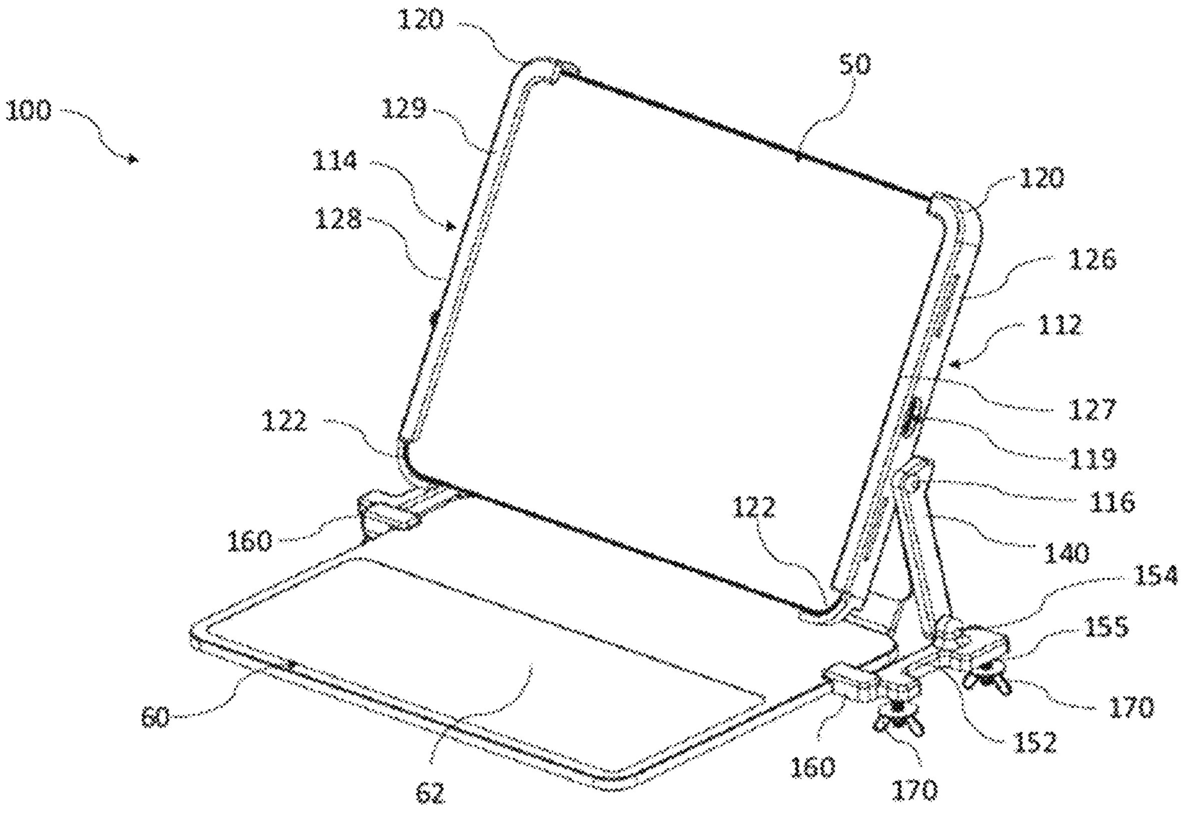
FIG. 3 illustrates a front perspective view of an embodiment of the tablet security apparatus securing a tablet and detachable keyboard in an open position.
Figure 4:
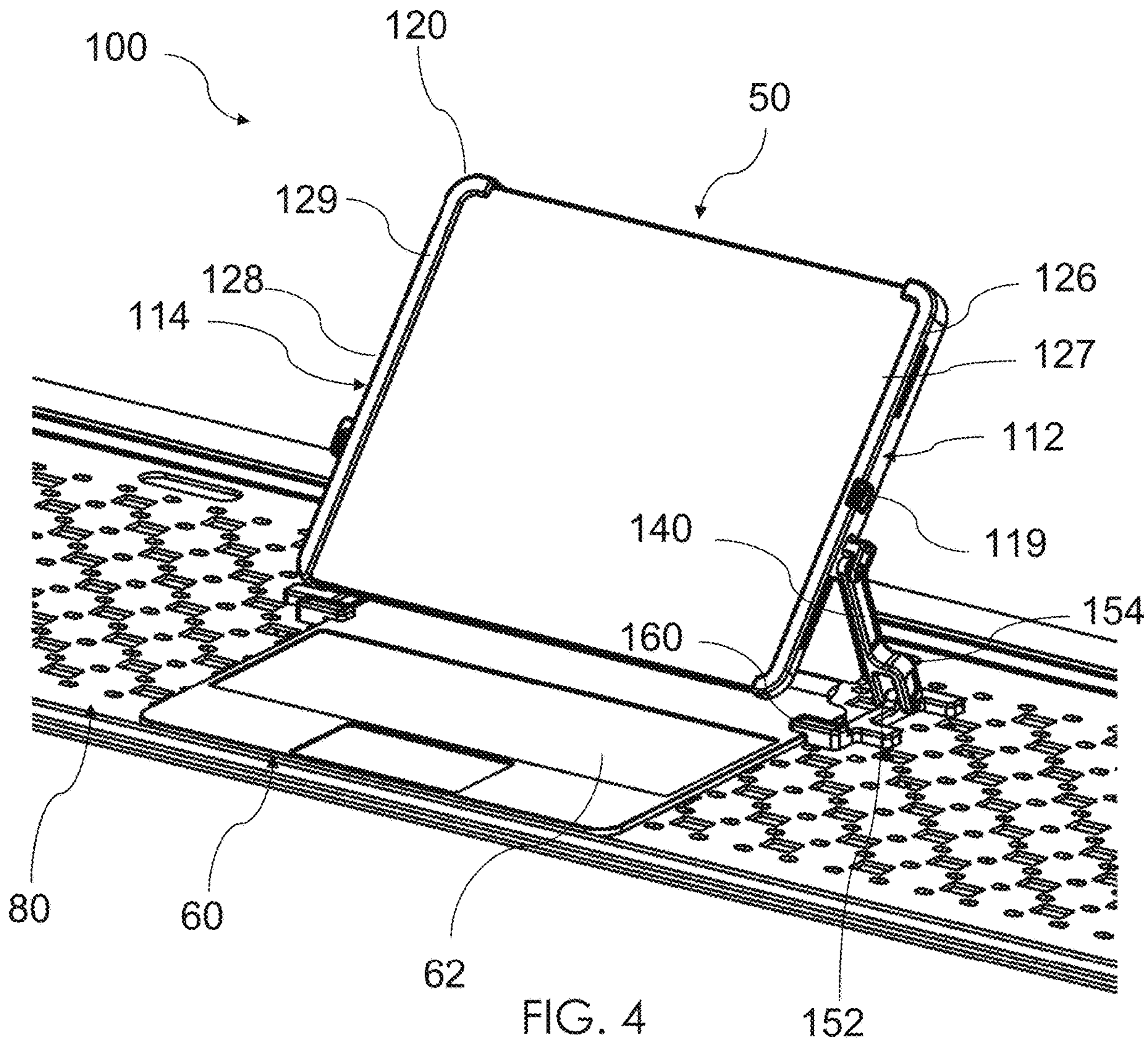
FIG. 4 illustrates a front perspective view of an embodiment of the tablet security apparatus securing a tablet and detachable keyboard in the open position.
Figure 5:
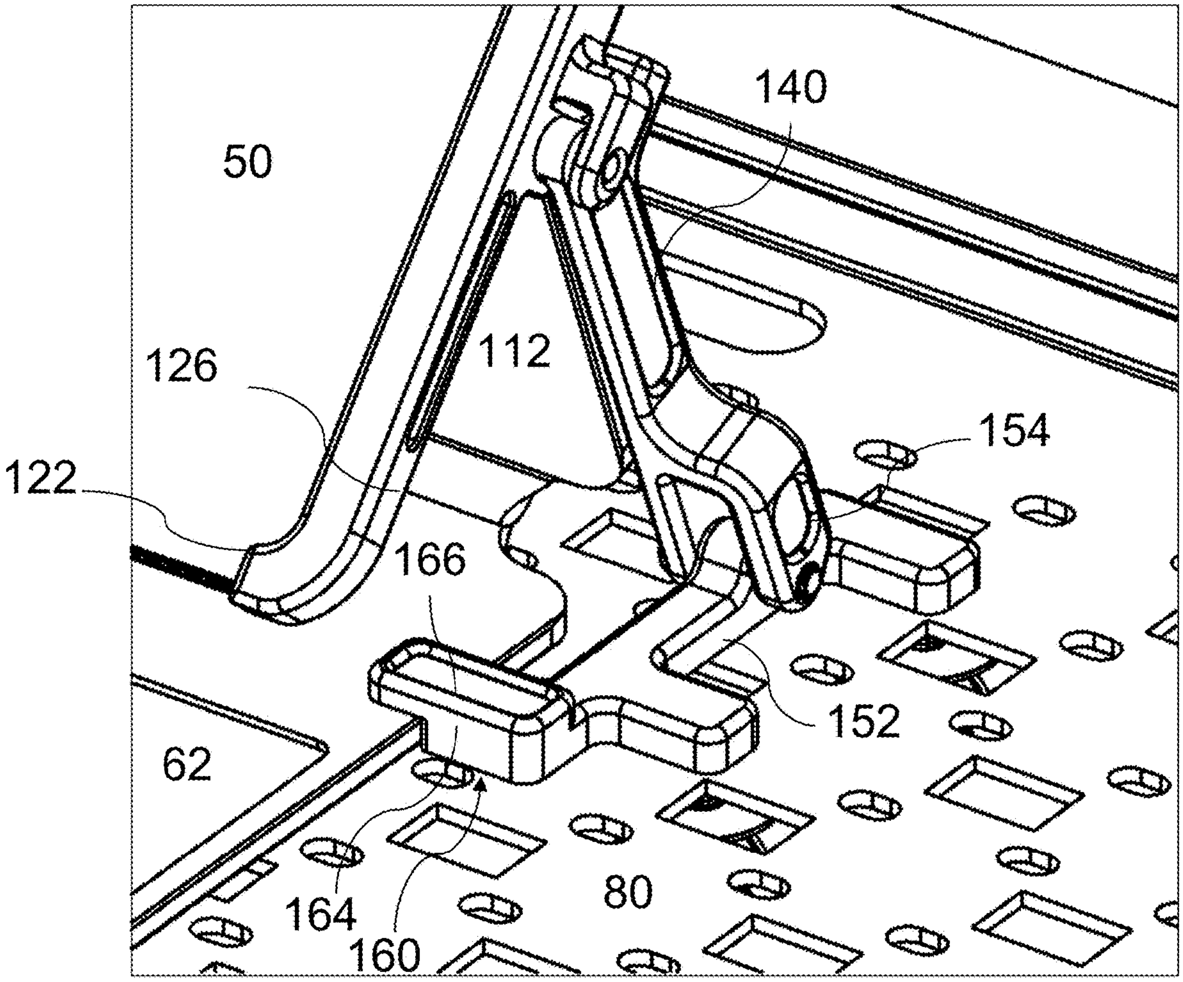
FIG. 5 illustrates a close-up front perspective view of an embodiment of the tablet security apparatus securing a tablet and detachable keyboard in the open position.
Figure 6:
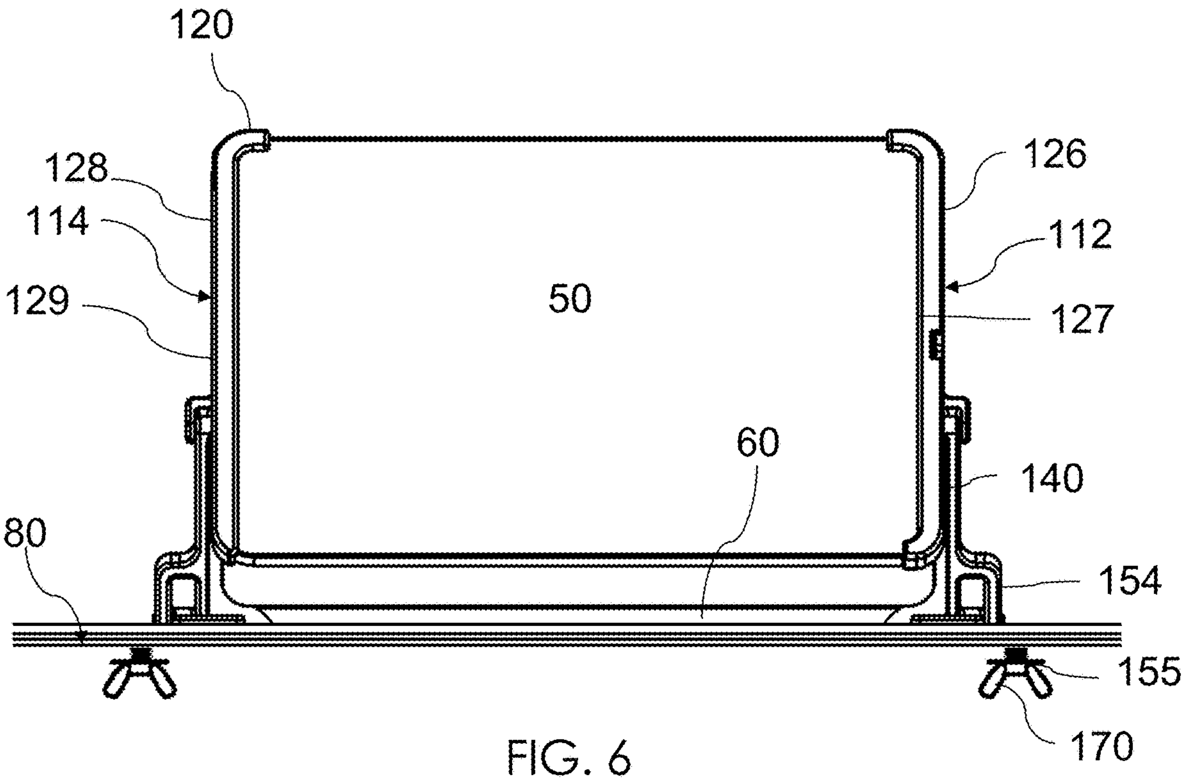
FIG. 6 illustrates a front plan view of an embodiment of the tablet security apparatus securing a tablet and detachable keyboard in the open position.

Turning now to FIGS. 3-13, installation and removal of the tablet 50 and detachable keyboard 60 will not be described along with the functional display capabilities of the security apparatus. In order to install the tablet 50 coupled to the detachable keyboard accessory 60 into the security apparatus 100, the security apparatus 100 is detached from the display surface 80. The lock 116 is then moved to the unlocked state and the curved ends 122 (or 120) of the first and second holders 121, 125 are pivoted away from each other. The tablet 50 with a detachable keyboard accessory 60 is inserted into the tablet support 110 such that the lips 127, 129 and the pocket retain the sides and the tablet 50, and/or at least a portion of the detachable keyboard accessory 60 rests on the first and second braces 113*a*, 115*a*. As the tablet 50 with the detachable keyboard accessory 60 in inserted, the curved ends 122 (or 120) of the first and second holders 121, 125 are brought towards each other such that the tablet 50 and a portion of the detachable keyboard accessory 60 "snaps" into tablet support 110. The lock 116 is then moved to the locked state such that the first retaining portion 112 and the second retaining portion 114 cannot move relative to each other. The tablet 50 and detachable keyboard accessory 60 are now installed into and secured in the security apparatus 100. The security apparatus 100 is then secured to the display surface 80 as was described above thereby securing the tablet 50 and detachable keyboard accessory 60 to the display surface 80. The keyboard 62 of the detachable keyboard accessory 60 is capable of resting on the display surface 80 while it is secured in the security apparatus 100. Referring specifically to FIGS. 3-5, security apparatus 100 is in an open position such that the keyboard 62 of the detachable keyboard accessory 60 and the display of the tablet 50 can be used as a laptop computer. The tablet 50 is positioned at an angle α relative to the keyboard 62. In the fully open position, the angle α is about 120° (FIG. 8) and the tablet 50 appears to float above the keyboard 62.

Figure 10:
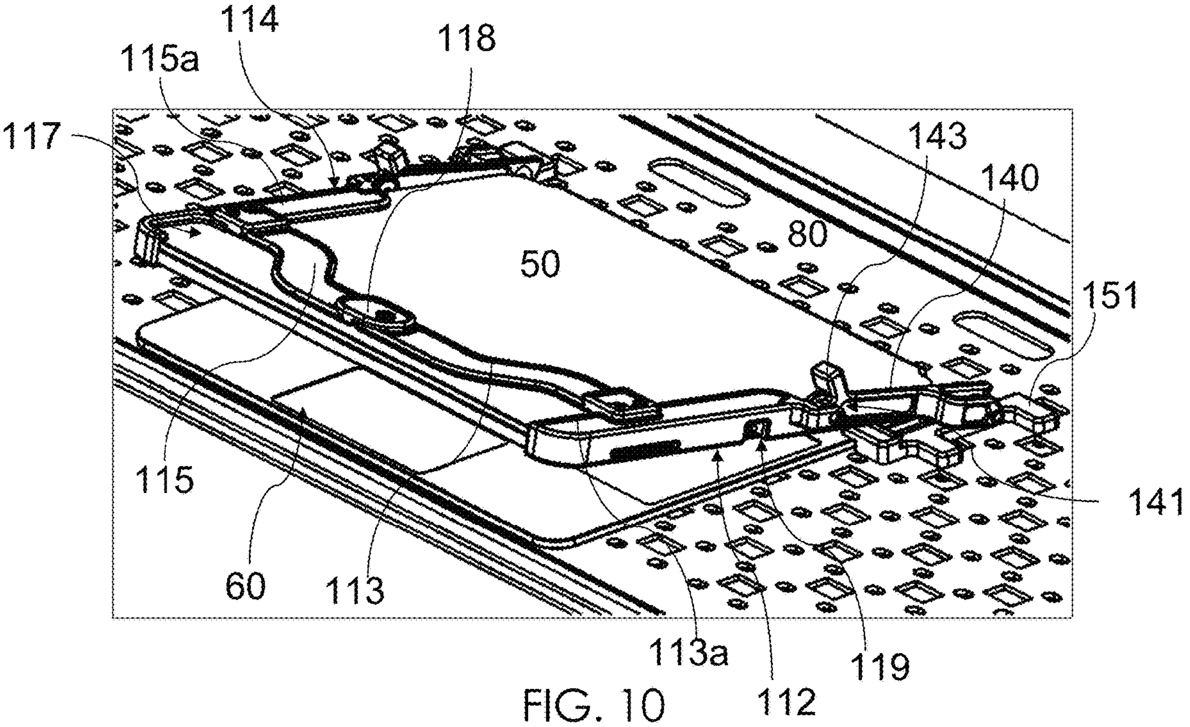
FIG. 10 illustrates a front perspective view of the of the tablet security apparatus securing a tablet and detachable keyboard in a closed position.
Figure 11:
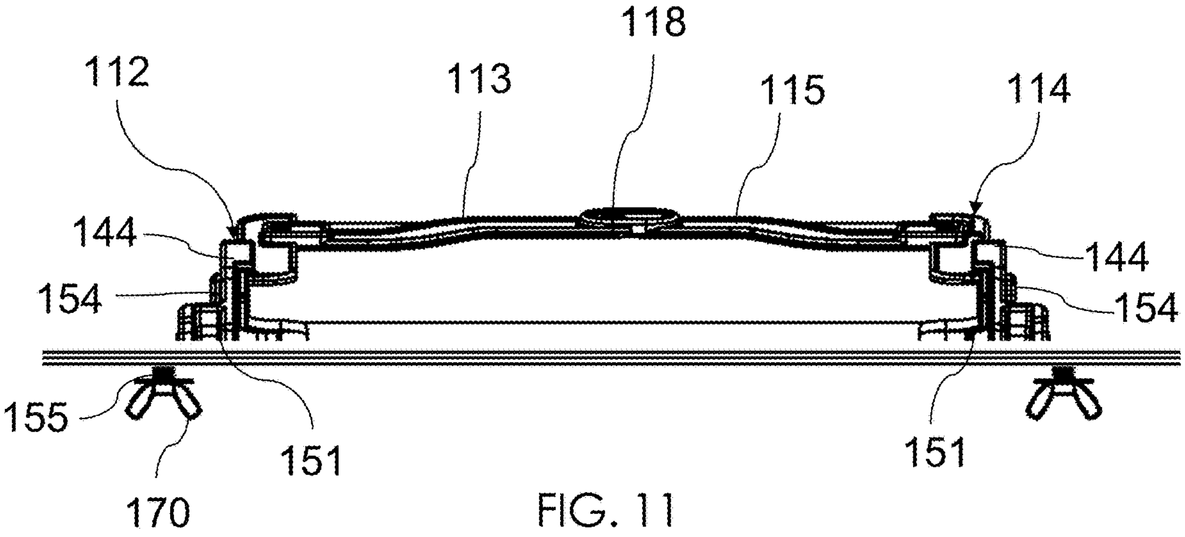
FIG. 11 illustrates a rear perspective view of the tablet security apparatus securing a tablet and detachable keyboard in the closed position.
Figure 12:
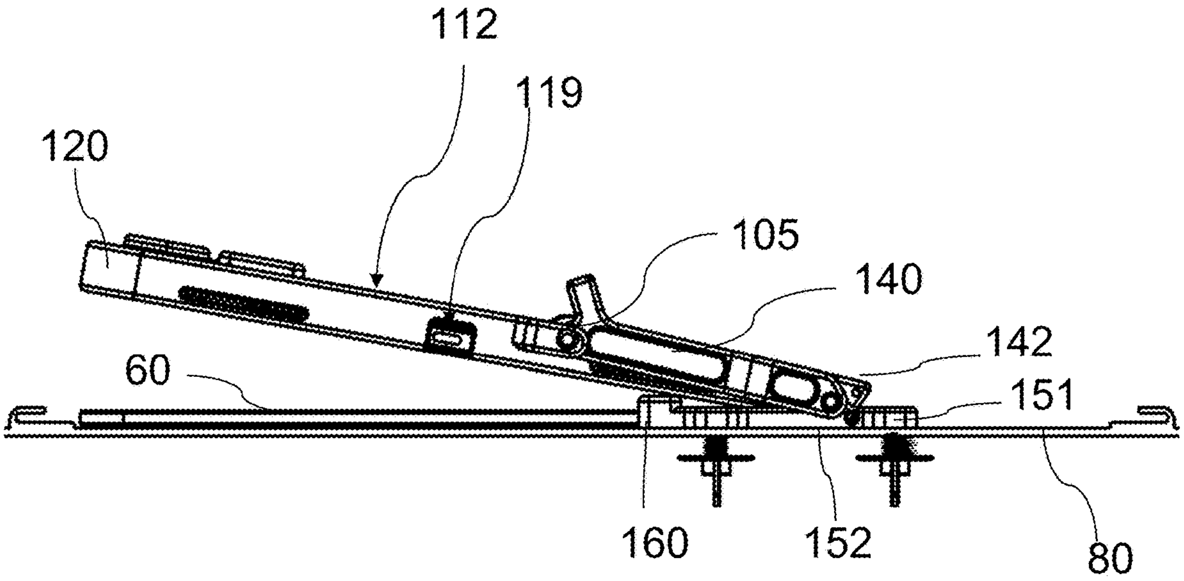
FIG. 12 illustrates a left side elevation view of the tablet security apparatus securing a tablet and detachable keyboard in the closed position.
Figure 13:
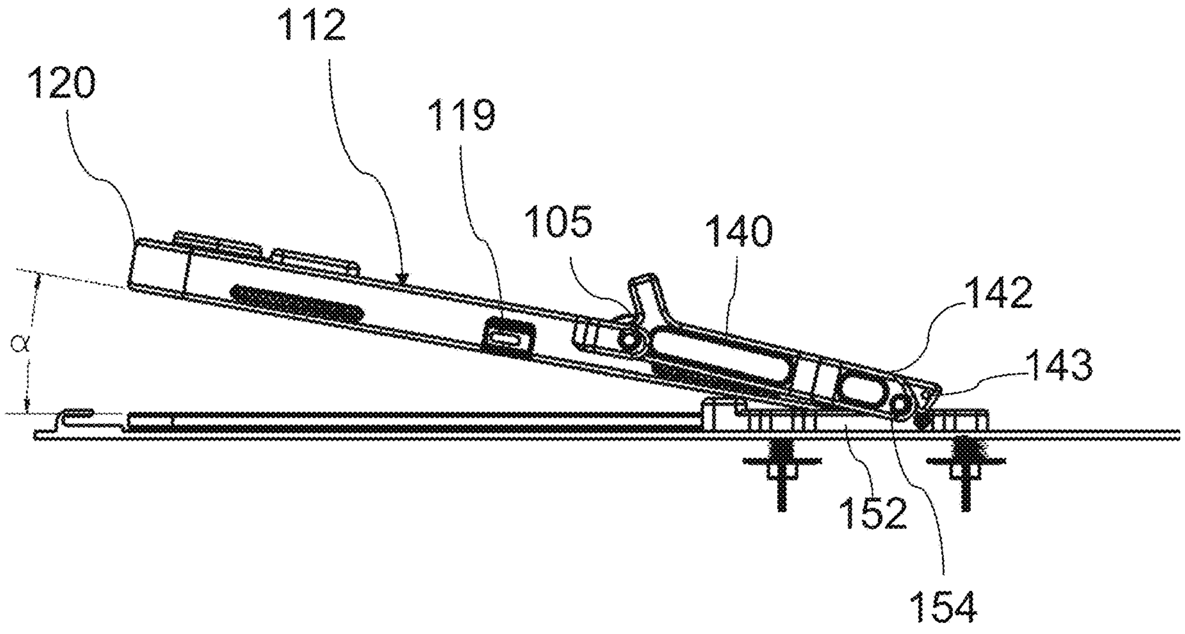
FIG. 13 illustrates another left side elevation view of the tablet security apparatus securing a tablet and detachable keyboard in the closed position.

In the fully open position, the first retaining portion 112 and the second retaining portion 114 contact the stop surface 143 of the support extension 140 (FIG. 10). The stop surface 143 is defined at the first end 141 of the support extension 140. In the open position, the bottom surface 144 of the support extension 140 contacts and rests on the top surface of the base body 152 proximate the first end 151 of the base body 152. The support extension 140 is free to pivot about the support extension mount 154 to vary the position of the support extension 140 and the tablet 50 installed into the tablet support 110 relative to the display surface 80 and the keyboard 62. The tablet support 110 is coupled to the first end 141 of the support extension 140 and further configured to pivot relative to the support extension 140. The pivoting is meant to correspond to the movement of the detachable keyboard accessory 60 and its corresponding components relative to the tablet as the customer would experience during personal use.

Once the tablet 50 is installed in the tablet support 110 of the security apparatus 100, a portion of the detachable keyboard accessory 60 is also secured by the tablet support 110 such that the keyboard 62 is securely "tethered" to the tablet 50. In this embodiment, the keyboard 62 is capable of moving relative to the display surface 80, however as specifically shown in the embodiment of FIG. 5, the base body 152 may comprise a keyboard retainer 160 including a mounting block 164 that extends above the plane of the upper surface of the base body 152. A retaining element 166 extends away from the base body 152 and partially over and/or contacting the keyboard 62 to inhibit movement of the keyboard 62 relative to the display surface 80.

Figure 7:
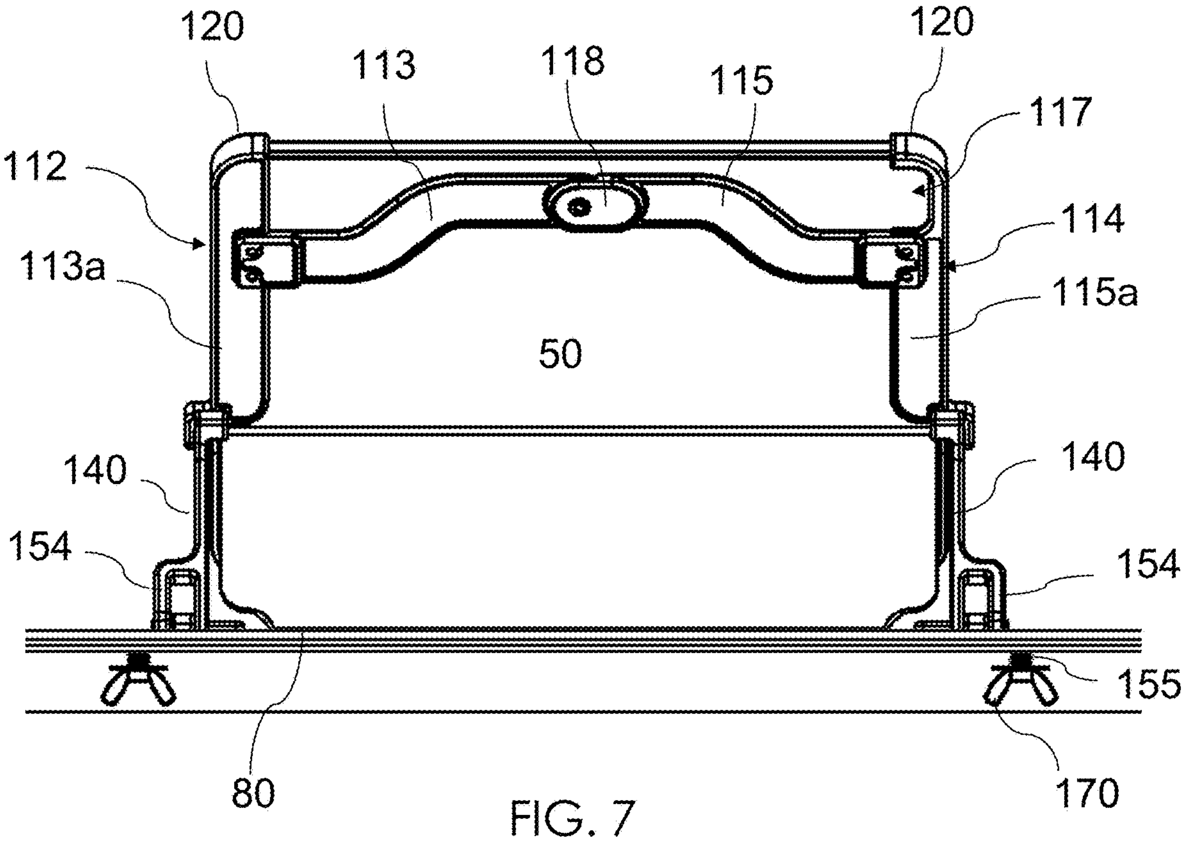
FIG. 7 illustrates a rear perspective view of the tablet security apparatus securing a tablet and detachable keyboard in the open position.
Figure 8:
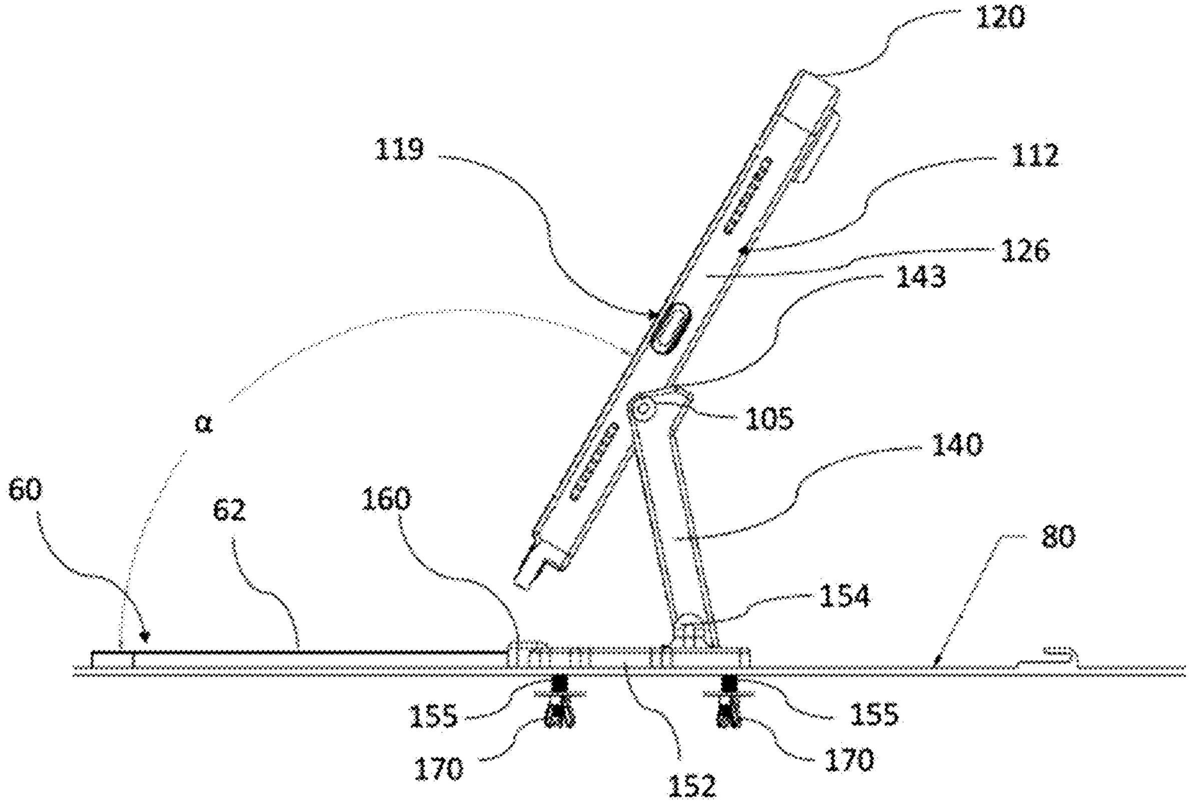
FIG. 8 illustrates a left side elevation view of the tablet security apparatus securing a tablet and detachable keyboard in the open position.
Figure 9:
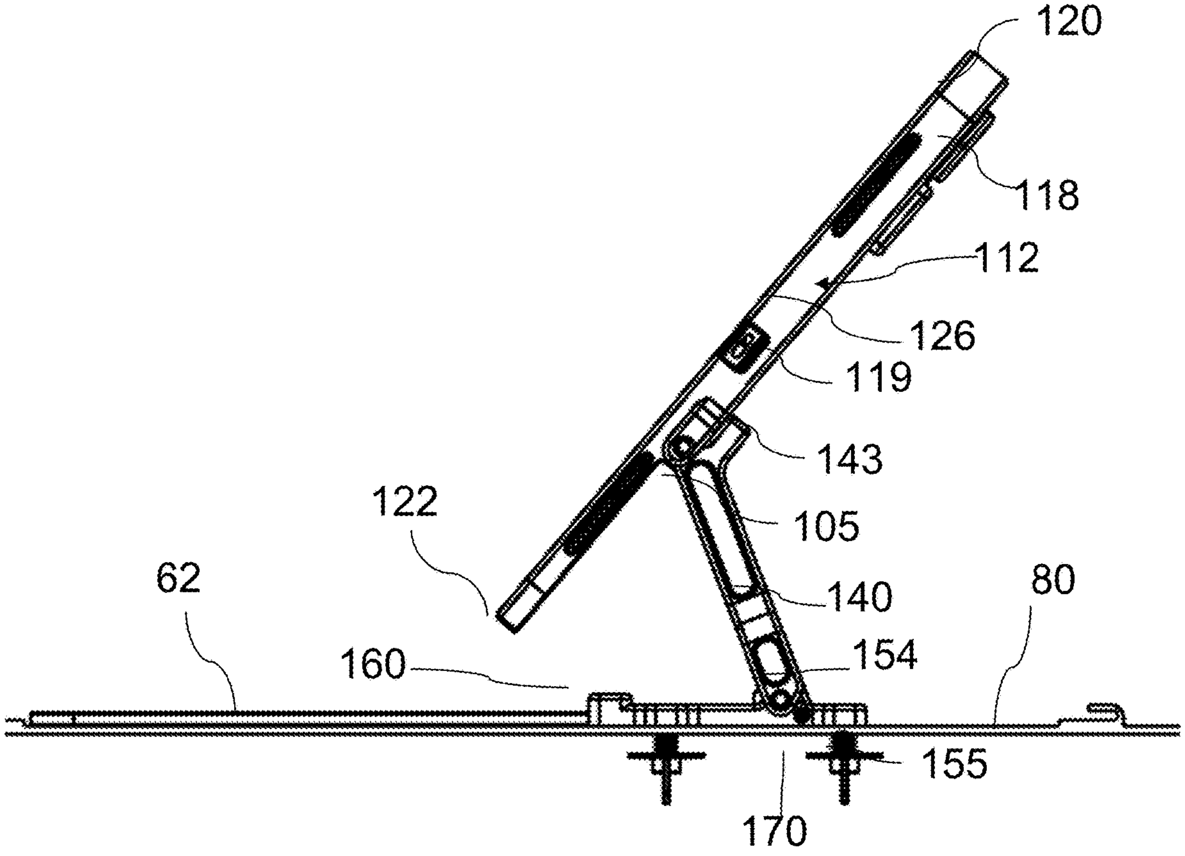
FIG. 9 illustrates another left side elevation view of the tablet security apparatus securing a tablet and detachable keyboard in the open position.

Referring to FIG. 7, the lock 116 may comprise a covering 118 on the back side facing away from the tablet 50 in order to inhibit tampering and theft. The second brace **115*a* defines a cut-out 117** to accommodate the camera and prevent damage to the camera lens or lens cover as well as to allow the customer to test the quality of the tablet's camera while is it securely displayed.

The security apparatus 100 is also capable of displaying the tablet 50 and detachable keyboard accessory 60 in a closed position. Referring specifically to FIGS. 10-13, the tablet support 110 can be pivoted towards the keyboard 62 via the support extension 140 such that the display of the tablet 50 faces the keyboard 62. In the embodiments shown, the security features of the security apparatus 100 such as the first and second lips 127, 129 and the keyboard retainers 160, inhibit the tablet 50 from being brought into contact with the keyboard 62 such that the angle α is 0°. In the completely closed position, the angle is about 8°. In embodiments that do not have keyboard retainers 160, the keyboard 62 of the detachable keyboard accessory 60 is able to be pivoted towards the tablet 50, using the hinge that is part of the detachable keyboard accessory 60, into a closed position such that the angle may be less than 8°.

In order to remove the tablet 50 and detachable keyboard accessory 60 from the security apparatus 100, the security apparatus 100 is detached from the display surface 80 and the lock 116 is moved to the unlocked state. The first and second retaining portions 112, 114 are now able to be moved relative to each other to dislodge the tablet 50 and a portion of the detachable keyboard accessory 60 from the tablet support 110. Detaching the security apparatus 100 from the display surface 80 further acts to free the keyboard 62 from the keyboard retainer(s) 160.

The security apparatus 100 may be configured to accommodate different sizes of tablet 50 and detachable keyboard accessory 60. In an embodiment, the first and second holders 121, 125 may be capable of being extended away from (or closer to) each other to accommodate different sized tablets 50. In addition, the holders 121, 125 may further be capable of being adjusted to move their ends 120, 122 farther apart from (or closer to) each other.

Turning generally to FIGS. 14-22, the security assembly is part of a security system comprising a mounting plate 200 or adapter plate or support plate configured to couple to the security apparatus 100 at one or more coupling portions 232. Each coupling portion 232 may each include an extension or an opening configured to removably couple to the security apparatus 100. In other embodiment, the coupling may be achieved or aided by using one or more mechanical fasteners, or welded joints. In another embodiment, one or more pieces of the mounting plate 200 and the security apparatus 100 may be formed as a single unitary component. The mounting plate 200 may comprise a generally planar frame 210 including a plurality of perimeter supports 212, 214, 216, 218 and a plurality of supplemental supports 211, 213, 215, 217. One or more spaces 206 may be defined between the perimeter supports 212, 214, 216, 218 and/or the supplemental supports 211, 213, 215, 217 that at least partially traverse the mounting plate 200. Of course alternate embodiments of the mounting plate 200 may have fewer or more supports as required. In an embodiment, the mounting plate 200 may not comprised defined supports and instead may be a single solid piece with no defined spaces 206.

Figure 14:
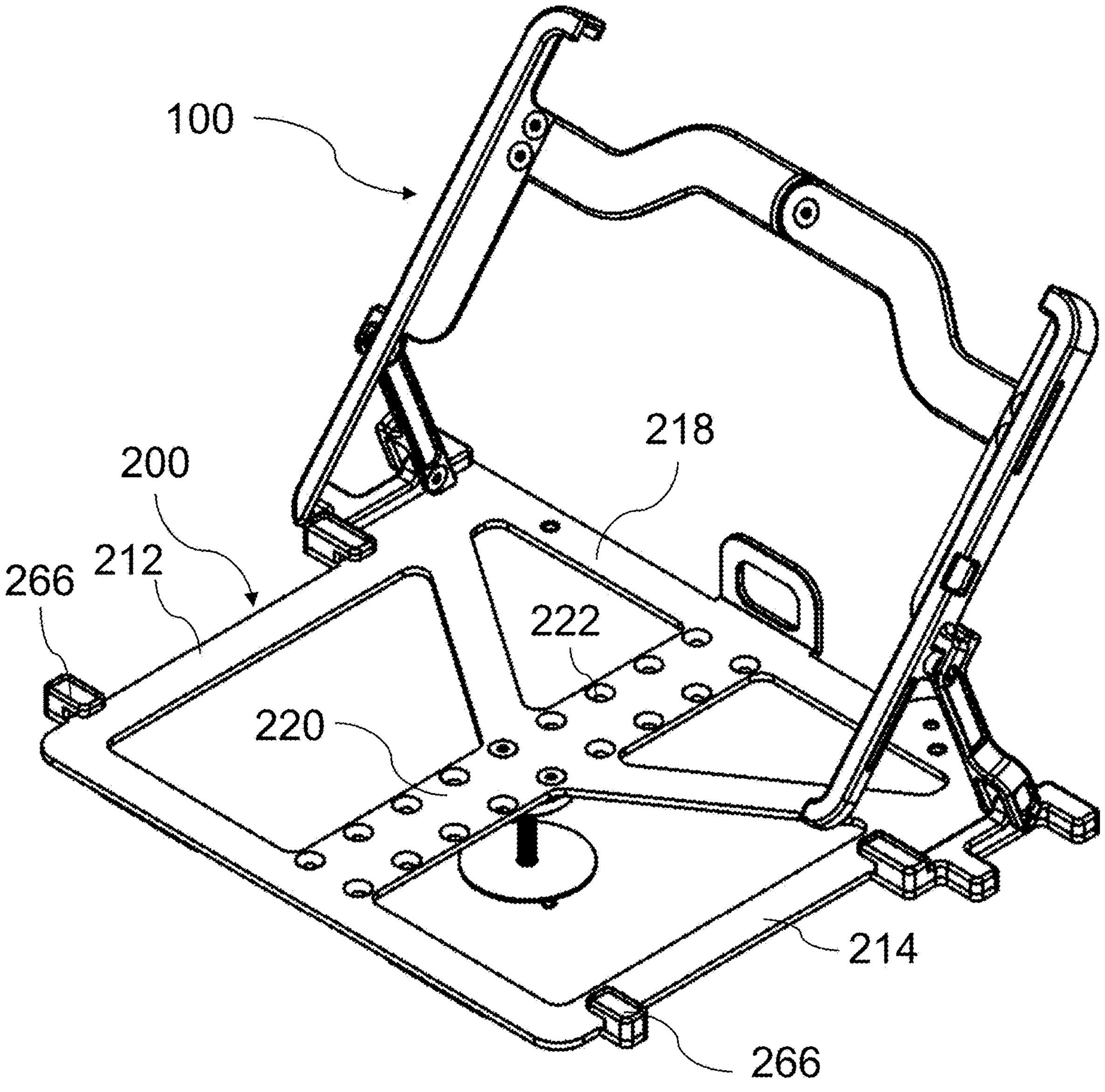
FIG. 14 illustrates an embodiment of the tablet security apparatus coupled to a mounting plate.
Figure 15:
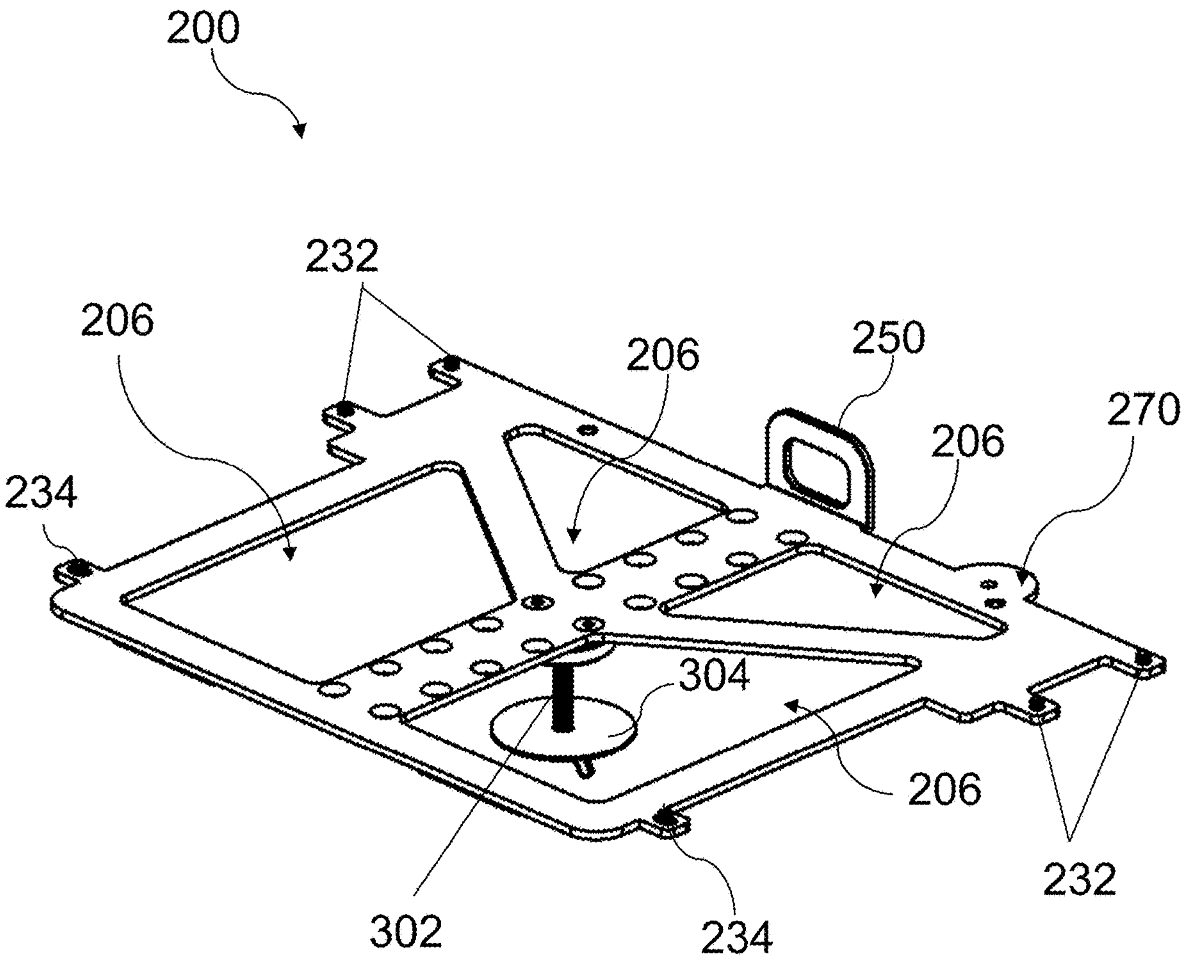
FIG. 15 illustrates a top perspective view of an embodiment of the mounting plate.
Figure 16:
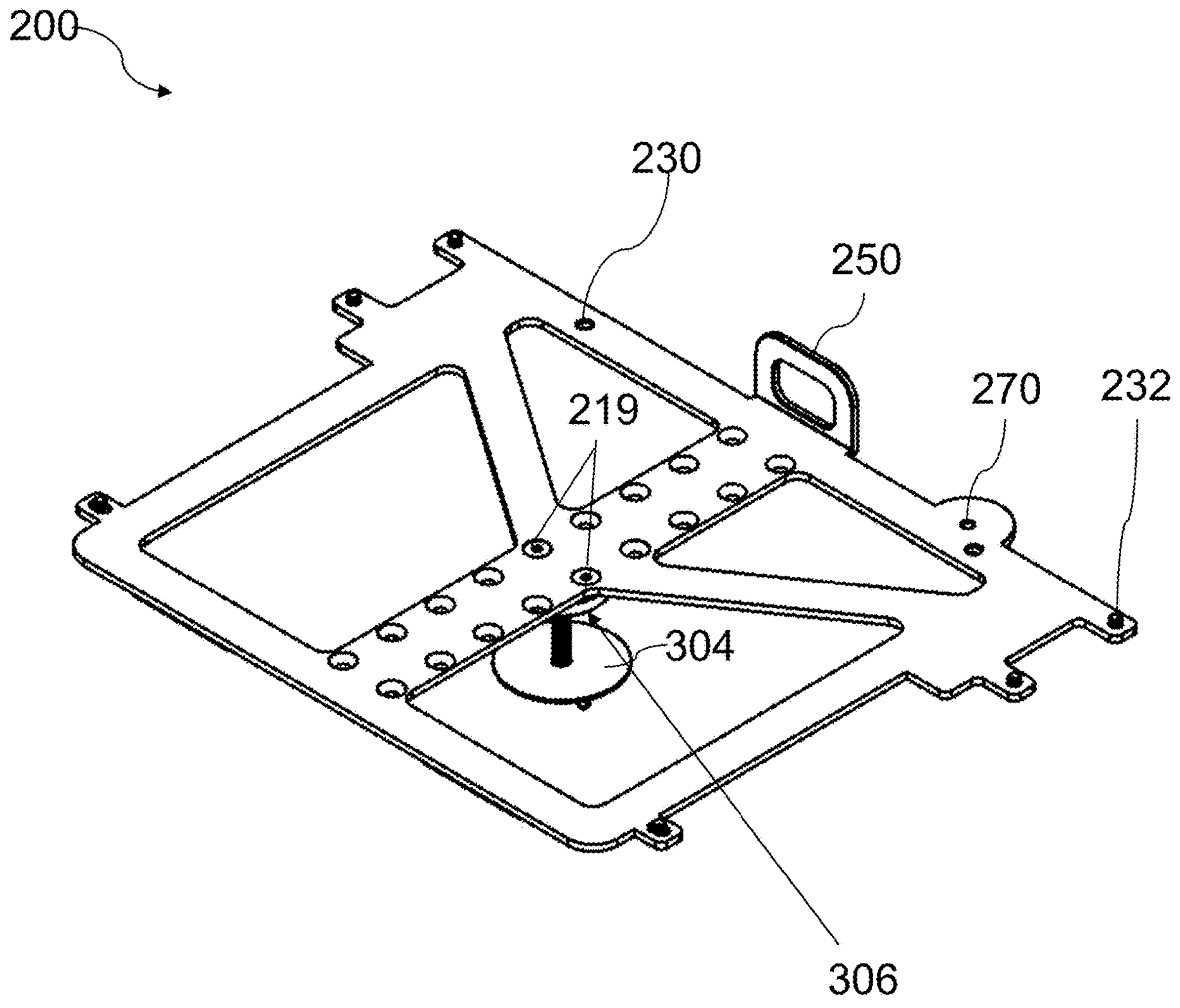
FIG. 16 illustrates another illustrates a top perspective view of an embodiment of the mounting plate.

As illustrated particularly in FIG. 14, the mounting plate 200 may further comprise one or more additional retaining elements 266 configured to retain a portion of the portable electronic device such as a detachable keyboard (or a keyboard portion of a laptop computer). The one or more additional retaining elements 266 may be separately coupled to the mounting plate 200 via one or more supplemental coupling portions 234. In this embodiment, the one or more supplemental coupling portions 234 may each include an extension or an opening configured to removably couple or aid in removably coupling to the one or more additional retaining elements 266 to the support plate 200. In an embodiment, the or more additional retaining elements 266 are formed with the mounting plate 200 as a single unitary component.

When the security apparatus 100 is coupled to the mounting plate 200, the mounting plate 200 may be used to anchor the security apparatus 100 to a display fixture 80 instead of anchoring the security apparatus 100 directly to the display fixture 80 as has been described above. Accordingly, the mounting plate 200 may comprise or otherwise define one or more coupling features that enable or aid in coupling the mounting plate 200 to the display fixture 80. For example, one or more of the perimeter and/or supplemental supports 211, 212, 213, 214, 215, 216, 217, 218 may define through holes 230 configured to accept a fastener, such as a bolt, wire, or any suitable fastener to couple the mounting plate 200 to the display fixture 80. In other embodiments, the coupling features may include coupling extensions (similar to the securing members 155) configured to be coupled to the display surface 80, such as with a securing member coupler 170. In an embodiment, the plurality of supplemental supports 211, 213, 215, 217 may be joined together, fused together or otherwise come together at an area 280 away from the plurality of perimeter supports 212, 214, 216, 218. As shown in the figures, the area 280 may be configured to receive one or more fastening members 240, such as standardized bolts, screws, or any other fastening means that is capable of removably coupling the mounting plate 200 to the display fixture 80.

The mounting plate 200 may be specifically configured to couple to a fastener 300 that comprises a coupling interface 306 that may removably coupled to the mounting plate 200 using one or more fastening members 240, and a threaded extension 302 extending from the coupling interface 306. The threaded extension 302 traverses the display surface 80 and a securing member 308, such as a nut, is configured to engage a free end of the threaded extension 302 and be tightened to secure the mounting plate 200 to the display surface 80. In an embodiment one or more washers or spacers 304 may be positioned to contact the securing member 308 and/or the coupling interface 306 when the fastener 300 is installed. In an example, the fastener 300 may be a 39-40 mm adapter to secure to a display fixture 80 that is exclusively used by specific retailers.

Figure 17A:
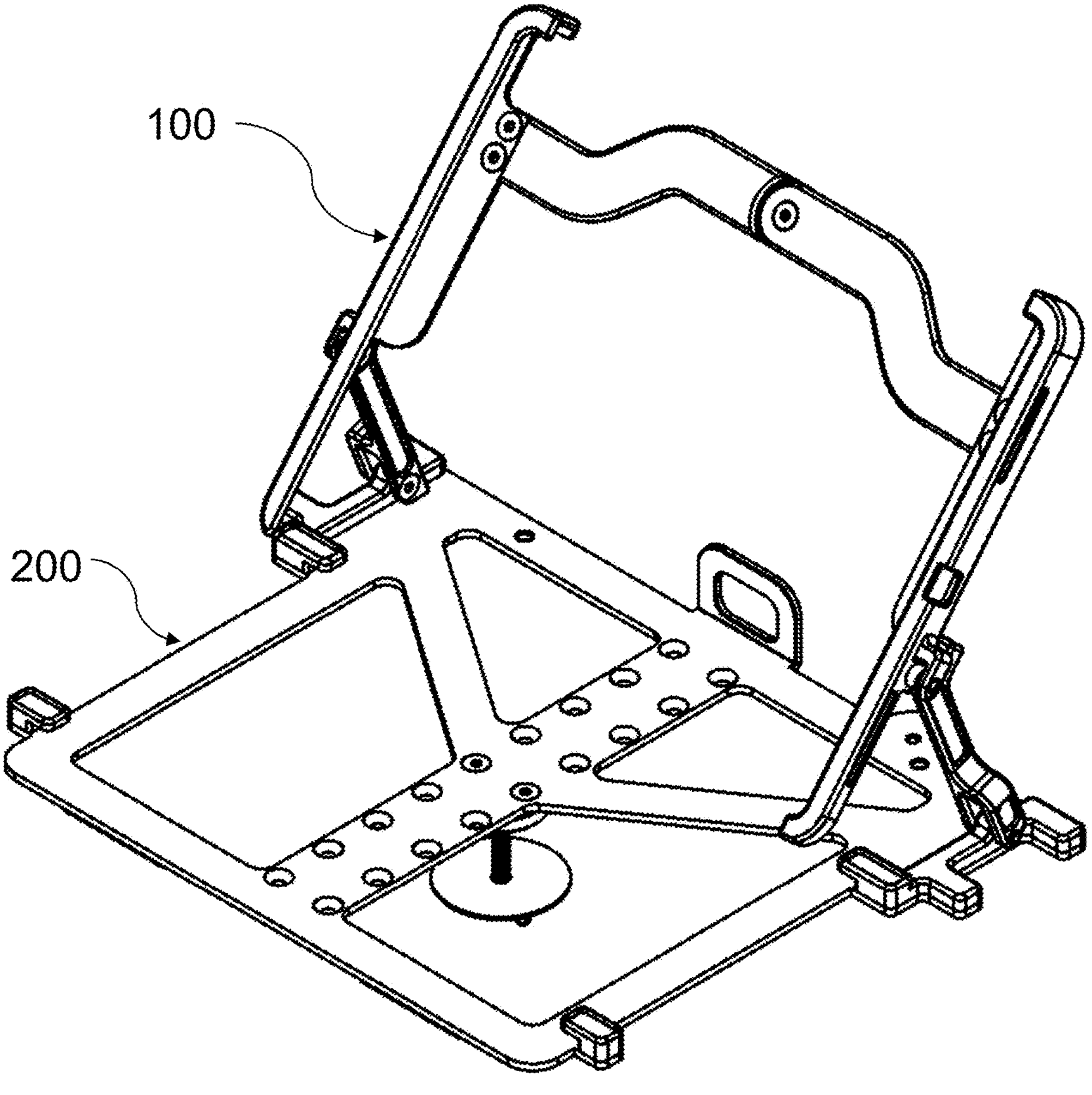
FIG. 17A illustrates a perspective view of another embodiment of the security apparatus.
Figure 17B:
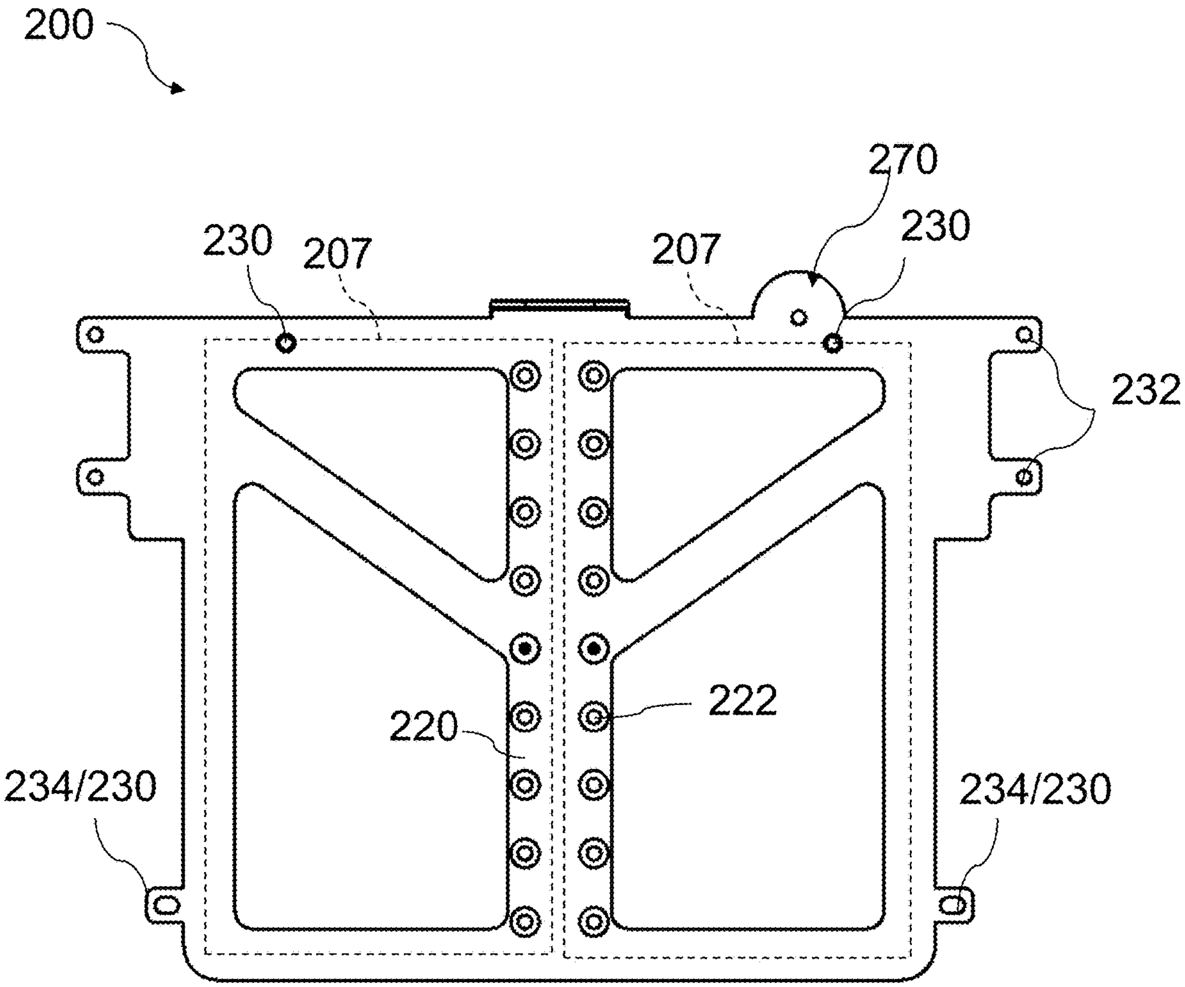
FIG. 17B illustrates a top plan view of an embodiment of a mounting plate comprising a central support.
Figure 18:
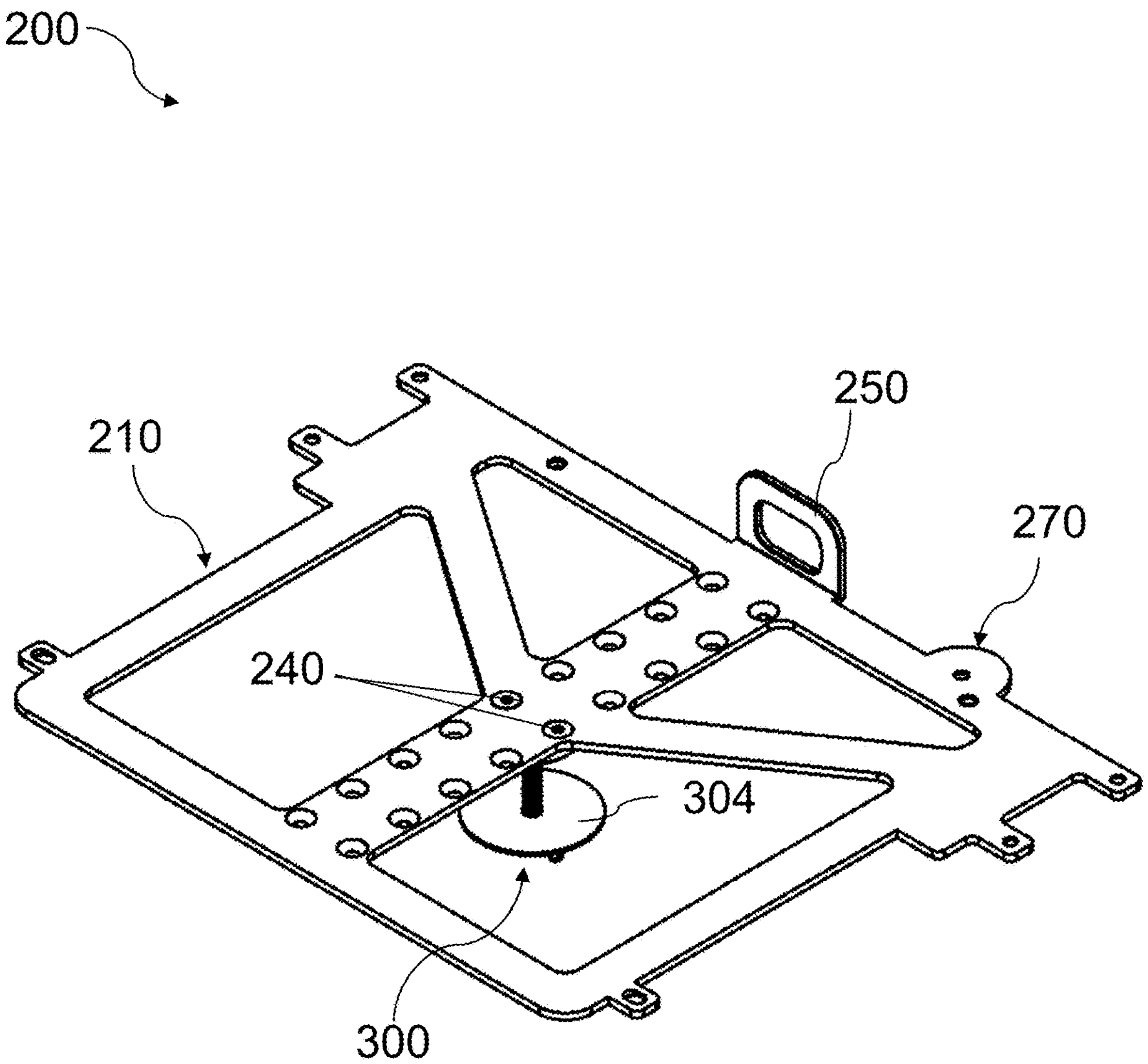
FIG. 18 illustrates a top perspective view of the embodiment of the mounting plate of FIG. 17.
Figure 19:
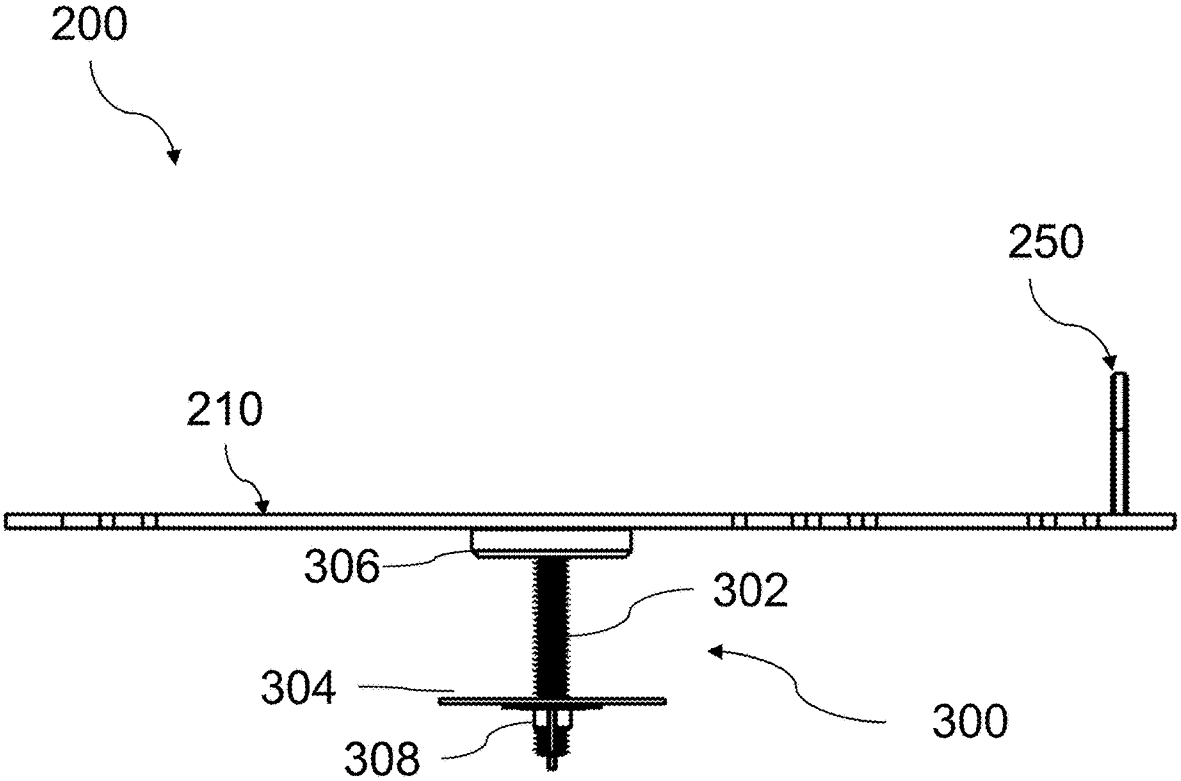
FIG. 19 illustrates a side elevational view of the embodiment of the mounting plate of FIG. 17.

As illustrated in the embodiments of FIGS. 17 and 18, the frame 210 of the mounting plate 200 may further or alternatively comprise a central support 220 that generally bisects the perimeter shape of the frame 210. For example, the perimeter shape may approximately define a square such that the central support 220 bisects the square to form two rectangular sections 207 (FIG. 17) defined by the perimeter and the central support 220. The central support 220 defines a plurality of through holes 222 that traverse the central support 220 and are configured to enable the mounting plate 200 to be coupled to a display fixture 80 using one or more fastening members 240 (or fastener 300). The plurality of through holes 222 enable flexibility in the positioning of the mounting plate 200 in relation to any pre-positioned or pre-formed hole or couplers on the display fixture 80. In other embodiments of the mounting plate 200, the central support 220 may be alternately positioned such that is does not bisect the perimeter shape of the frame 210.

The mounting plate 200 may further or alternatively comprise one or more anchors or mounting eyelets 250 configured to enable the mounting plate 200 to be coupled to a tether 350 (FIG. 20), which is in turn anchored to the display fixture 80. The one or more mounting eyelets 250 may be separate components that are removably coupled to the mounting plate 200 or they may be formed as a single unitary component with the mounting plate 200. The tether 350 may comprise a length of flexible material, such as cord or wire that is coupled to the display fixture 80 at one end and couple to the mounting eyelet 250 at an opposing end. In an embodiment, the opposing end of the tether 350 may include a locking member (not shown) configured to enable fast coupling and decoupling of the mounting plate 200 to the tether 350. When the mounting plate 200 is coupled to the tether 350, the mounting plate 200 and the coupled security apparatus 100 may be picked up or otherwise moved together relative to the display fixture 80 while still enabling the portable electronic device that is secured within the security apparatus 100 to be protected from theft. In other embodiments, the one or more anchors may secure the mounting plate 200 to the display fixture 80 such that the mounting plate 200 is inhibited from moving relative to the display fixture 80.

The plurality of perimeter supports 212, 214, 216, 218 and the plurality of supplemental supports 211, 213, 215, 217 may each comprise a bottom surface that contributes to the entire bottom surface of the mounting plate 200 that are configured to face and/or contact the display fixture 80 when the mounting plate 200 is in proper use. A portion of the entire bottom surface may have a double-sided tape 180 (FIG. 21), or other such adhesive coated substrate, affixed to it and is configured to adhesively couple the mounting plate 200 to the display fixture 80. Accordingly, the embodiments of the mounting plate 200 illustrated in the FIGS. 14-22 are capable of being secured or coupled to the display fixture 80 in several different manners such that a retailer is able to choose the manner of securing the mounting plate 200 that best suites the particular retail setting and portable electronic device being secured.

Figure 20:
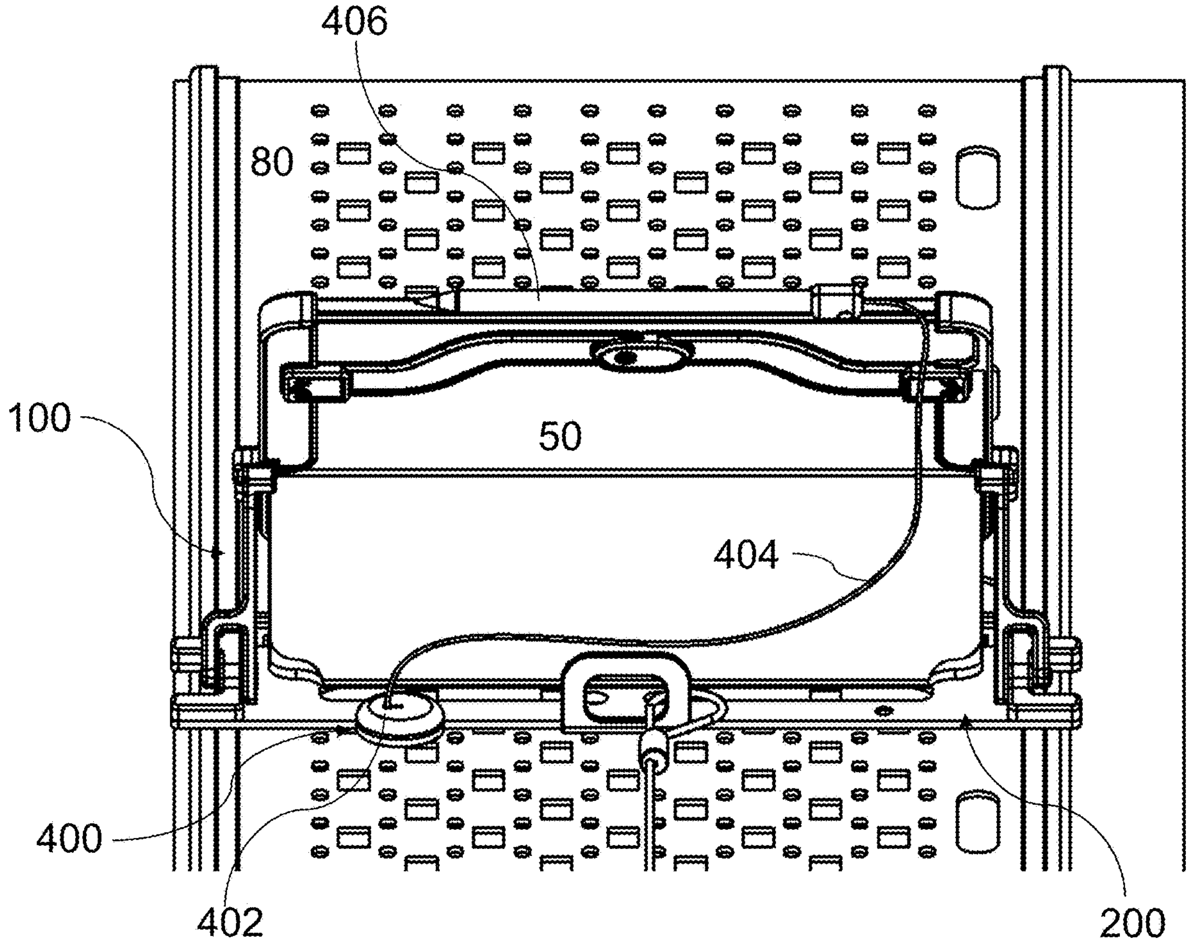
FIG. 20 illustrates an embodiment of the mounting plate coupled to an embodiment of the tablet security apparatus and secured to a display fixture via a tether cable.
Figure 21:
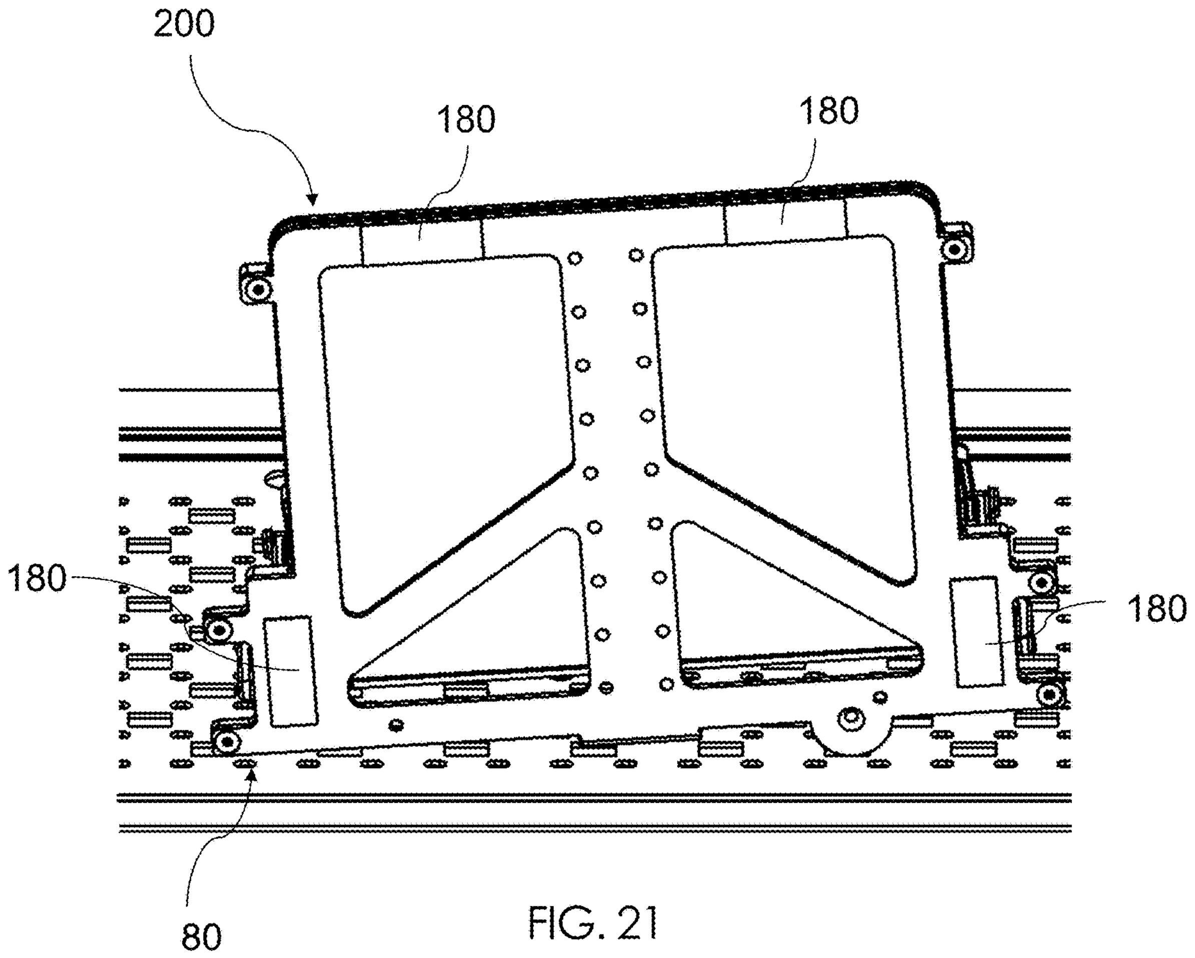
FIG. 21 illustrates a bottom perspective view of an embodiment of the mounting plate with a plurality of adhesive contacts for coupling the mounting plate to a display surface.
Figure 22:
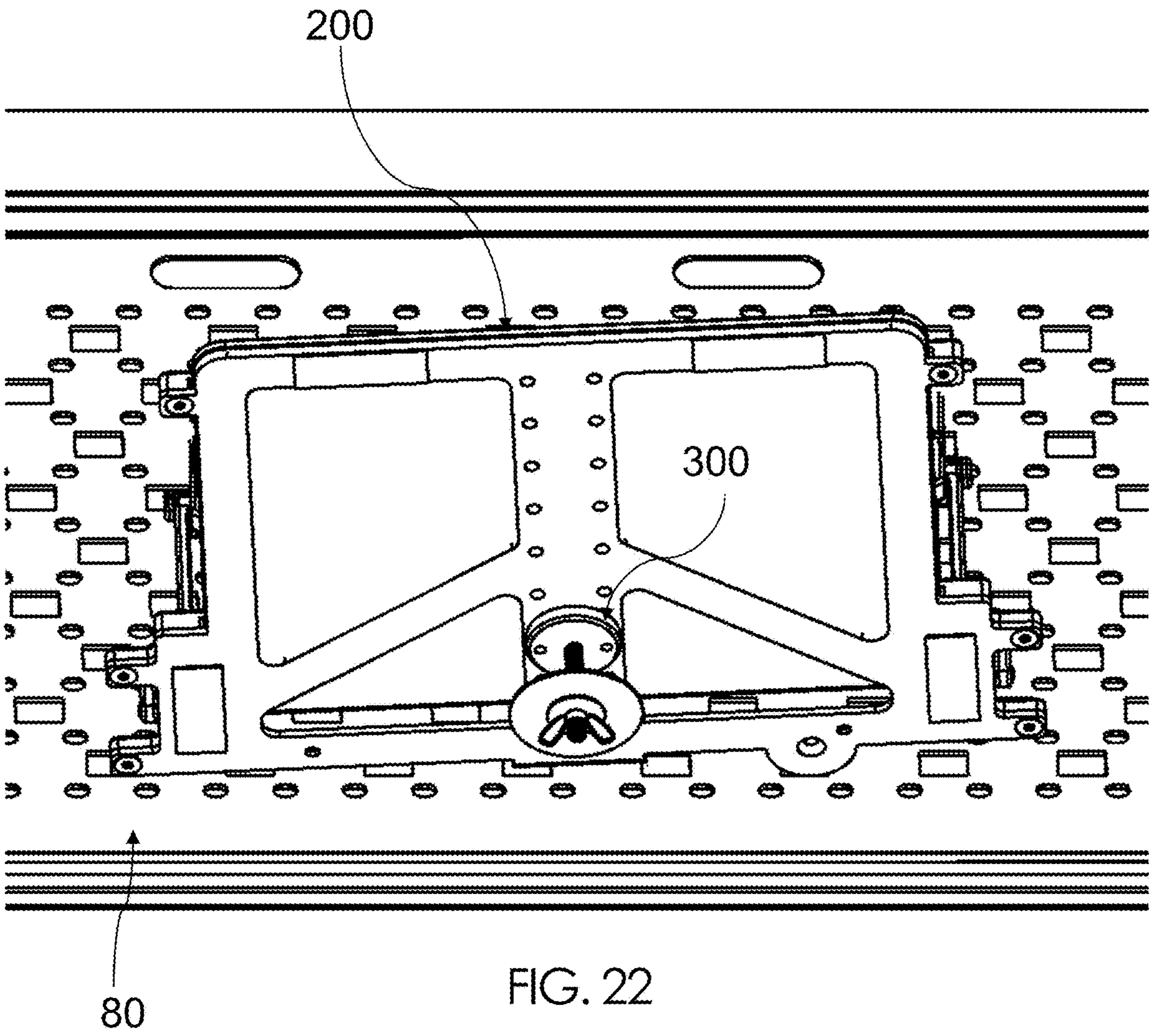
FIG. 22 illustrates a bottom perspective view of an embodiment of the mounting plate with a fastener configured to couple the mounting plate to a display surface.
Figure 23:
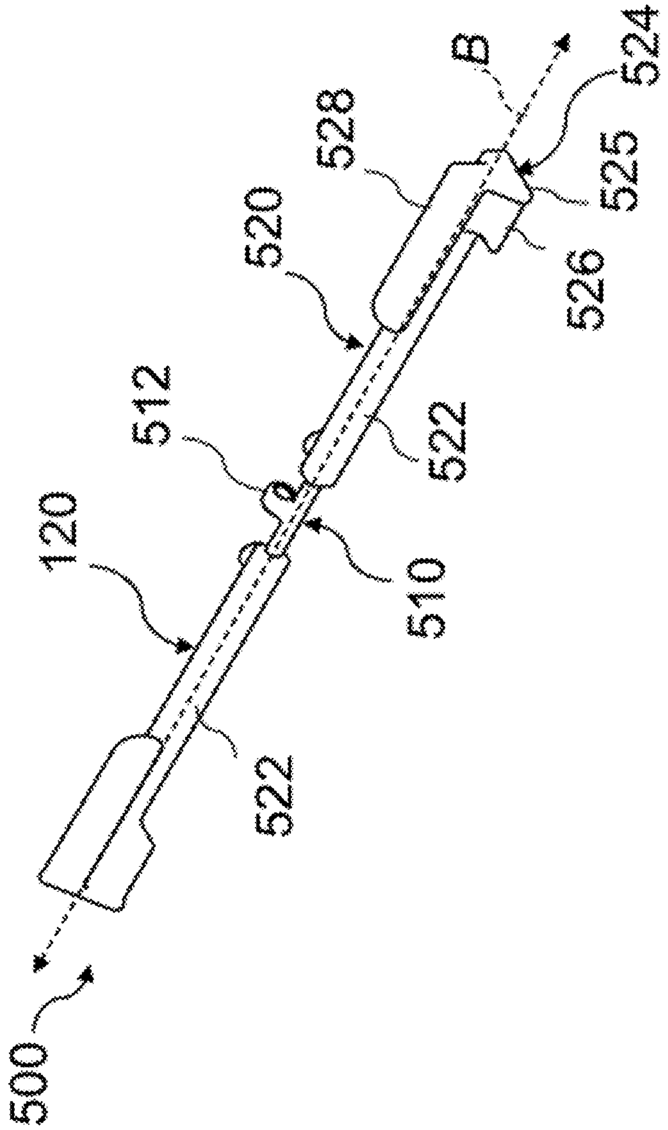
FIG. 23 illustrates a perspective view of another embodiment of a table top security apparatus for a portable electronic device.

The mounting plate 200 may further be enabled to simultaneously couple or secure one or more accessories to be used with the portable electronic device being secured by the security apparatus 100 coupled to the mounting plate 200. Accordingly, the mounting plate 200 may further comprise one or more accessory mounting portions 270. For example, in FIG. 20, an accessory 400 such as an Apple® Pencil or other stylus, may be coupled to the mounting plate 200 at the accessory mounting portion 270 such that it may be used alongside an iPad® that is secured within the security apparatus 100 that is also coupled to the mounting plate 200. As shown in FIG. 20, the stylus accessory 400 comprises a base or holder 402 coupled or otherwise secured to the accessory mounting portion 270 and a stylus implement 406 coupled to the base 402 with a wire, or cord 404. Accordingly, the accessory that is mounted to the mounting plate 200 may be moved relative to the display fixture 80 with the mounting plate 200 and the security apparatus 100.

In order to secure a portable electronic device, such as a tablet or display with keyboard accessory 60, within the security apparatus 100, the first and second retaining portion 112, 114 are in the unlocked state and pivoted relative to each other to accept the tablet. The first and second retaining portions 112, 114 are then pivoted relative to each other to retain two or more sides of the tablet. The first and second retaining portions are then moved to the locked state such that they are inhibited from moving relative to each other. The keyboard accessory 60 is then positioned such that the base 150 contacts the keyboard accessory 60. The base 150 is then coupled to a display fixture 80 using the securing member couplers 170. The keyboard accessory 60 is secured by being trapped between a portion of the base 150 and the display fixture 80. In some embodiments, the keyboard accessory 60 is further retained between the first and second retaining portions 112, 114. The tablet is secured between the first and second retaining portions 112, 114 and is able to be pivot relative to the display fixture 80 (and hence the secured keyboard accessory 60) while still being retained by the first and second retaining portions 112, 114.

When a security system is used comprising a security apparatus 100 and a mounting plate 200, the tablet and keyboard accessory 60 is secured within the security apparatus 100 as discussed above. Instead of securing the base 150 of the security apparatus to the display fixture 80, the base 150 is secured to the mounting plate 200. In an embodiment, the base 150 is secured to the mounting plate 200 using the securing member couplers 170. In turn, the mounting plate 200 is secured to the display fixture 80 using one or more fasteners or a tether/anchor system. In this manner, secured devices may be easily and quickly removed from secure display and replaced.

The embodiments of the security apparatus 100 and mounting plate 200 may further comprise an alarm. In an embodiment, the alarm may be triggered by a pressure change, such as by removing a portable electronic device from the security apparatus 100 and/or the mounting plate 200. In another embodiment, the alarm may be triggered by unlocking the security apparatus 100 or otherwise opening the security apparatus 100 or separating the security apparatus 100 from the mounting plate 200 and/or the display fixture 80. In other embodiments, the alarm may be activated in response to damage to, removal of, or tampering with the security apparatus 100 and/or the mounting plate 200. The alarm may comprise an audio, visual, and/or haptic signal.

Now referring to FIGS. 23-27, another embodiment of the security apparatus 500 is shown and is configured for securing portable electronic devices, such as laptop computers. As sown, the security apparatus 500 includes a body 510 that extends along a body axis B. The body 510 further includes a coupling member 512 that may be formed as a single unit with the body 510. The body 510 is further configured to movably couple to one or more securing members 520. As shown, the security apparatus 500 includes two (2) securing members 520 that are positioned at opposing ends of the body 510 and are configured to move relative to the body 510.

Figure 24:
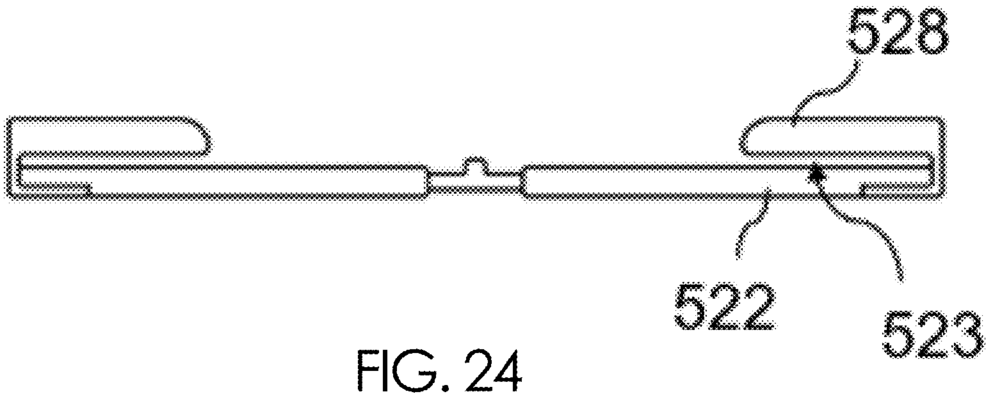
FIG. 24 illustrates a front view of the embodiment the security apparatus from FIG. 23.
Figure 25:
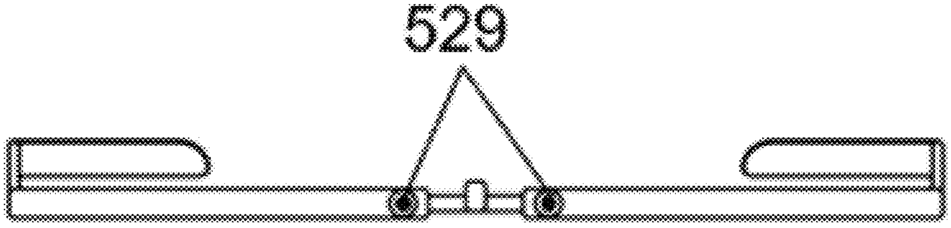
FIG. 25 illustrates a rear view of the embodiments of the security apparatus from FIGS. 23 and 24.

Each of the securing members 520 includes a body engagement portion 522 that is configured to engage with the body 510 and to aid or guide a sliding movement of the securing member 520 relative to the body 510. Each securing member 520 further includes a securing portion 524 which generally includes a support surface 525 that is structured to support the securing member 520, a stop surface 526, and a retainer member 528. The support surface 525 may further act to support the body 510 and hold the body 510 away from a display fixture 55. As shown in FIGS. 24 and 25, the retainer member 528 is configured such that a space 523 is defined between the retainer member 528 and a portion of the securing member 520, such as the body engagement portion 522. Referring specifically to FIG. 25, each securing member 520 further includes a lock member 529 that is configured to move between a locked state and an unlocked state. When in the locked state, the securing members 520 are inhibited from moving relative to the body 510, and when in the unlocked state the securing members 520 are enabled to move relative to the body 510 along the body axis B. In some embodiments, only one of the securing members 520 is able to move relative to the body 510 while the other securing member 520 is fixedly coupled to the body 510 or formed as a single unit with the body 510.

Figure 26:
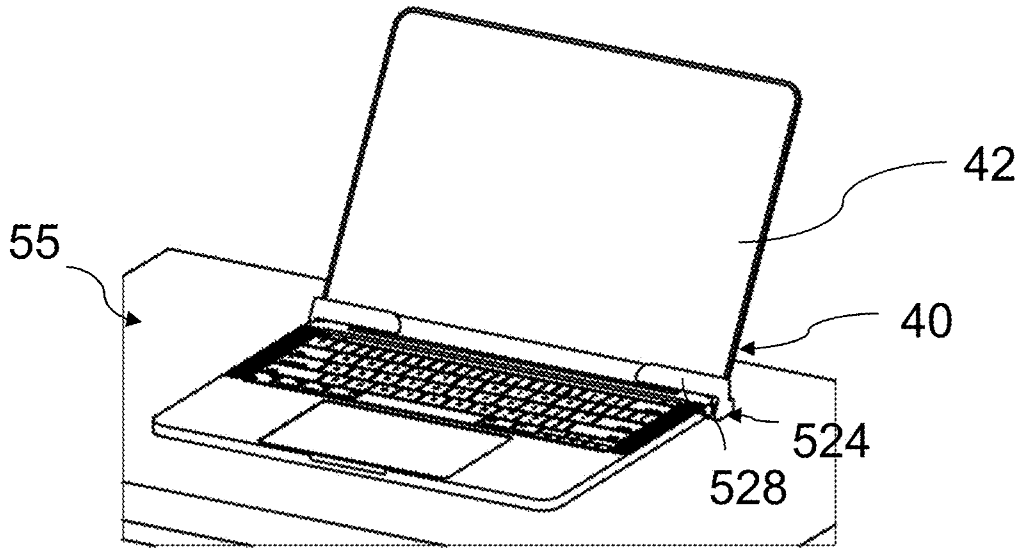
FIG. 26 illustrates a front perspective view of the embodiments of the security apparatus of FIGS. 23-25 securing a portable electronic device to a display fixture.
Figure 27:
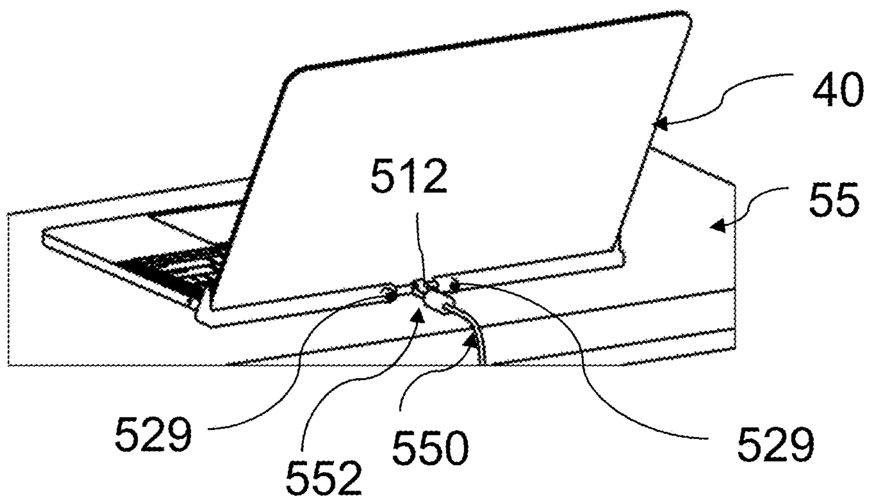
FIG. 27 illustrates a rear perspective view of the embodiment of the security apparatus of FIG. 26.

As shown in FIGS. 26 and 27, a laptop computer 40 maybe secured by the security apparatus 500 as will now be explained. When the lock member(s) 529 are in the unlocked state, the securing members 520 may be slid towards each other to secure the laptop 40 such that a portion of the laptop computer 40 is positioned and secured within the space 523. Once the laptop computer 40 is secured, the locking member (s) 529 are moved to the locked state to inhibit movement of the securing members 520 relative to the body 510. As shown, a portion of the display end 42 of the laptop computer 40 is secured by the retainer member 528. In the secured position, the stop surface 526 limits the extent that the laptop computer 40 maybe opened and the retainer member 528 together with the stop member 526 and the body 510 inhibit removal from the laptop computer 40 from the security apparatus 500. Once the portable electronic device, in this case the laptop computer 40 is secured by the security apparatus 500, an anchor member 550 is coupled to the coupling member 512 at one end 552 and fixedly secured to an anchor (not shown) at another end. In this manner, the portable electronic device, in this case the laptop computer 40, is secured within the security apparatus 500, but is able to be lifted away from the display fixture 55 or table top while also being inhibited from removal from the retail space due to the anchor member 550.

Referring to FIGS. 28-31, another embodiment of a security apparatus 600 is shown. Some aspects of this embodiment may be similar to other embodiments previously described and may not be described in great detail. The security apparatus 600 generally includes a body 610 and one or more securing members 620 movable coupled to the body 610. The body 610 extends along a body axis S and further includes a coupling member 612 that may be formed as a single unit with the body 610. The body 610 is further configured to movably couple to one or more securing members 620. As shown, the security apparatus 600 includes two (2) securing members 620 that are positioned at opposing ends of the body 610 and are movable relative to the body 610.

Figure 28:
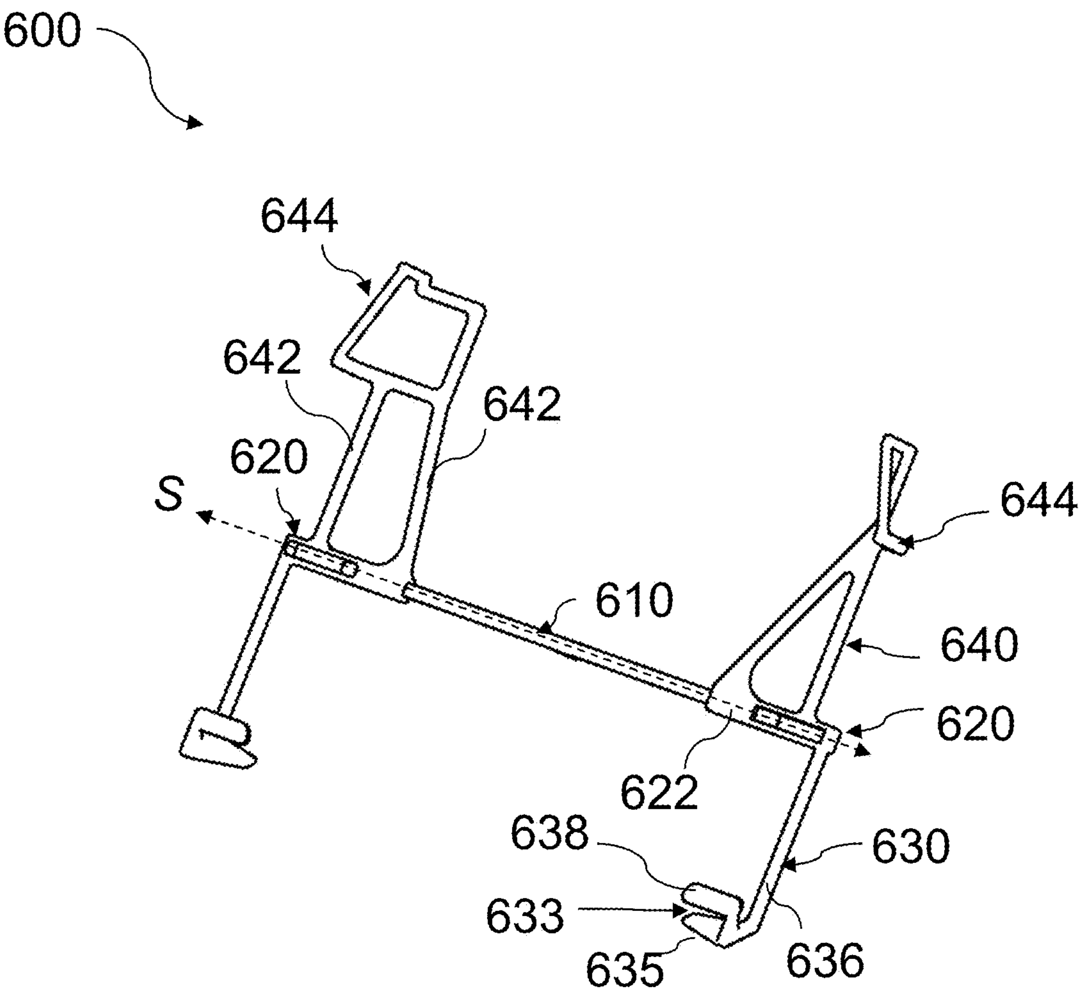
FIG. 28 illustrates a front perspective view of another embodiment of the security apparatus.

Each of the securing members 620 includes a body engagement portion 622 that is configured to engage with the body 610 and to aid or guide a sliding movement of the securing member 620 relative to the body 610. Each securing member 620 further includes a first securing portion 630 which generally includes a support surface 635 that is structured to contact the display fixture 55 support the securing member 620, one or more support members 636, and a retainer member 638. As shown in FIG. 28, the retainer member 638 is configured such that a space 633 is defined between the retainer member 638 and a portion of the securing member 620, such as the support surface 635. A second securing portion 640 is connected to the first securing portion 630 and generally includes one or more support members 642, a retainer member 644 and one or more support members 646.

Figure 29:
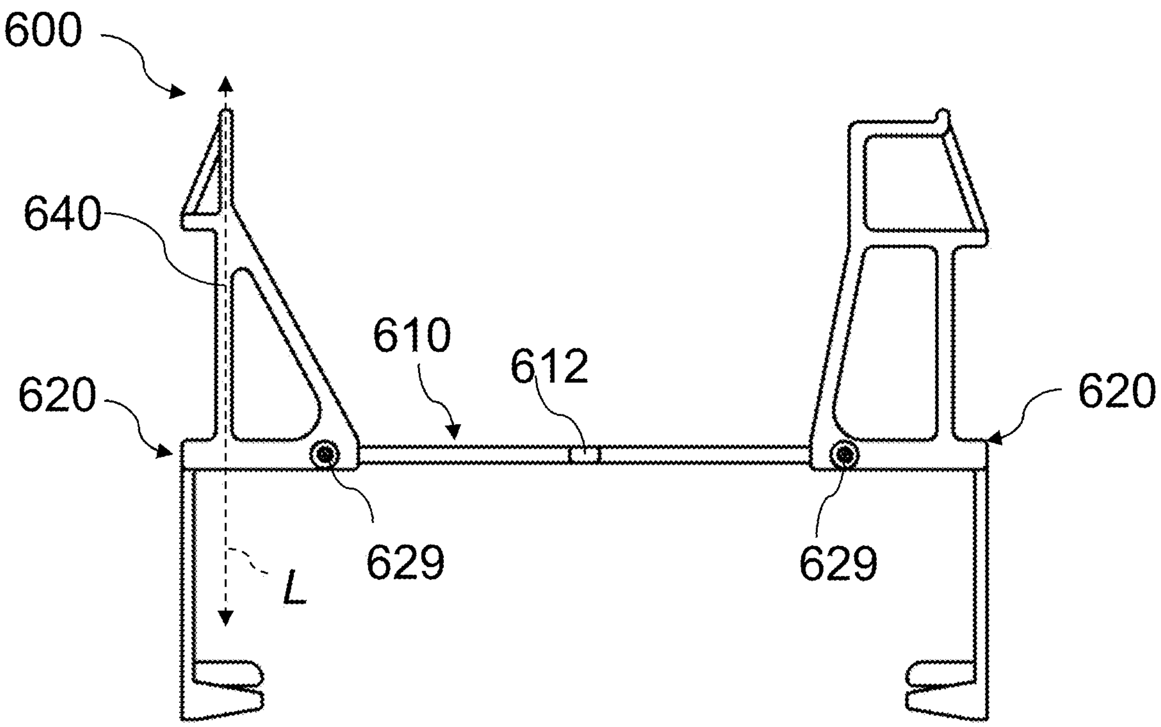
FIG. 29 illustrates a front view if the embodiment of FIG. 28.
Figure 30:
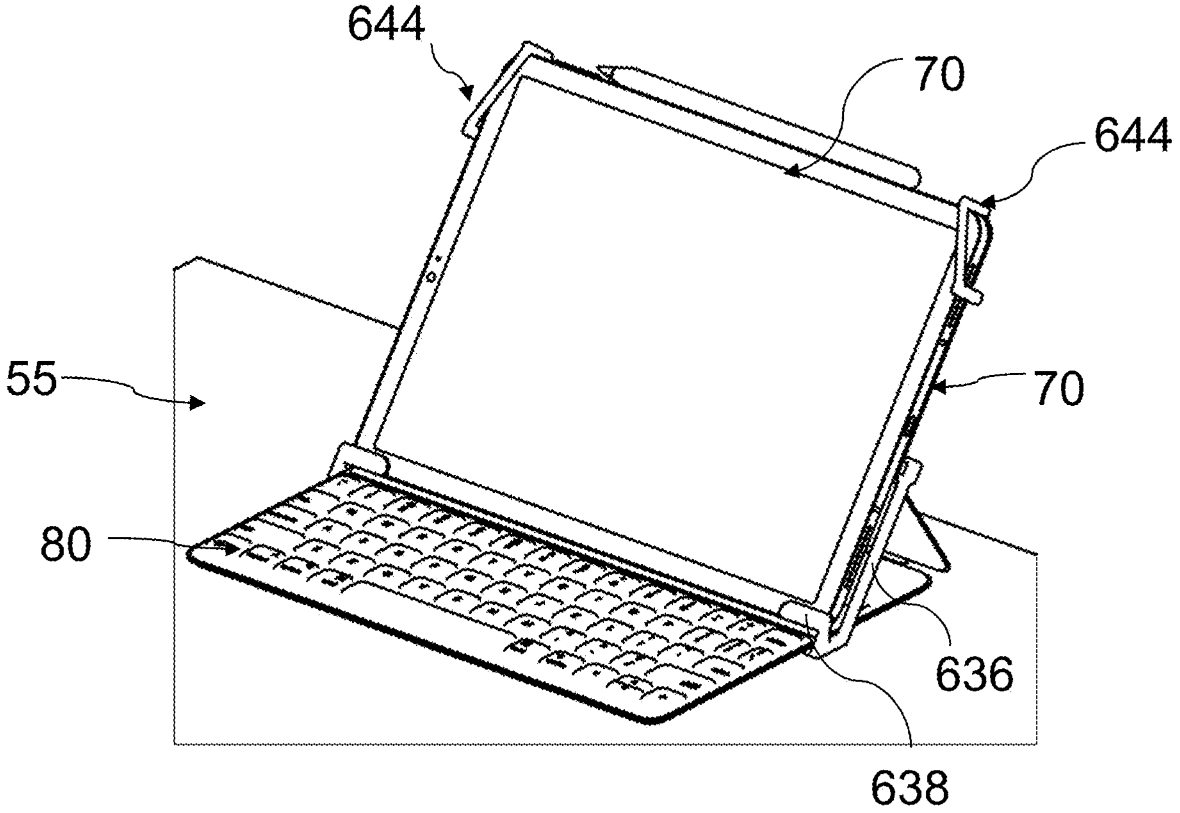
FIG. 30 illustrates a front perspective view of the security apparatus of FIGS. 28 and 29 securing a portable electronic device.
Figure 31:
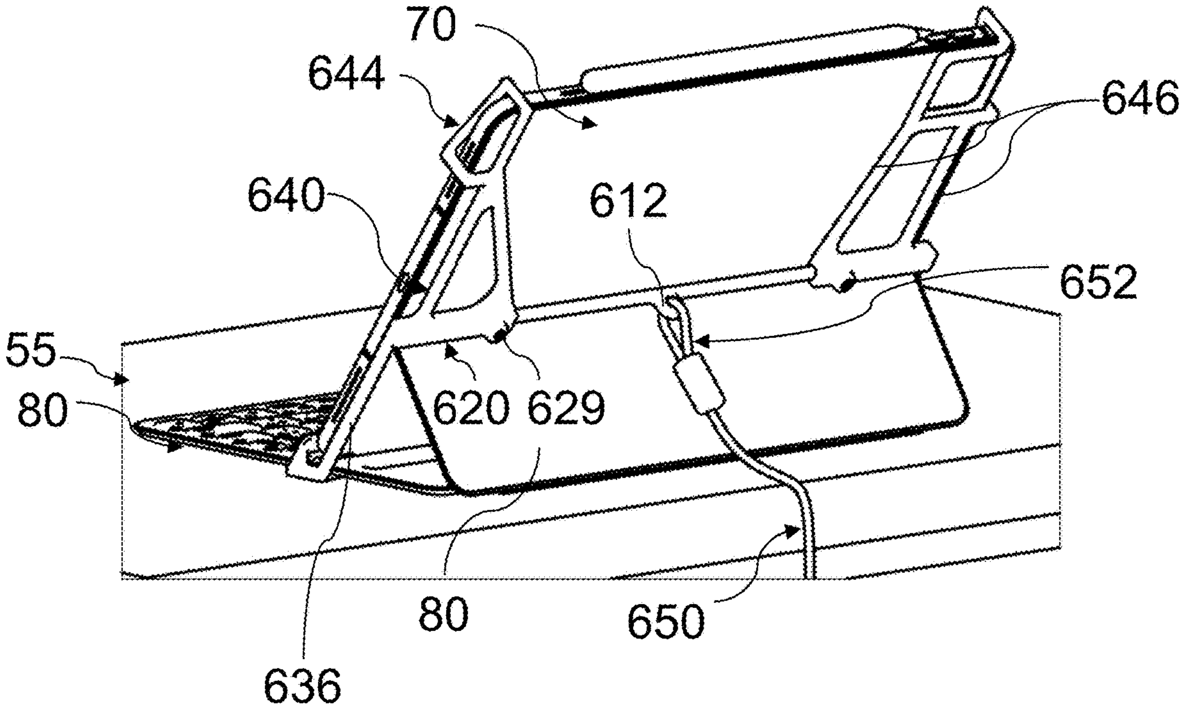
FIG. 31 illustrates a rear perspective view of the embodiment of FIG. 30.

Still referring to FIGS. 28 and 29, each securing member 620 further includes a lock member 629 that moves between a locked state and an unlocked state. In the locked state, the securing members 620 are inhibited from moving relative to the body 610. In the unlocked state, the securing members 620 are enabled to move relative to the body 610 along the body axis S. As shown in FIG. 29, the second securing portion 640 may be capable of adjusting along axis L to accommodate portable electronic devices of varying height (or length). In said embodiment, an additional lock member 656 (FIG. 32) may be included to lock the second securing portion 640 to inhibit movement along the axis L.

As shown in FIGS. 28-32, a portable electronic device, such as a tablet 70 with a detachable keyboard 80, may be secured by the security apparatus 600 as will now be explained. When the lock member(s) 629 are in the unlocked state, the securing members 620 may be slid towards each other such that the first securing portions 630 retains and secures a portion of the tablet 70 within the space 633 via the retainer members 638. At the same time, the second securing portions 640 retain and secure another portion of the tablet 70 and a portion of the detachable keyboard 80 via the retainer members 644. Once the portable electronic device 40 is secured, the locking member(s) 629 are moved to the locked state to inhibit movement of the securing members 620 relative to the body 610. In the secured position, the tablet 70 and the detachable keyboard 80 are secured in the security apparatus 600 via the retainer members 638, 644 and the one or more support members 636, 646. Once the portable electronic device 40 is secured by the security apparatus 600, an anchor member 650 is coupled to the coupling member 612 at one end 652 and fixedly secured to an anchor (not shown) at another end. In this manner, the portable electronic device, in this case the tablet 70 and detachable keyboard 80, is secured within the security apparatus 600, but is able to be lifted away from the display fixture 55 or table top while also being inhibited from removal from the retail space due to the anchor member 650.

Figure 32:
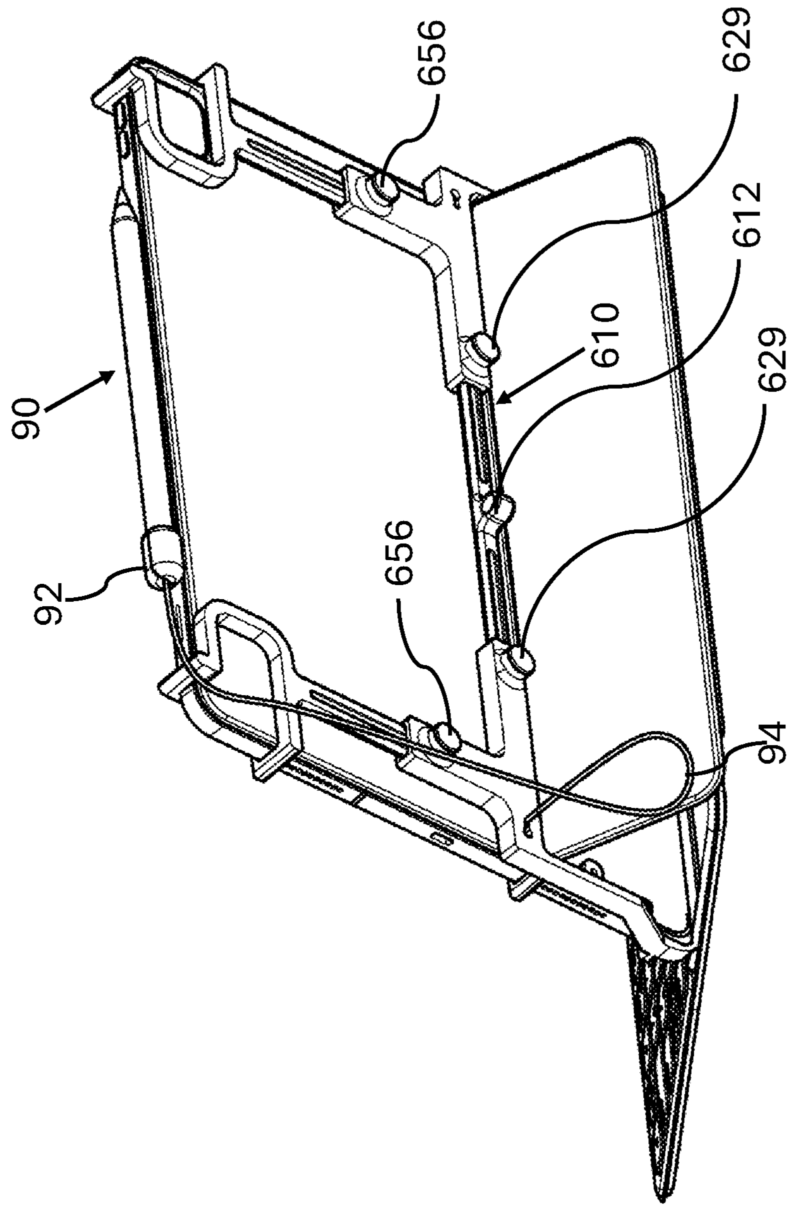
FIG. 32 illustrates another rear perspective view of the embodiment of FIG. 30.
Figure 33:
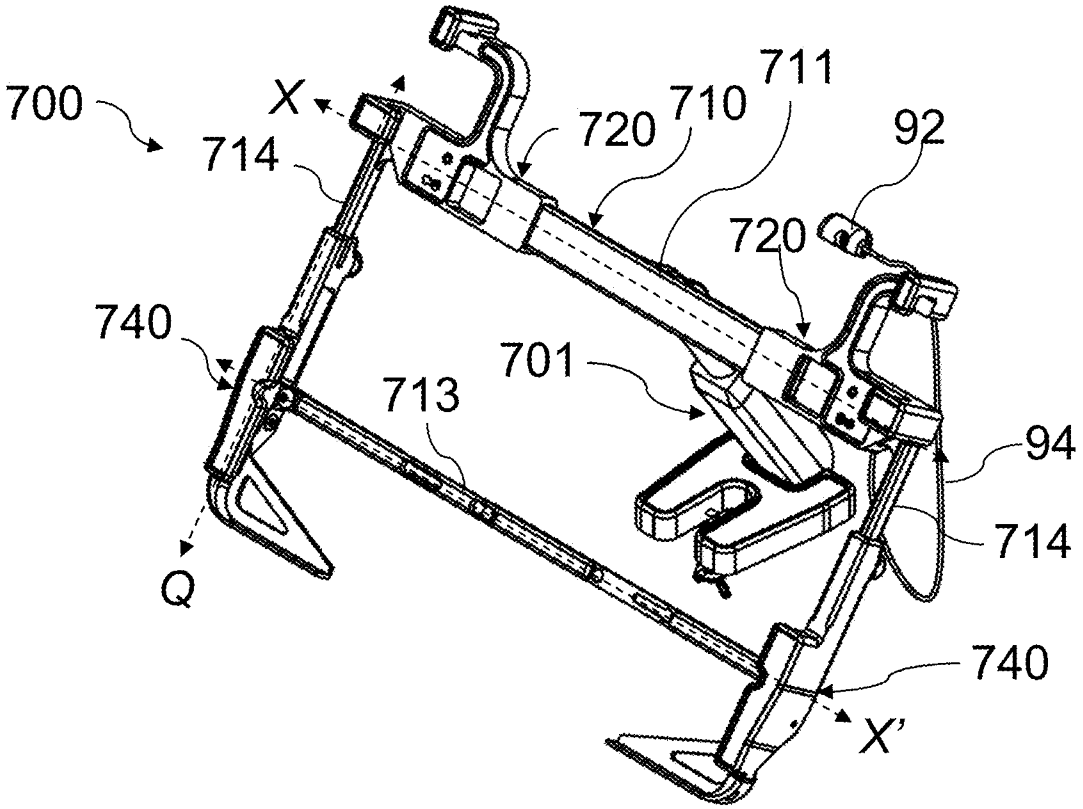
FIG. 33 illustrates a front perspective view of another embodiment of the security apparatus.
Figure 34:
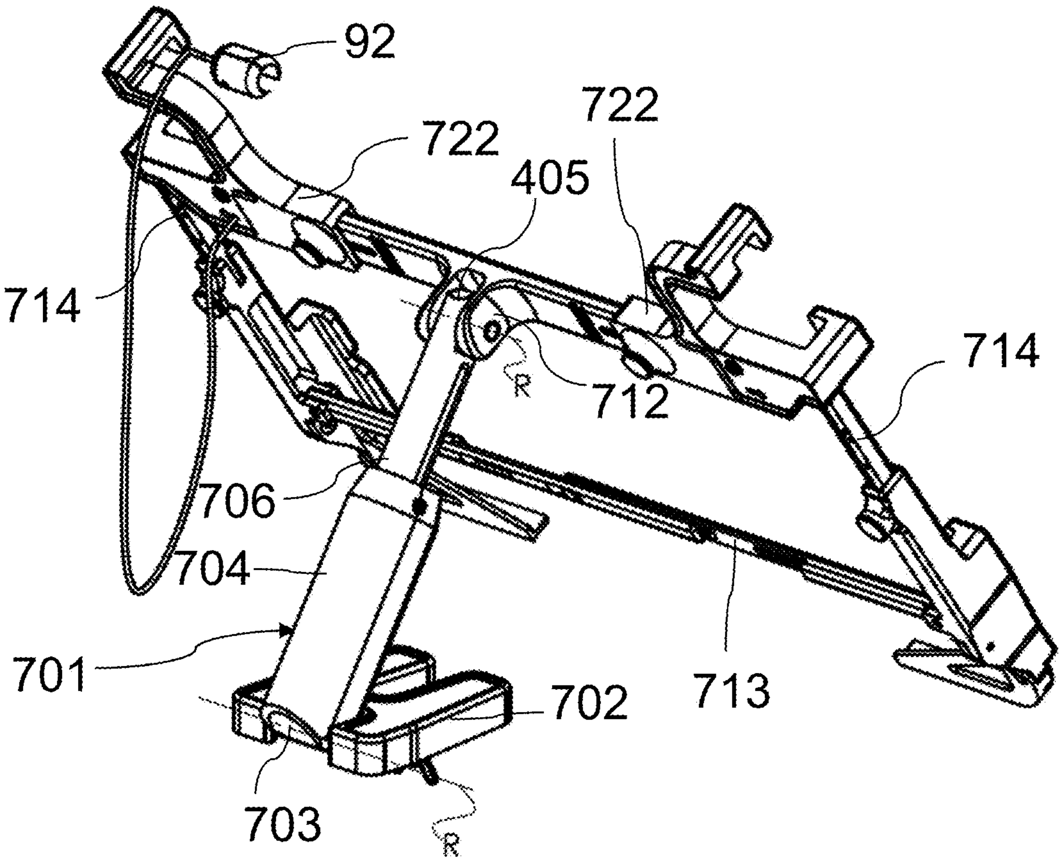
FIG. 34 illustrates a rear perspective view of the embodiment of FIG. 33.
Figure 35:
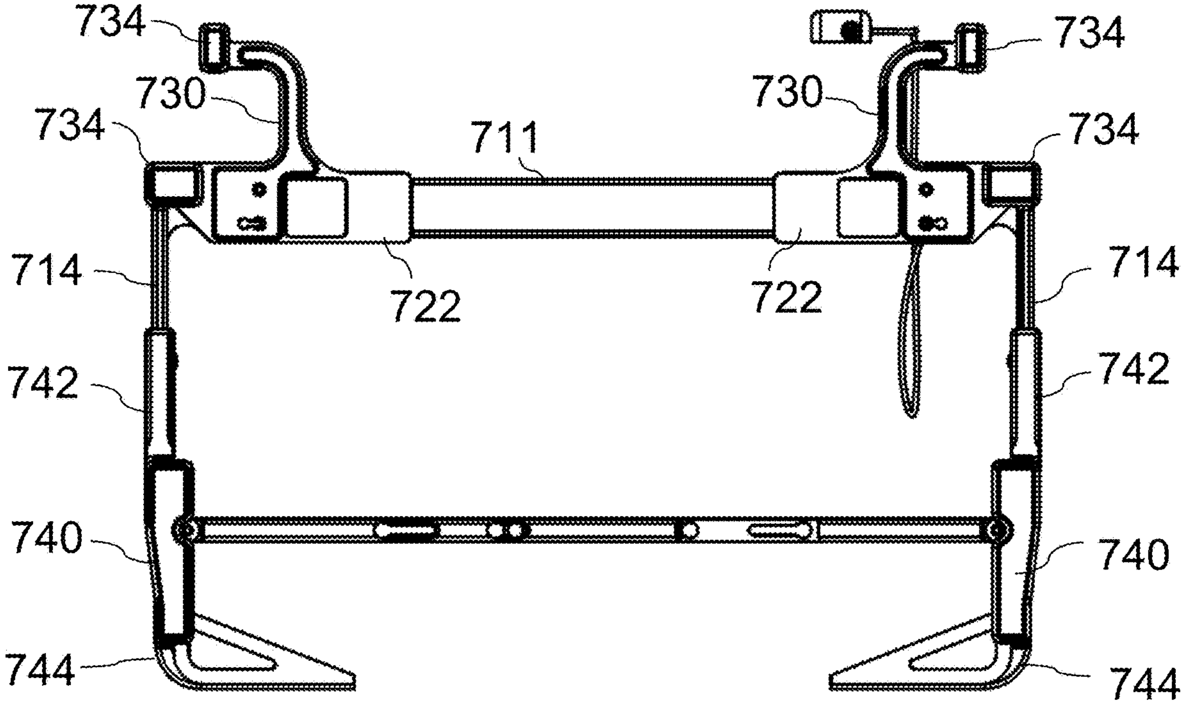
FIG. 35 illustrates a front view of an embodiment of a portion of the security apparatus of FIG. 33.
Figure 36:
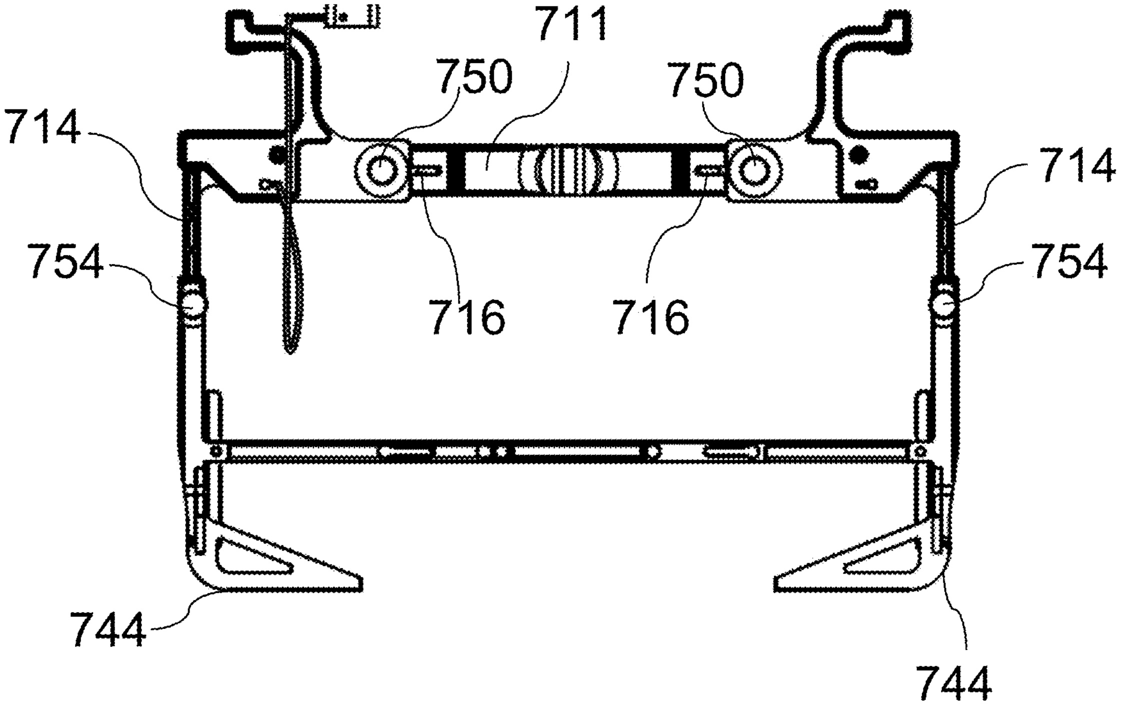
FIG. 36 illustrates a rear view of the embodiment of FIG. 35.
Figure 37:
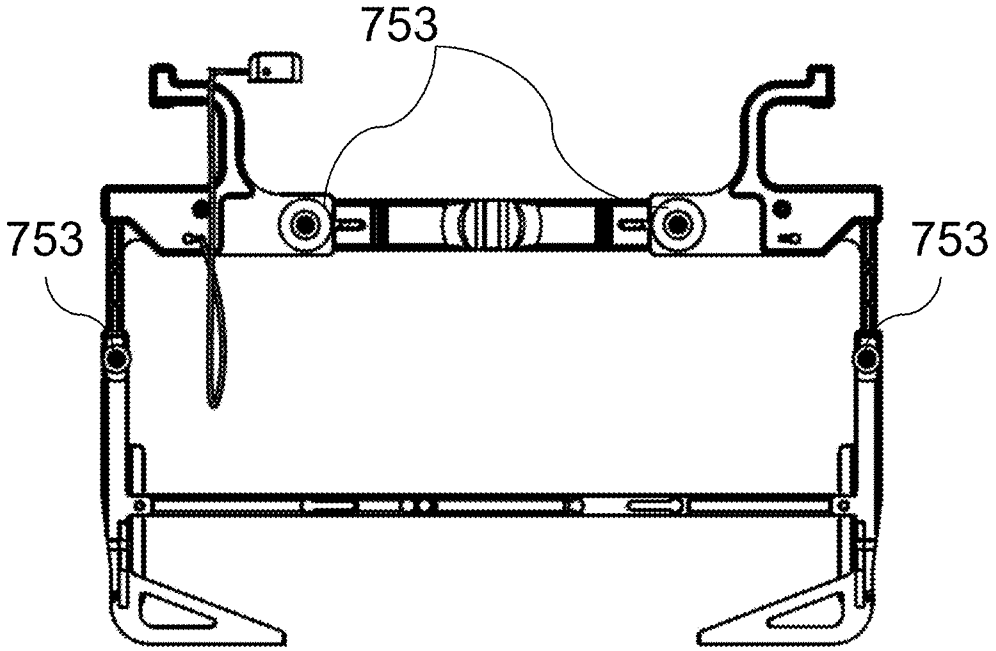
FIG. 37 illustrates another rear view of the embodiment of FIG. 35.

As shown in FIG. 32, the security apparatus 600 may be further structured to accommodate a stylus 90 or other accessory to be used with the portable electronic device 40 secured by the security apparatus 600. In an embodiment, the stylus 90 maybe fitted with a coupling portion 92 and an anchor 94 that couples the coupling portion 92 to a portion of the security apparatus 600. In this manner, the accessory, in this case the stylus 90, may be used with the portable electronic device 40 secured in the security apparatus 600 while inhibiting theft of the accessory.

Another embodiment of the security apparatus 700 will be discussed with reference to FIGS. 33-44. This embodiment of the security apparatus 700 generally includes base assembly 701, a body 710 moveably coupled to the base assembly 701. A plurality of securing members 720, 740 are moveably coupled to the body 710. As show, the body 710 includes a plurality of body supports 711, 714. One or more lateral supports 713 or lateral guides may operatively couple the securing members 740 to each other. The one or more lateral supports 713 may extend along a support axis X'. In some embodiments, the support axis X' is parallel to the first body axis X.

Similar to other embodiments discussed, the body 710 further includes a coupling member 712 that may be formed as a single unit with the body 710. As shown, the security apparatus 700 includes two (2) upper securing members 720 that are positioned at opposing ends of the body support 711 and are configured to move relative to the body 710 along the first body axis X. Each of the upper securing members 720 includes a body engagement portion 722 that is structured to engage with the body 710 and to aid or guide a sliding movement of the upper securing member 720 relative to the body support 711. Each upper securing member 720 further includes one or more support members 330 that support, comprise or are connected to one or more retainer members 734 that are structured to retain a portion of a portable electronic device 40. As shown, the number of retainer members 734 is greater than illustrated in other embodiments, which provides an increased level of security. In an embodiment, the upper securing members 720 are adjustable relative to the body support 711 of the 710 to accommodate portable electronic devices of varying sizes. One or more lock members 750 may be provided that inhibit movement of the upper securing members 720 relative to the body support 711 of the body 710 and/or movement of the support members 730 relative to each other.

The security apparatus 700 further includes two (2) lower securing members 740 that are positioned along another body support 714 of the body 710 and are structured to move relative to the body support 714 along a second body axis Q that intersects the first body axis X. Each of the lower securing members 740 includes a body engagement portion 742 that is structured to engage with the body support 714 and to aid or guide a sliding movement of the lower securing members 740 relative to the body support 714. Each upper securing member 740 further includes one or more retainer members 744 that are structured to retain a portion of a portable electronic device 40. In an embodiment, the lower securing members 740 are adjustable relative to the body support 714 of the body 710 to accommodate portable electronic devices of varying sizes. One or more lock members 754 may be provided that inhibit movement of the lower securing members 740 relative to the body support 714 of the body 710 and/or movement of the retainer members 744 relative to each other.

The body 710 may further comprise one or more features 716, such as grooves or slots, that interact with a corresponding lock member 750, 754 to aid in securing the upper and lower securing members 720, 740 relative to the body 710. In an embodiment, the one or more lock members 750, 754 are structured to move between a locked state and an unlocked state. In the locked state, the upper and lower securing members 720, 740 are inhibited from moving relative to the body 710 and/or the support members/retainer members 730, 734, 744 from moving relative to each other. In the unlocked state, the upper and lower securing members 720 are enabled to move relative to the body 710 and/or the support members/retainer members 730, 734, 744 are enabled to move relative to each other. In some embodiments, the one or more lock members 750, 754 may be covered with a lock cap 753 for aesthetic or additional security purposes.

Figure 38:
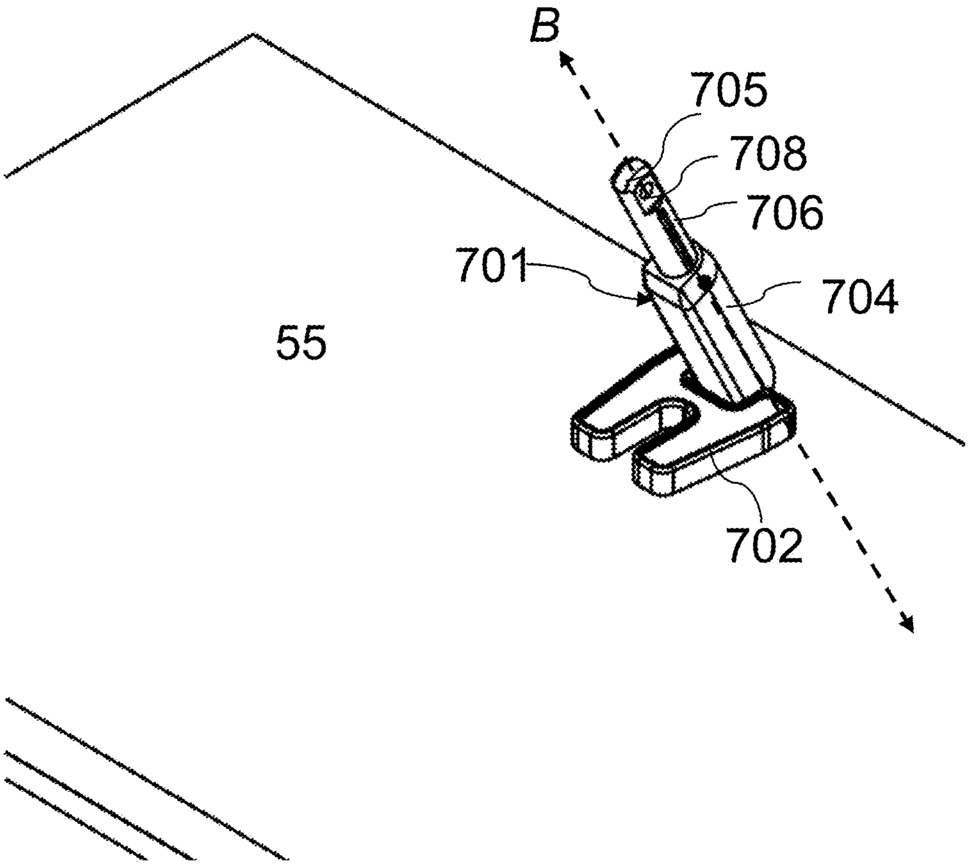
FIG. 38 illustrates a side perspective view of an embodiment of a base assembly of the security apparatus.
Figure 39:
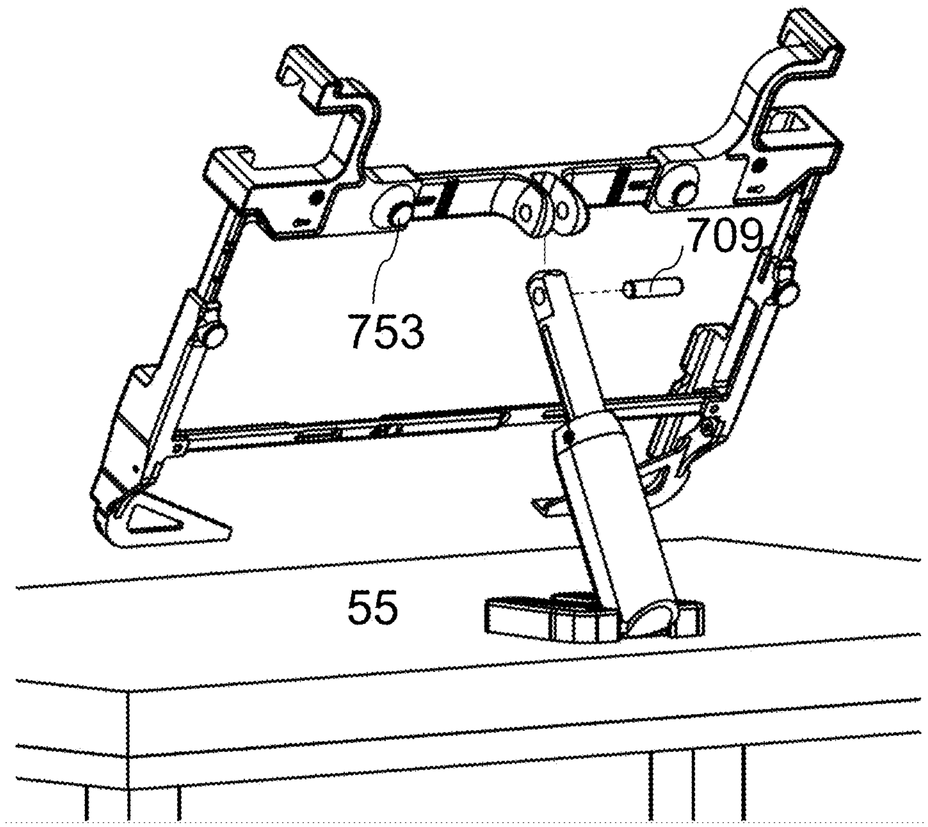
FIG. 39 illustrates a partial exploded view of the embodiment of the security apparatus of FIG. 33.

Referring to FIG. 38, the base 701 includes a base support 702, a first base portion 704 pivotally coupled to the base support 702 and a second base portion 706 moveably coupled to the first base support 704. The second base support 706 further includes a body coupler 705 that is structured to couple to the body 710 of the security apparatus 700. The base support 702 is structured to contact the display fixture 55 and be coupled to the display fixture 55. In an embodiment, the base support 702 is coupled to the display fixture 55 using one or more fasteners. The first base portion 704 is pivotally coupled to the base support 702 and is able to pivot about a pivot axis relative to the base support 702. The first base portion 704 and the second base portion 706 extend along a base assembly axis B. The second base portion 706 is structured to moveably couple to the first base portion 704 such that the second base portion 706 slides relative to the first base portion 704 along the base assembly axis B. When the body 710 is coupled to the base assembly 701, the body 710 is capable of pivoting relative to the body assembly 701 about a pivot axis 709, such as a fastener positioned extending through an opening 708. The body 710 is further structured to move along the base assembly axis B as the second base portion 706 moves relative to the first base portion 704.

Figure 40:
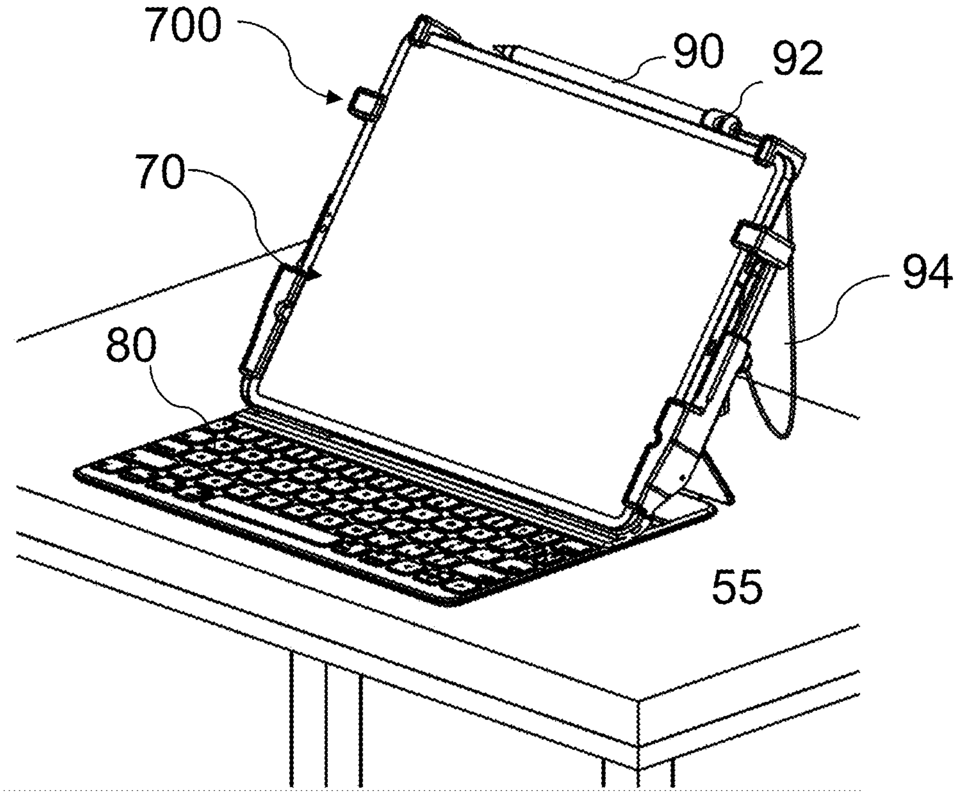
FIG. 40 illustrates a front perspective view of the embodiment of the security apparatus of FIG. 33 securing a portable electronic device.
Figure 41:
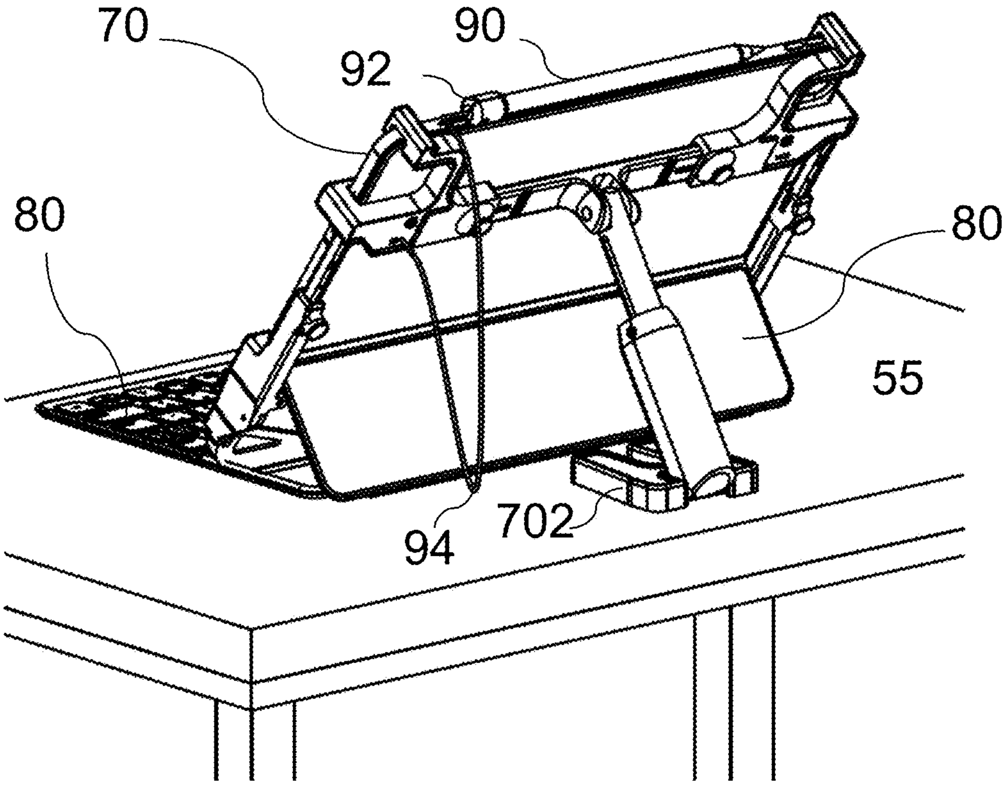
FIG. 41 illustrates a rear perspective view of the embodiment of FIG. 40.
Figure 42:
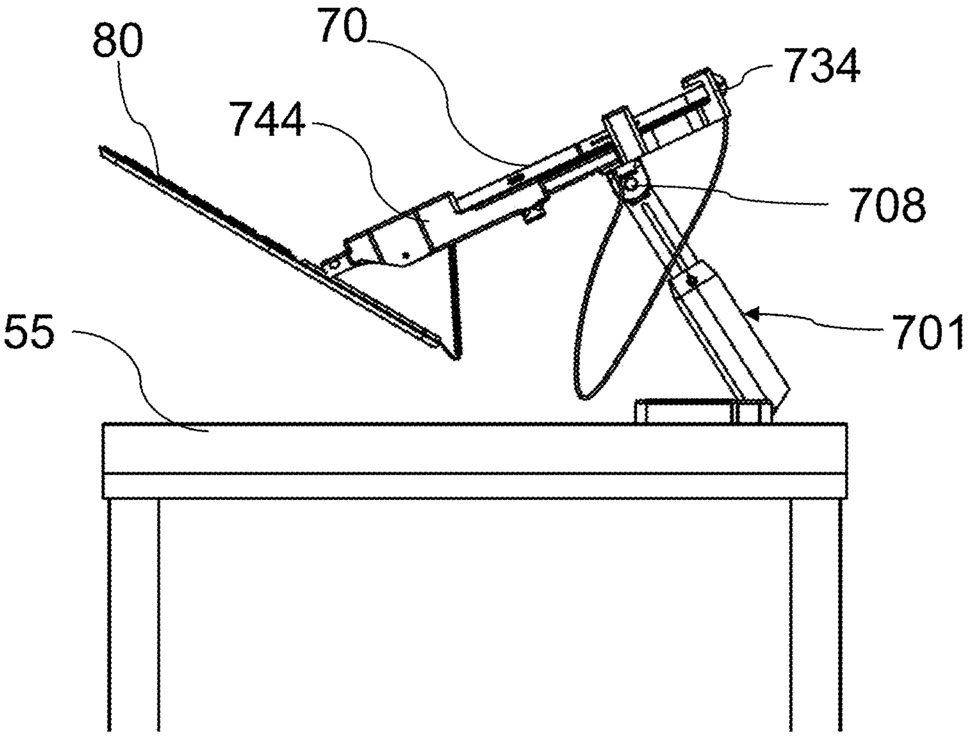
FIG. 42 illustrates a side elevational view of the embodiment of FIG. 40 showing the body of the security apparatus pivoted relative to the base assembly.
Figure 43:
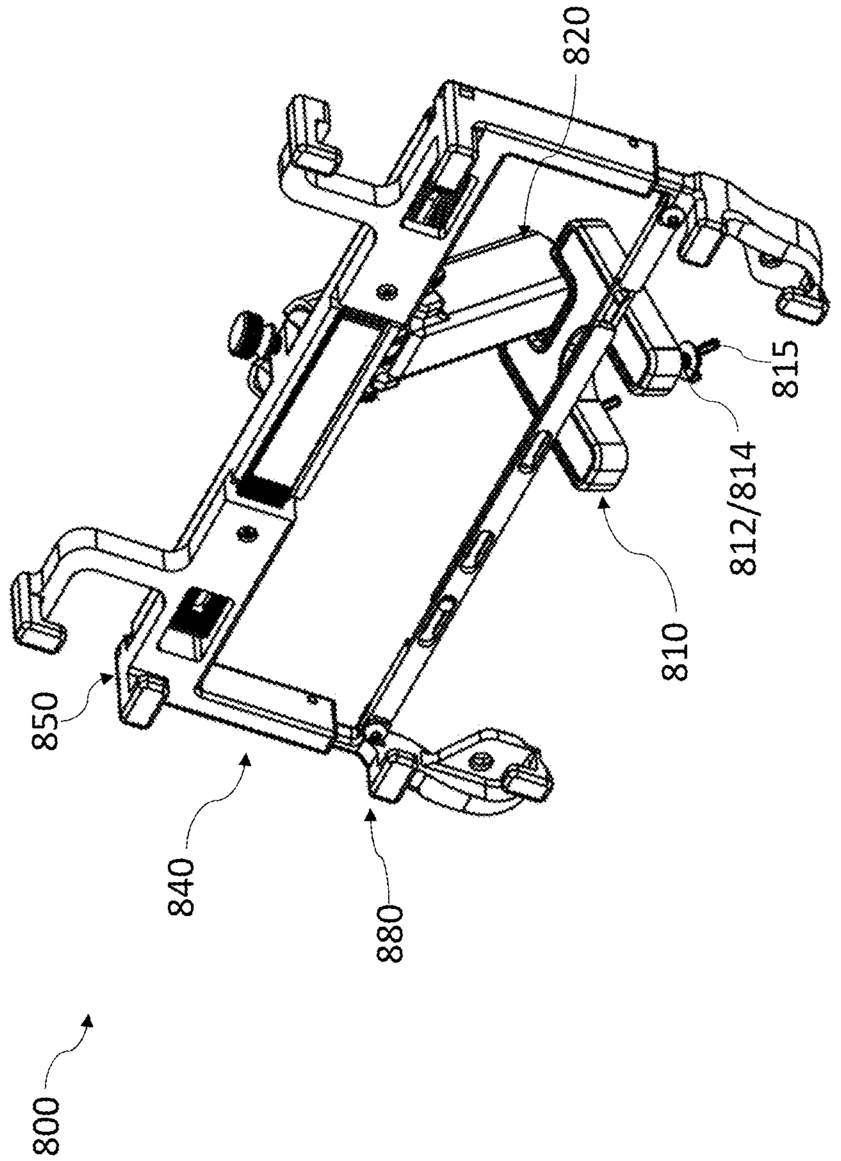
FIG. 43 illustrates a perspective front view of another embodiment of the security apparatus.
Figure 44:
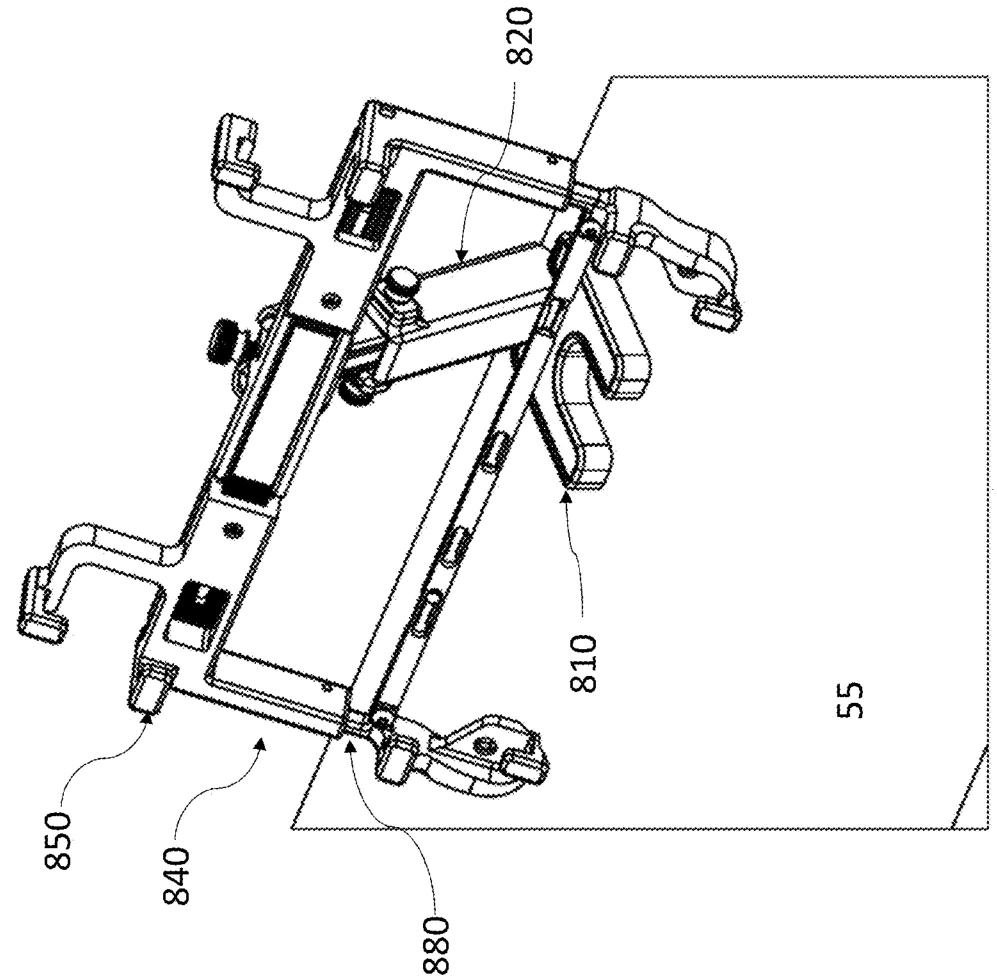
FIG. 44 illustrates the embodiment of the security apparatus of FIG. 43 attached to a display surface.

As shown in FIGS. 40-42, a portable electronic device, such as a tablet 70 with a detachable keyboard 80, may be secured by the security apparatus 700 as will now be explained. When the upper and lower securing members 720, 740 are in the unlocked state, they may be slid towards each other to clamp the tablet 70 and the detachable keyboard 80 within the security apparatus 700 and secure it to the display fixture 55. When the upper and lower securing members 720 are moved towards each other, they retain portions of the tablet 70 and the detachable keyboard 80 via the retaining members 734. Once secured, the upper securing members 720 may be moved to the locked state to inhibit movement of the upper securing members 720 relative to the body support 711 of the body 710. The lower securing members 740 may be moved along the second body axis Q towards or away from the upper securing members 720 to retain another portion of the tablet 70 via the retainer members 744. Once secured, the lower securing members 740 may be moved to the locked state such that they are inhibited from moving along the second body axis Q relative to the body support 714 of the body 710. The base support 702 is secured to a fixed structure such as a wall, floor or display fixture 55. In this manner, the portable electronic device, in this case the tablet 70 and the detachable keyboard 80, is inhibited from being stolen or removed from a display area since it is secured within the security apparatus 700 and the security apparatus 700 is secured to a fixed structure 55. In an embodiment, an accessory, such as a stylus 90, may be fitted with a coupling portion 92 and an anchor 94 that couples the coupling portion 92 to a portion of the security apparatus 700. In this manner, the accessory may be used with the portable electronic device 40 and secured by the security apparatus 600 to inhibit theft of the accessory.

Another embodiment of the security apparatus 800 is shown in FIGS. 43-64, and generally includes a base assembly 810 and a body 840 pivotally coupled to the base assembly 810. The base assembly 810 is configured to be coupled to a display surface 55.

Figure 45:
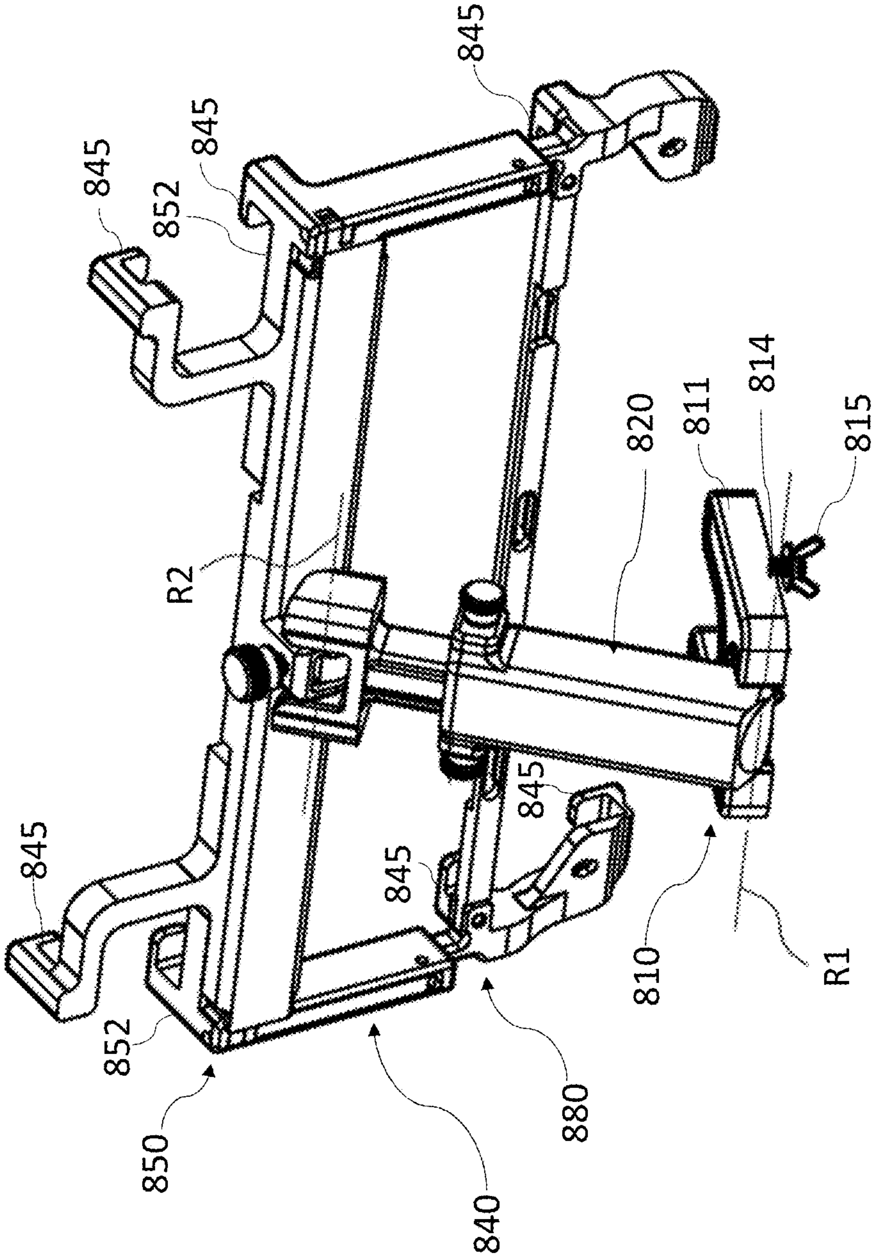
FIG. 45 illustrates a perspective rear view of the embodiment of the security apparatus of FIG. 44.
Figure 46:
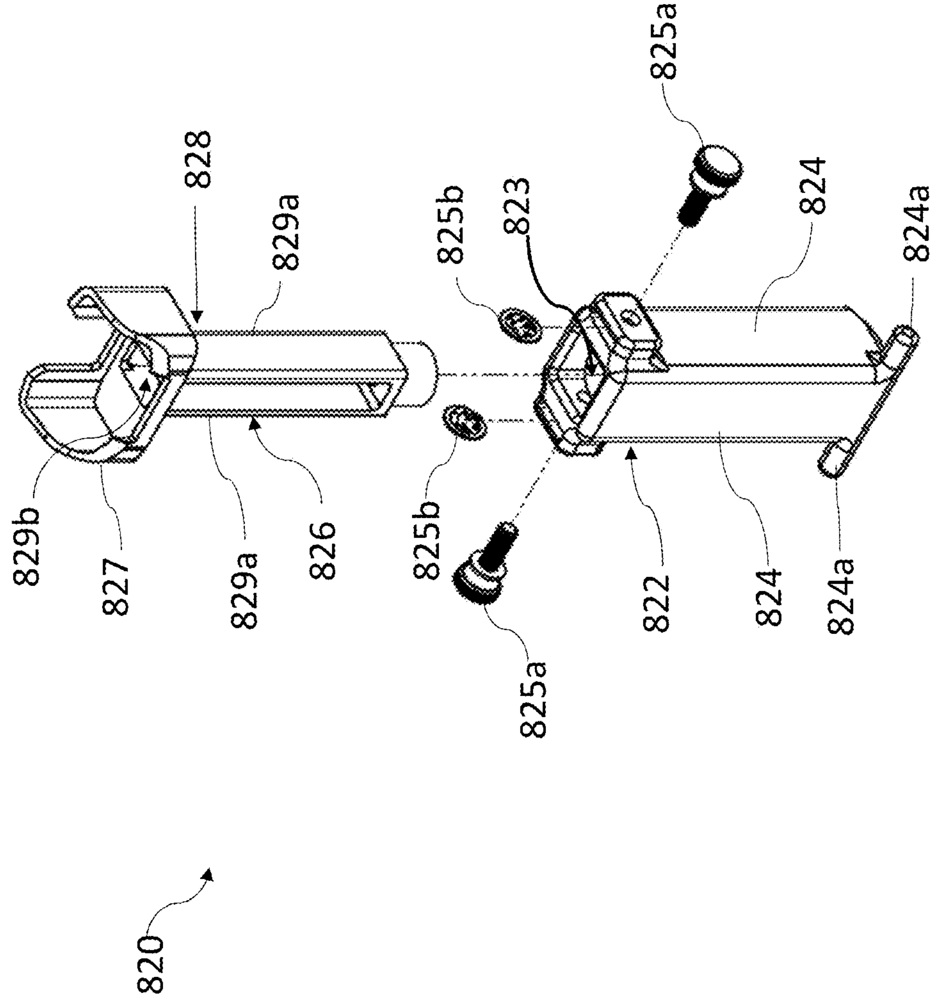
FIG. 46 illustrates an exploded view of an embodiment of a base assembly of the security apparatus of FIG. 43.

Referring to FIGS. 45 and 46, the base assembly 810 includes a base member 811 and a body support assembly 820 pivotally coupled to the base member 811. The base member includes a plurality of securing members 812 structured to secure the base member 811 to the display surface 55. As shown, the securing members 812 include a threaded portion 814 and a locking member 815, such as a wing nut. The body support assembly 820 includes a first body support portion 822 including a plurality of sides 824 surrounding an inner space 823. At least two pivot members 824*a* project from opposing sides 824 and are structured to couple to the base assembly 810. The first body support portion 822 is pivotally coupled to the base 811 and structured to pivot relative to the base 811 about a first pivot axis R1. A second body support 826 includes a first end comprising a seat portion 827 and an opposing second end 828 that is dimensioned to at least partially be inserted into the inner space 823 of the first body support portion 822. The second body support 826 may be coupled to or otherwise attached to the first body support 822 using one or more couplers 825*a*, 825*b* such as fasteners and backings. As shown, the second body support 826 may be structured to slide relative to the first body support portion 822. Once the desired position of the second body support 826 is reached, the one or more couplers 825*a*, 825*b* may act inhibit the sliding movement of the second body support 826 relative to the first body support portion 822. The second body support portion 826 further includes a plurality of sides 829*a* that surround an inner space 829*b*.

Figure 47:
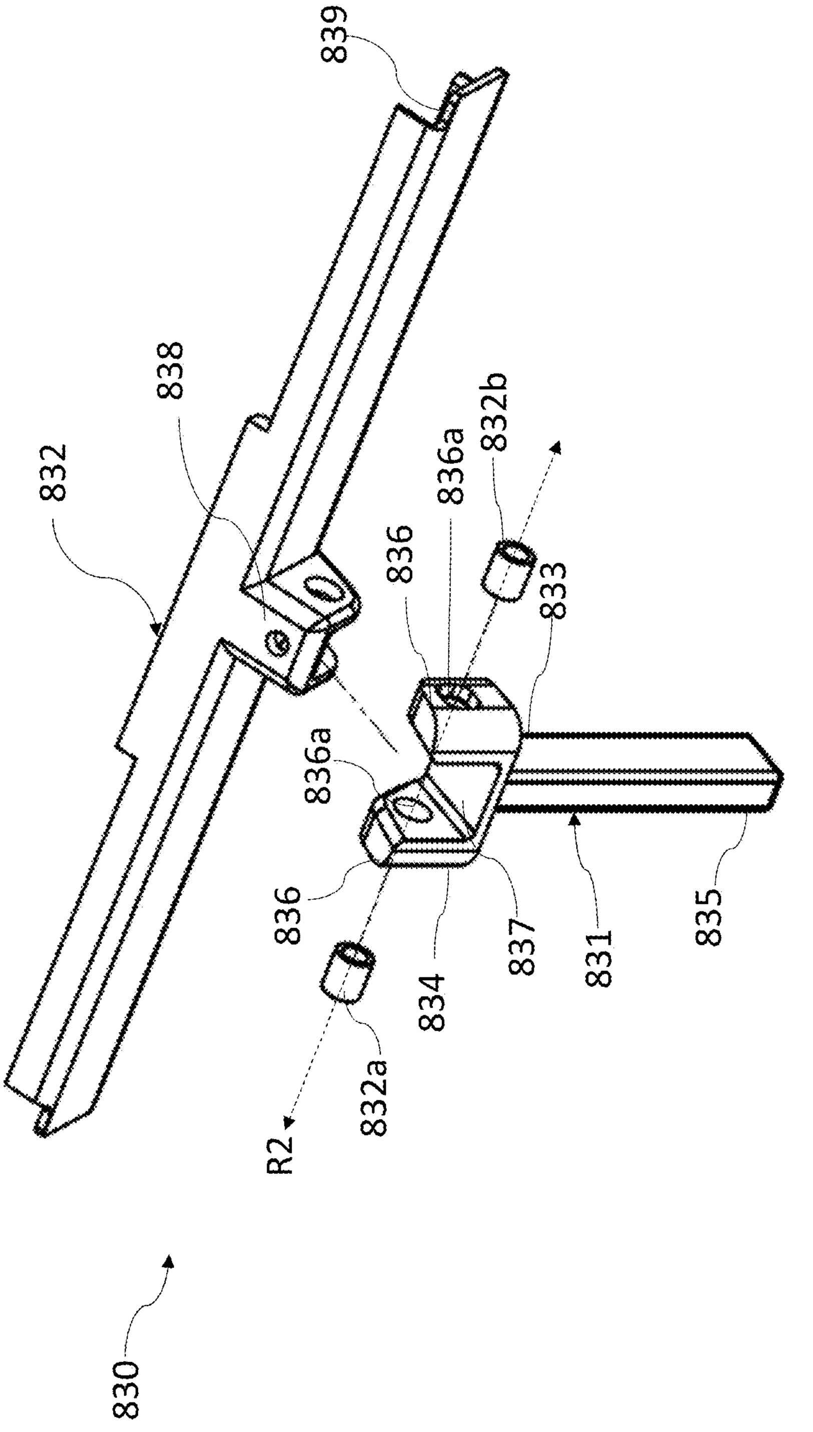
FIG. 47 illustrates another exploded view of an embodiment of the base assembly of the security apparatus of FIG. 43.
Figure 48:
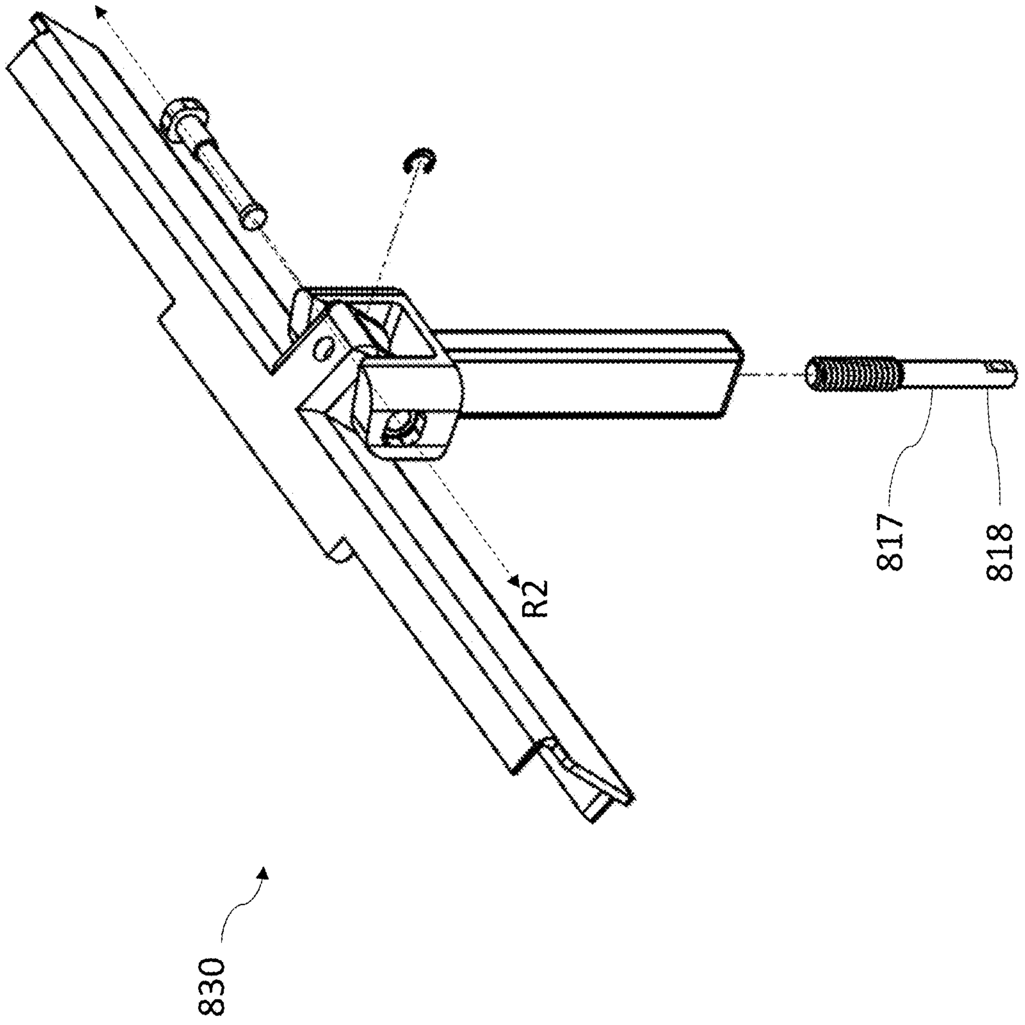
FIG. 48 illustrates a perspective view of a portion of the base assembly in a partially assembled state.
Figure 49:
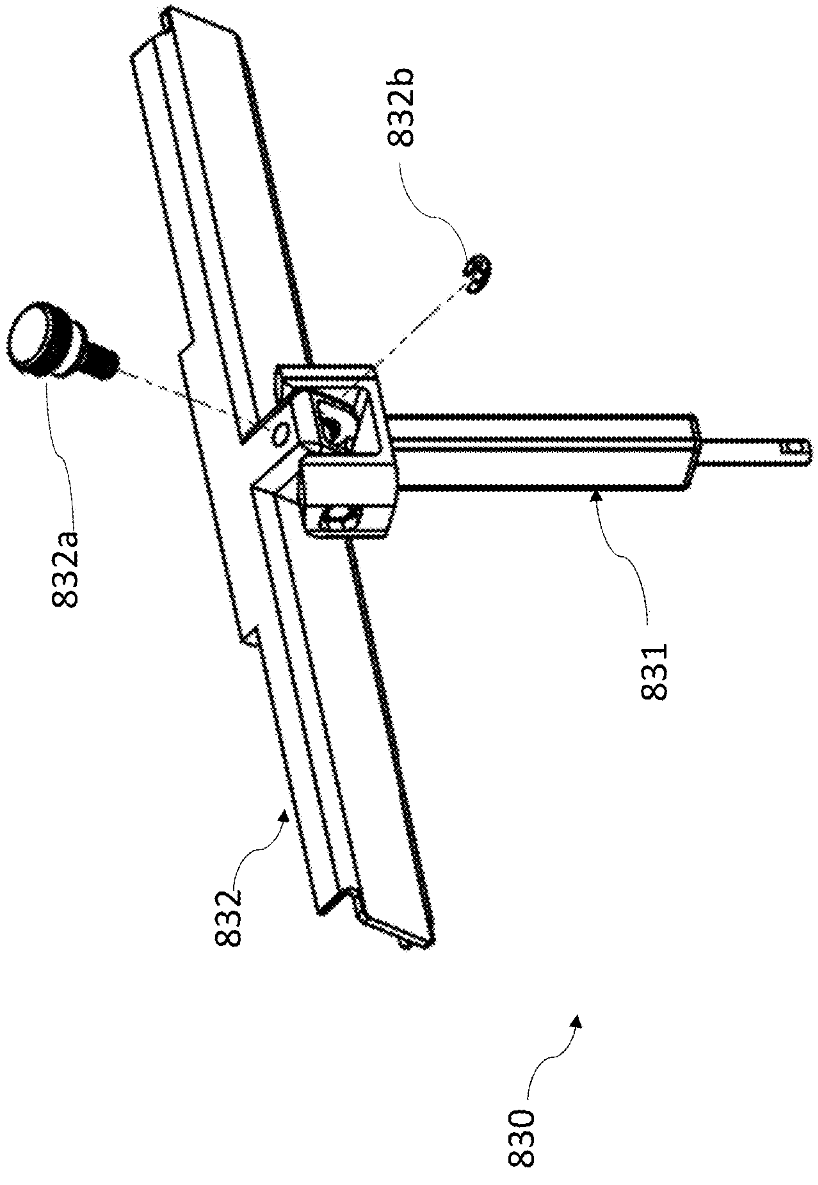
FIG. 49 illustrates another perspective view of a portion of the base assembly in a partially assembled state.

Turning to FIGS. 47-49, a body coupler 830 a first body coupler portion 831 with a first end 833 that includes a mount 834 and an opposing second end 835 that is structured to at least partially fit within the inner space 829*b* of the second body support 826. The mount 834 includes two mount sides 836 and a mount surface 837 that extends between the mount sides 836. Each of the mount sides 836 defines an opening 836*a* that extends through the mount side 836. A second body coupler portion 832 includes a mounting portion 838 that is structured to couple to the mount 834 of the first body coupler portion 831 and a coupling portion 839 configured to couple to a portion of the body 840.

Figure 50:
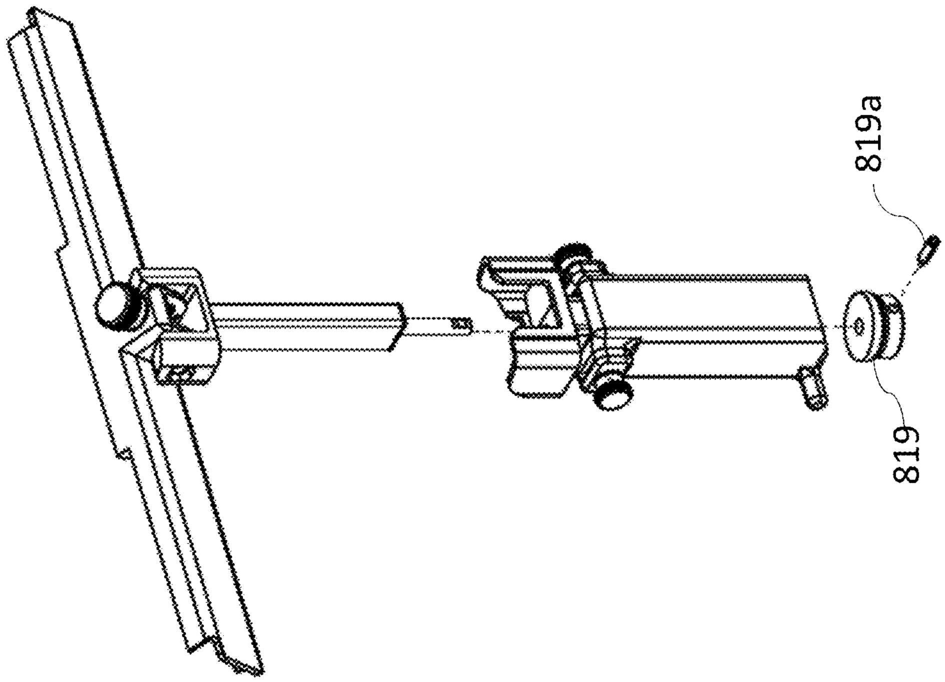
FIG. 50 illustrates another perspective view of a portion of the base assembly in a partially assembled state.

In order to assemble the body support assembly 820, The second body support portion 826 is inserted into the inner space 823 of the first body support portion 822. The second body support portion 826 is coupled to the first body support portion 822 via the one or more couplers 825*a*, 825*b* such that the second body support portion 826 is inhibited from moving relative to the first body support portion 822. An anchor 817 is coupled to the second end 835 of the first body coupler portion 831. In an embodiment, the anchor 817 is threadably coupled to the second end 835 of the first body coupler portion 831. The free end 818 of the anchor 817 is structured to insert into an anchoring element 819 and be secured to the anchoring element 819 by an anchor member 819*a*. As shown in FIG. 50, the anchor member 819*a* traverses the free end 818 of the anchor 817. As shown in FIG. 47, the second body coupler portion 832 is pivotally coupled to the first body coupler portion 831 with one or more couplers 832*a*, 832*b* such that the second body coupler 832 is free to pivot about a second pivot axis R2. The first body support portion 822 is pivotally coupled to the base 811 via the at least two pivot members 824*a*.

Figure 51:
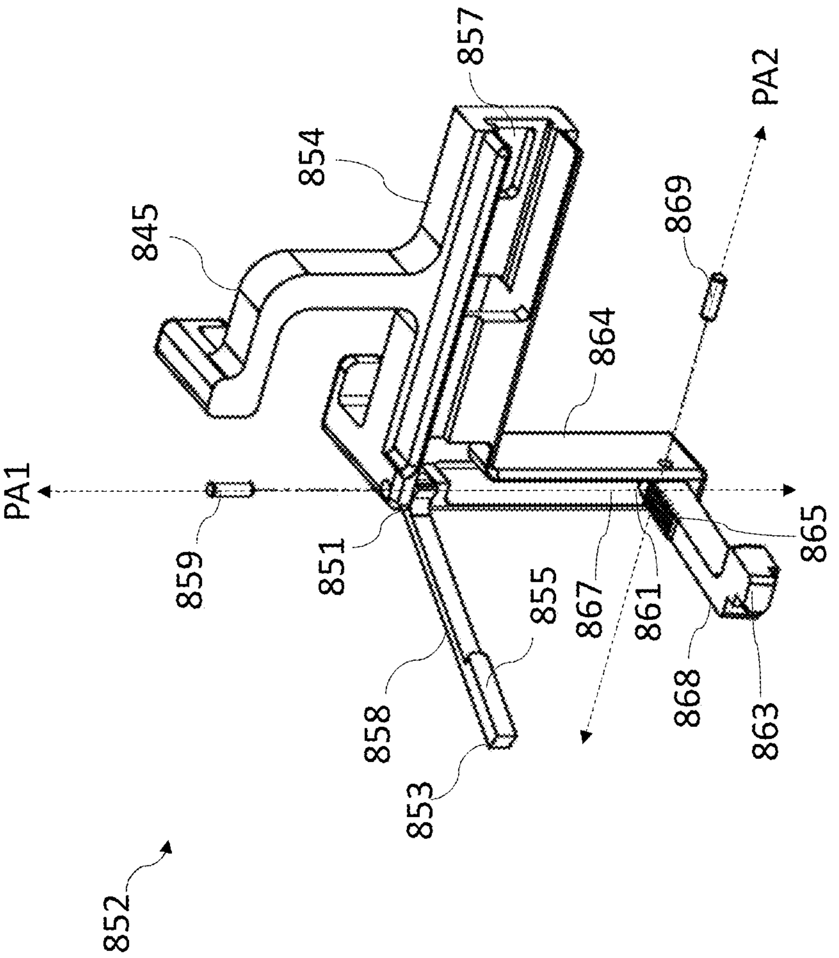
FIG. 51 illustrates a perspective rear view of an embodiment of a retainer of a first body portion of the embodiment of the security apparatus of FIG. 43.
Figure 52:
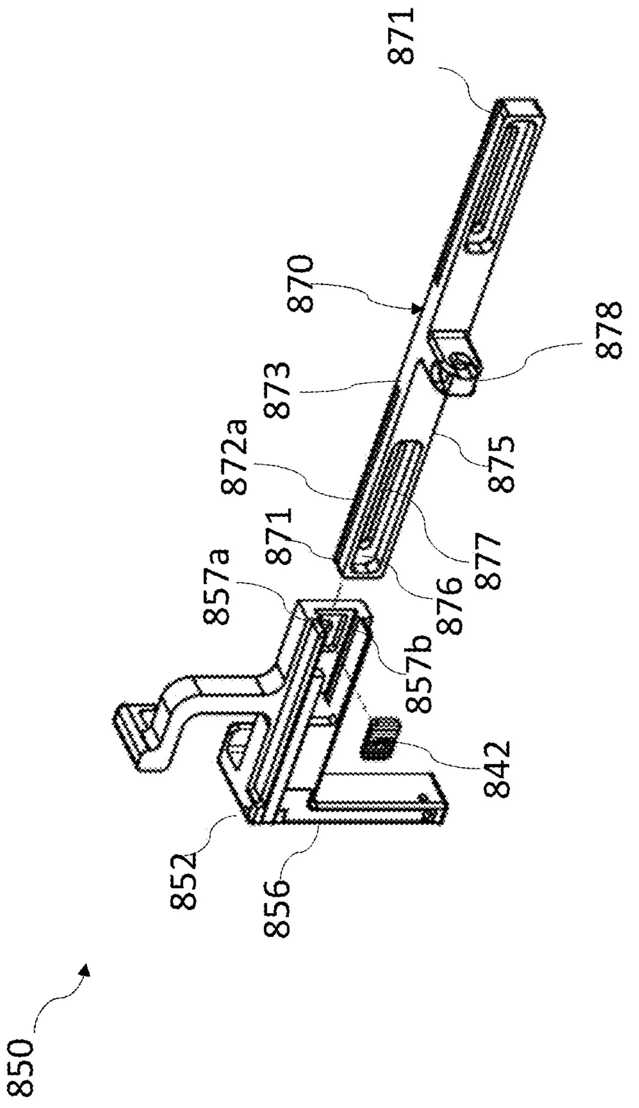
FIG. 52 illustrates a perspective rear, exploded view of a portion of the first body portion including the retainer of FIG. 51 and an embodiment of a first body support.
Figure 53:
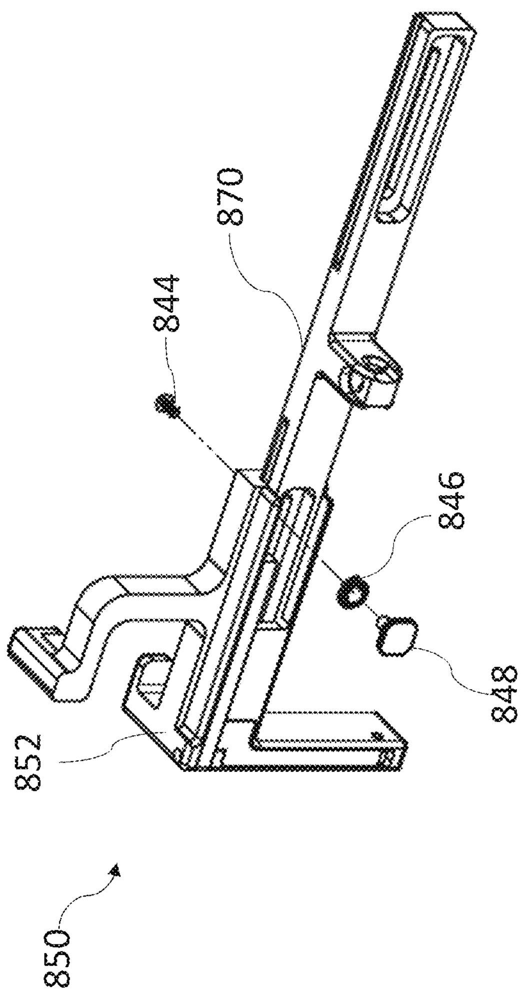
FIG. 53 illustrates the embodiment of FIG. 52 in a partially assembled state.

Turning to FIGS. 51-53, the body 840 includes a first body portion 850 and a second body portion 880 that is adjustably coupled to the first body portion 850. In an embodiment, the first body portion 850 is coupled to the second body portion 880 by means of a multi-lever latching system, which will be explained in greater detail below. Referring to FIGS. 45 and 51, the first body portion 850 includes two retainers 852 each including a first retainer portion 854 and a second retainer portion 864. The first retainer portion 854 defines a first space or first channel 857 that extends away from the second retainer portion 856 and includes a top guide element 857*a* and a bottom guide element 857*b*. The first channel 857 includes one or more engagement members 842 positioned between the top and bottom guide elements 857*a*, 857*b*. A first securing member 858 is pivotally coupled to the retainer 852 using at least one coupler or pivot member 859 and configured to pivot about a first pivot axis PA1. The first securing member extends from a first end 851 that is pivotally coupled to the retainer 852 to a second end 853. As shown in FIG. 51, the second end 853 includes a retaining member 855 that protrudes from the first securing member 858. The second retainer portion 864 defines a second space or channel 867 that extends away from the first retainer portion 854. A second securing member 868 is pivotally coupled to the retainer 852 using at least one coupler or pivot member 869 and configured to pivot about a second pivot axis PA2. As shown, the second pivot axis PA2 intersects the first pivot axis PA1. The second securing member 868 extends from a first end 861 that is pivotally coupled to the retainer 852 to a second end 863. As shown in FIG. 51, the second end 863 of the second securing member 868 includes a retaining member 865 that protrudes from the first securing member 858.

The first body portion 850 further includes a first body portion support 870 extending between support ends 871. As shown in FIGS. 52 and 53, the support ends 871 are substantially identical, so only one of the support ends 871 will be described in detail. Of course in other embodiments the support ends 871 may be configured differently from each other. The first body portion support includes a top surface 873*a*, an opposing bottom surface 873*b*, a first side surface 875*a*, such as a forward facing side, and a second side surface 875*b*, such as a rearward facing surface.

The top and bottom surfaces 873*a*, 873*b* includes a top guide 872*a* and a bottom guide (not shown), that extend from the support end 871 towards a midpoint between the support ends 871. At least one of the first side surface 875*a* and the second side surface 875*b* includes at least one recess 876 that extends from an area near the support end 871 towards the midpoint between the support ends 871. The at least one recess 876 defines an elongated opening 877 that extends between the first and second side surfaces 875*a,* 875*b*. An anchor member 878 may be positioned at or near the midpoint of the of the same side surface 875*a,* 875*b* as the at least one recess 876.

Assembly of the first body portion will now be discussed with reference to FIGS. 51-53. The support end 871 is inserted into the first channel 857 of the first body portion 850 of the retainer 852. The top guide 872*a* engages with the top guide element 857*a* of the first channel 857 and the bottom guide (not shown) of the support end 871 engages the bottom guide element 857*b* such that the first body portion support 870 can slide relative to the retainer 852. A fastener 844 extends through the elongated opening 877 and a portion of the first body portion 850 to couple the first body portion support 870 to the first body portion 850. In an embodiment, the fastener 844 and includes a spring 846 loaded depression element 848.

Depression of the spring loaded depression element 848 when the first body portion support 870 is inserted into the first channel 857 and coupled to the first body portion 850 causes the one or more engagement members 842 engage the first body portion support 870 to enable a sliding movement in a first direction and inhibit a sliding movement in a second direction. In an embodiment, the first direction is a sliding movement toward the retainer 852 and the second direction is in an opposing direction. When the spring loaded depression element 848 is released, the first body support portion 870 is enabled to move in both the first and second directions. A second retainer 852 is installed on the opposing support end 871 in a similar manner as was just described. Once the desired distance between the two retainers 852 is reached, the first securing member 858 on each retainer 852 is pivoted from the open position shown in FIG. 51 to the closed position shown in FIG. 53 such that the retaining member 855 acts to depress the spring loaded depression element 848.

Figure 54:
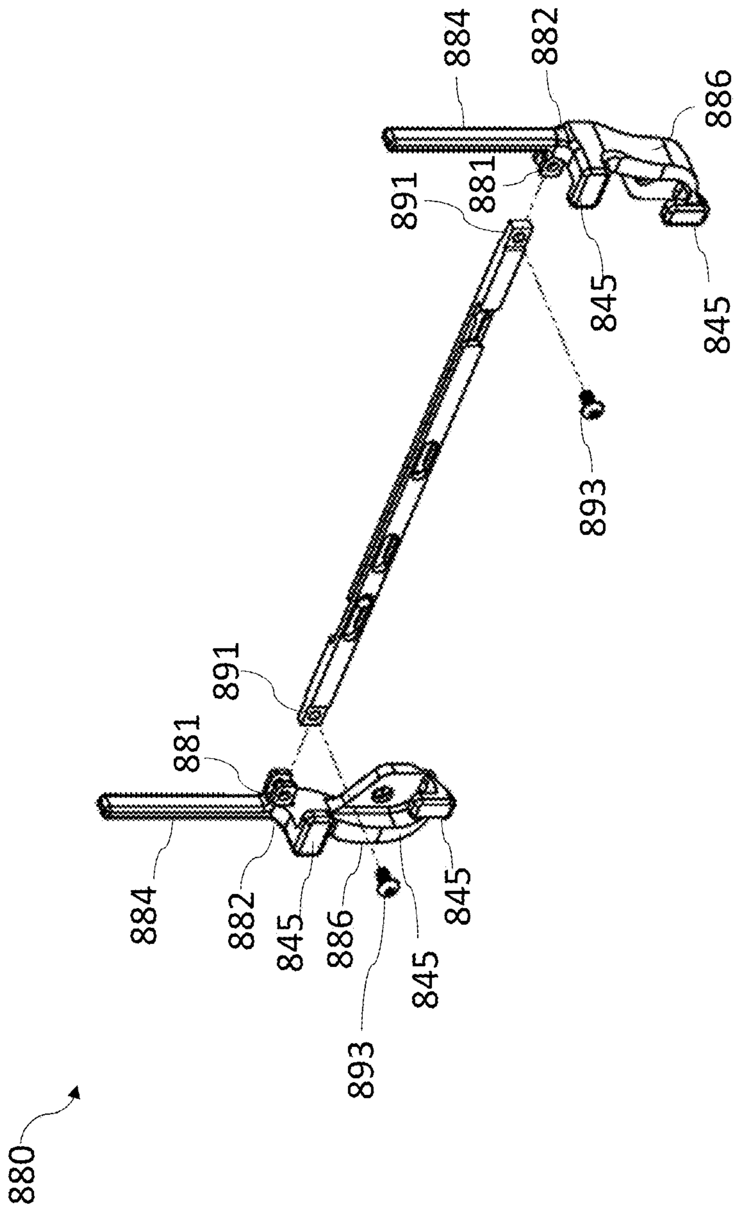
FIG. 54 illustrates an exploded perspective front view of an embodiment of a second body portion of the security apparatus of FIG. 43.
Figure 55:
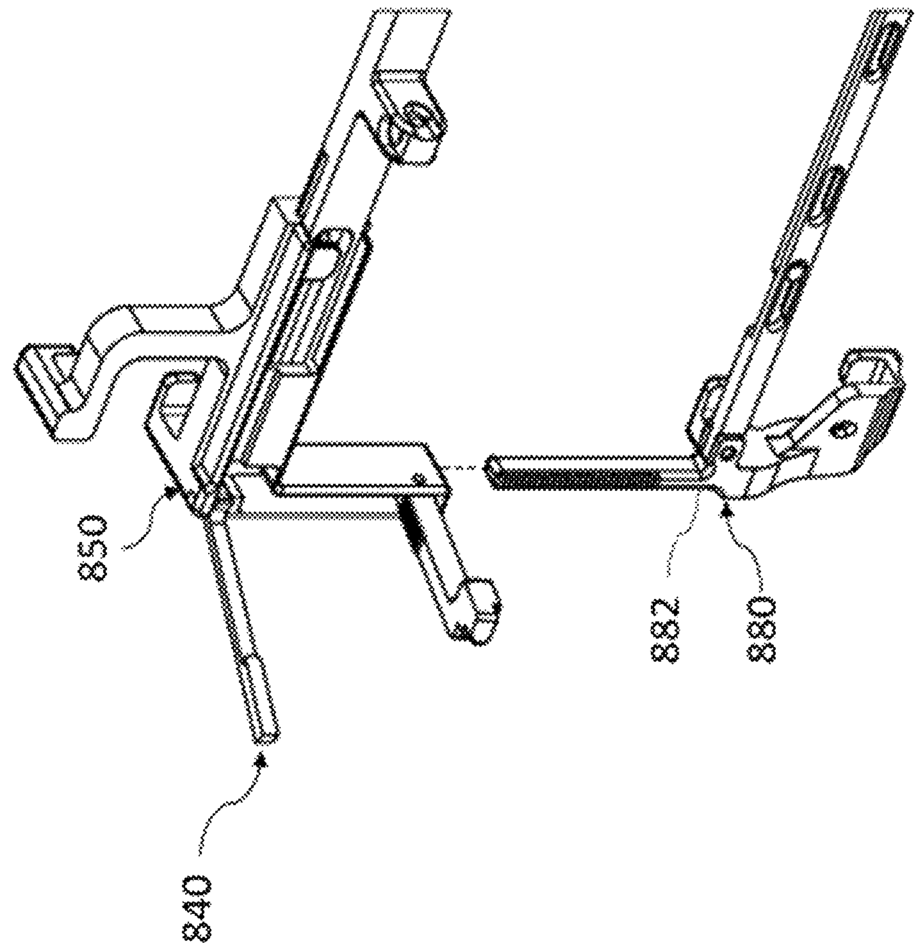
FIG. 55 is a perspective rear view of a portion of the first body portion being mated with a portion of the second body portion.

Referring to FIGS. 54 and 55, the second body portion 880 includes a body portion element 882 that is configured to couple to the retainer 852 of FIG. 51. Since the body 840 typically includes two similar retainers 852 as shown in FIG. 45, two similar body portion elements 882 will also be included, however this discussion will only describe a single body portion element 882 and the coupling of a single retainer 852 with a single body portion element 882. The body portion element 882 includes a mating portion 884 and a retaining portion 886 that includes one or more retaining elements 845 (see FIG. 45).

Still referring to FIGS. 54 and 55, the second body portion 880 includes a second body support portion 890 extends between second support ends 891. Each second support end 891 is structured to couple to the second body portion 880 at a support coupler 881 using one or more fasteners 893. As shown, the second body support portion 890 may be adjustable such that the second support ends 891 can be moved closer together or farther apart in order to adjust the width dimension of the body to accommodate portable electronic devices of varying widths. In an embodiment, the width may be adjustable from about 9.375 inches to 13 inches.

Figure 56:
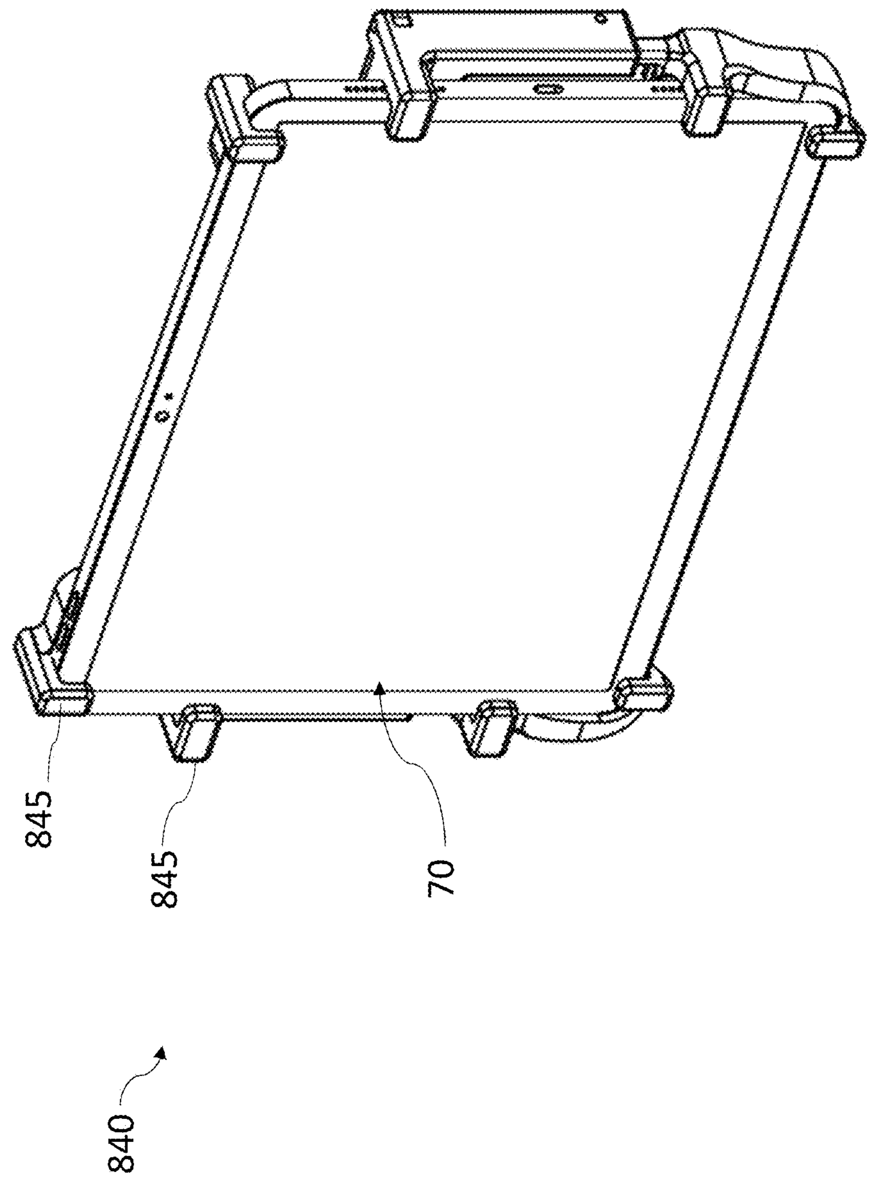
FIG. 56 illustrates a perspective front view of an assembled body of the security apparatus of FIG. 43 securing a portable electronic device.
Figure 57:
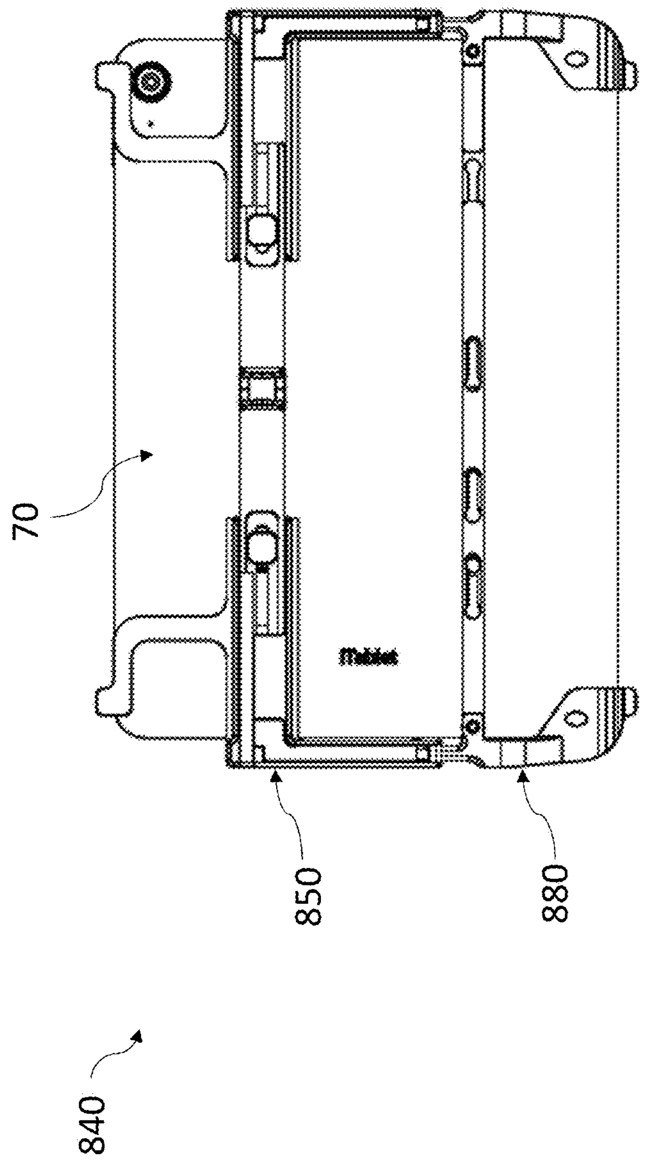
FIG. 57 illustrates a rear view of the embodiment of FIG. 56.
Figure 58:
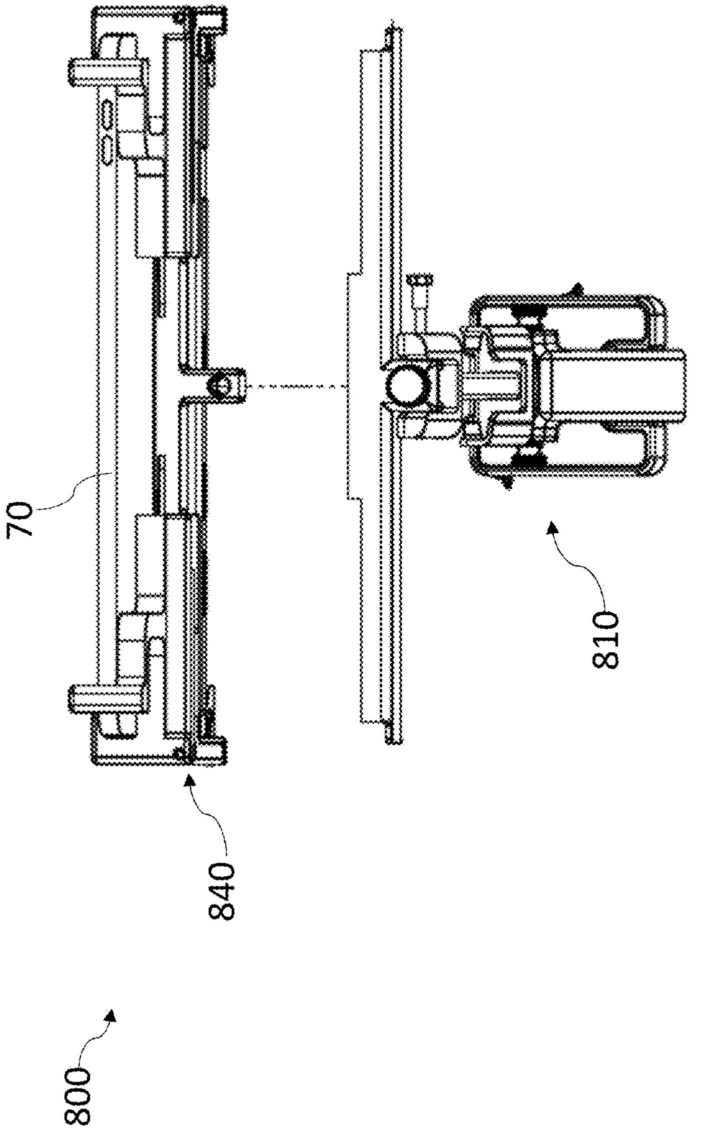
FIG. 58 illustrates an exploded perspective top view of the base assembly and the body of FIG. 56.
Figure 59:
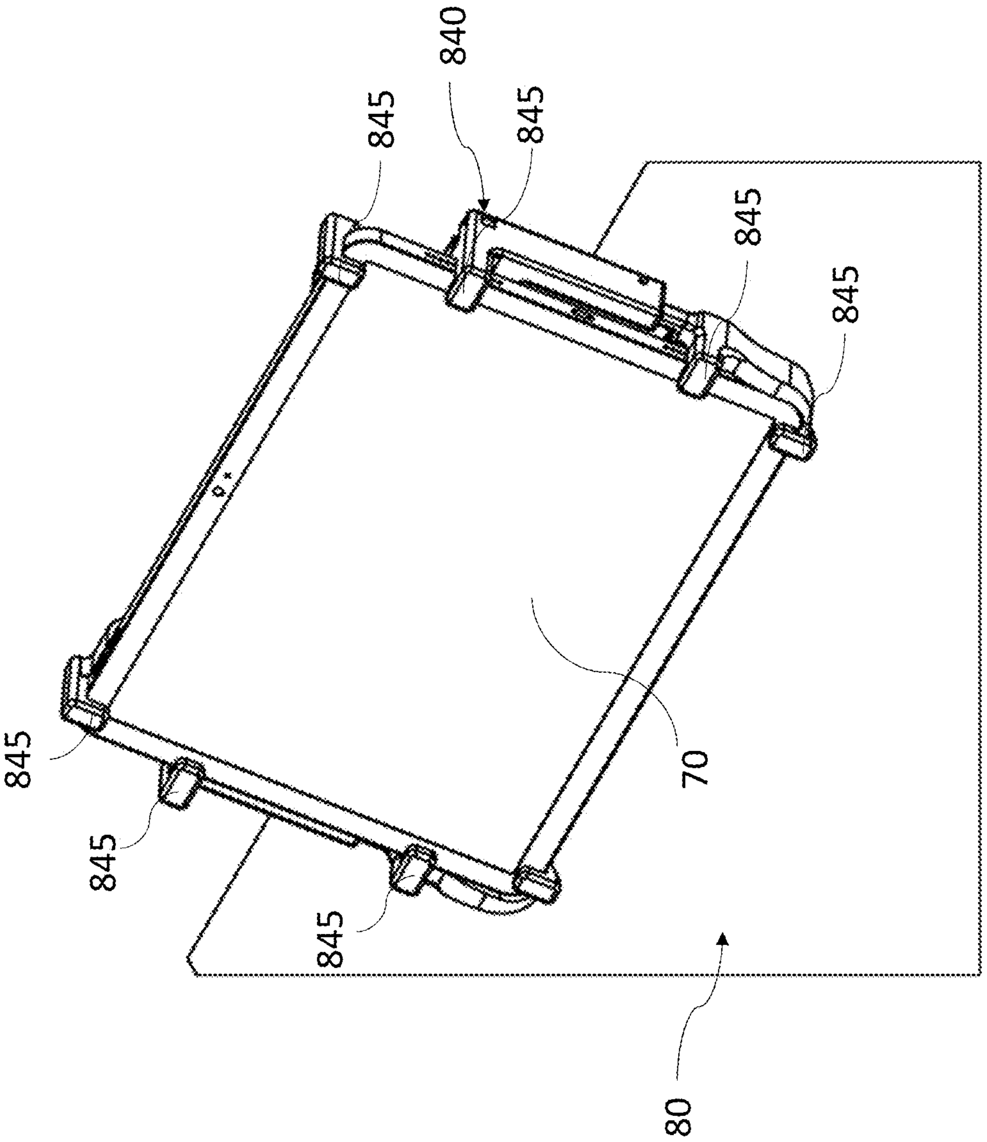
FIG. 59 illustrates a top perspective view of the embodiment of FIG. 58 in an assembled state.
Figure 60:
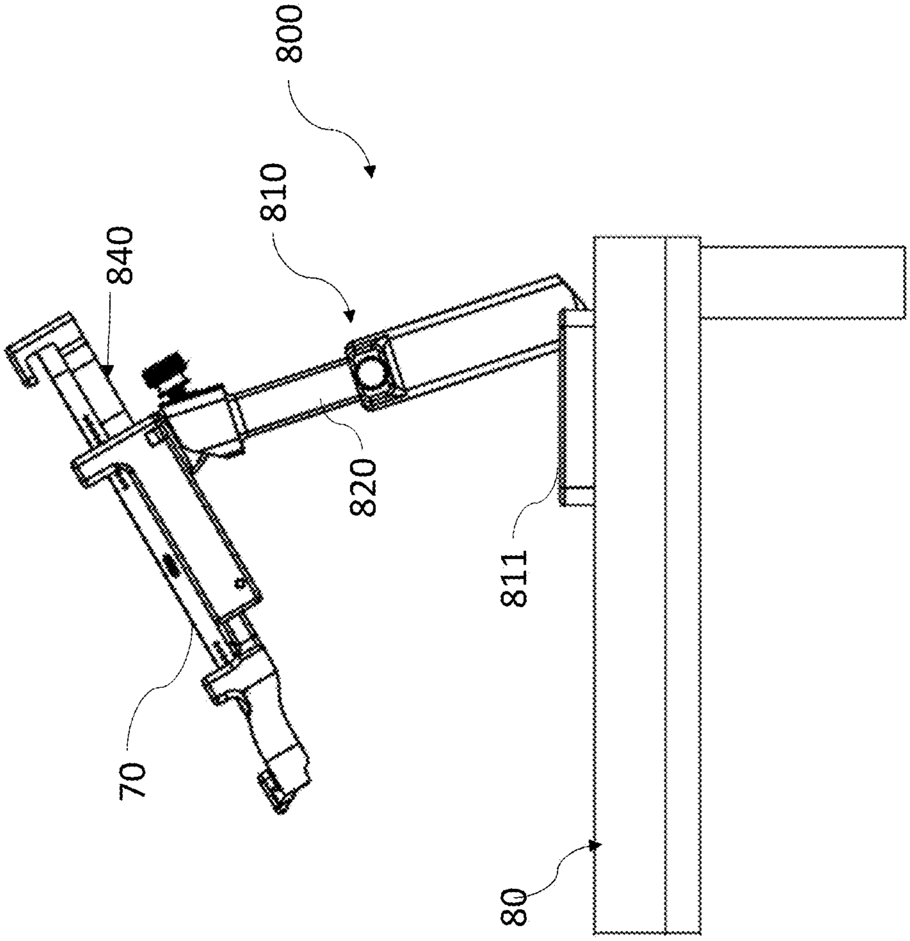
FIG. 60 illustrates a side elevational view of the embodiment of FIG. 59.
Figure 61:
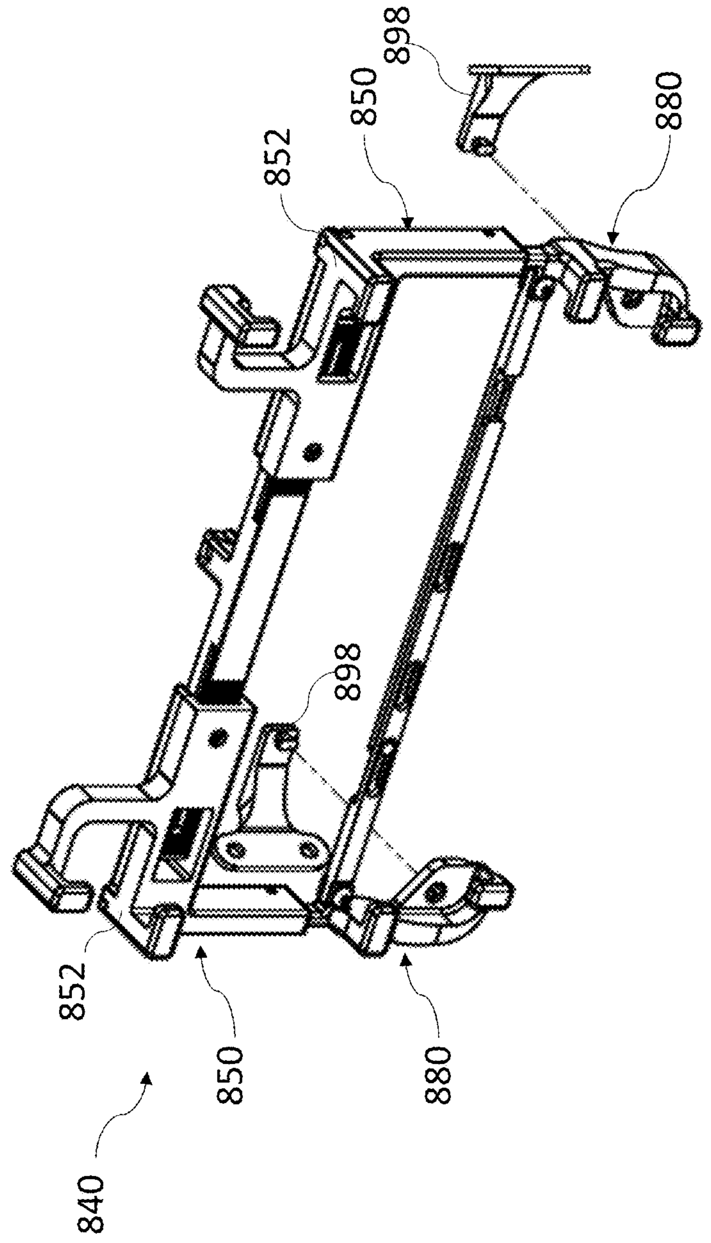
FIG. 61 illustrates a front perspective view of the embodiment of the security apparatus of FIG. 43 in a modified state.
Figure 62:
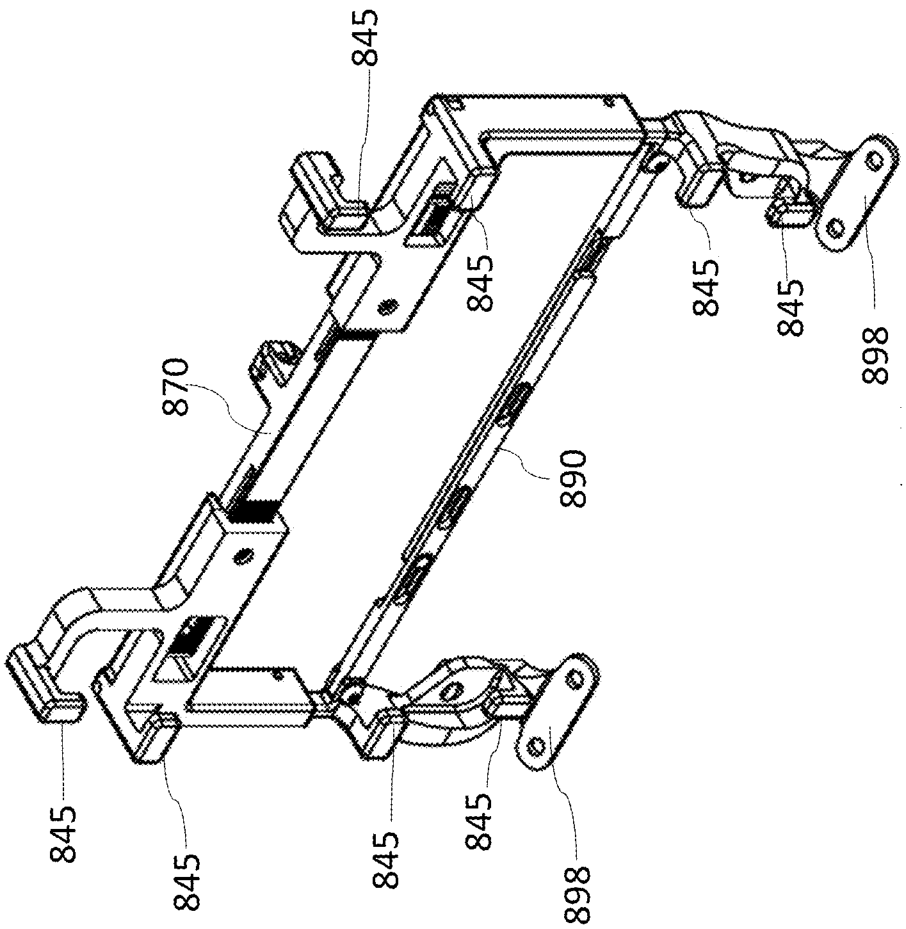
FIG. 62 illustrates a front perspective view of the embodiment of the security apparatus of FIG. 43 in a modified state.
Figure 63:
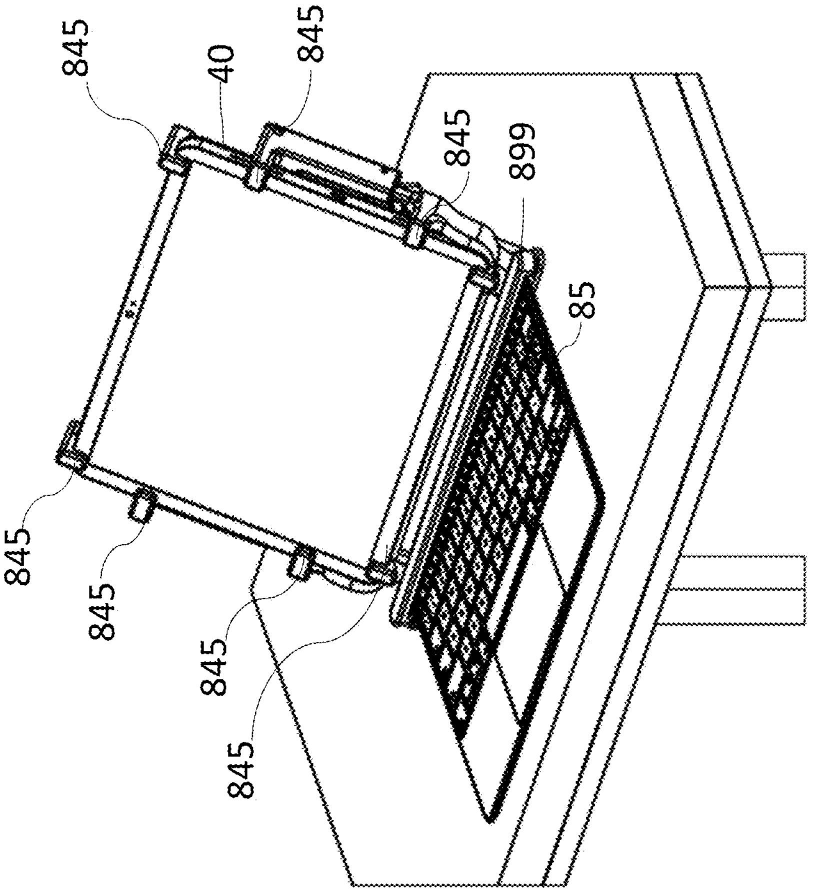
FIG. 63 illustrates a front perspective view of the modified security apparatus of FIG. 62 securing a portable electronic device.
Figure 64:
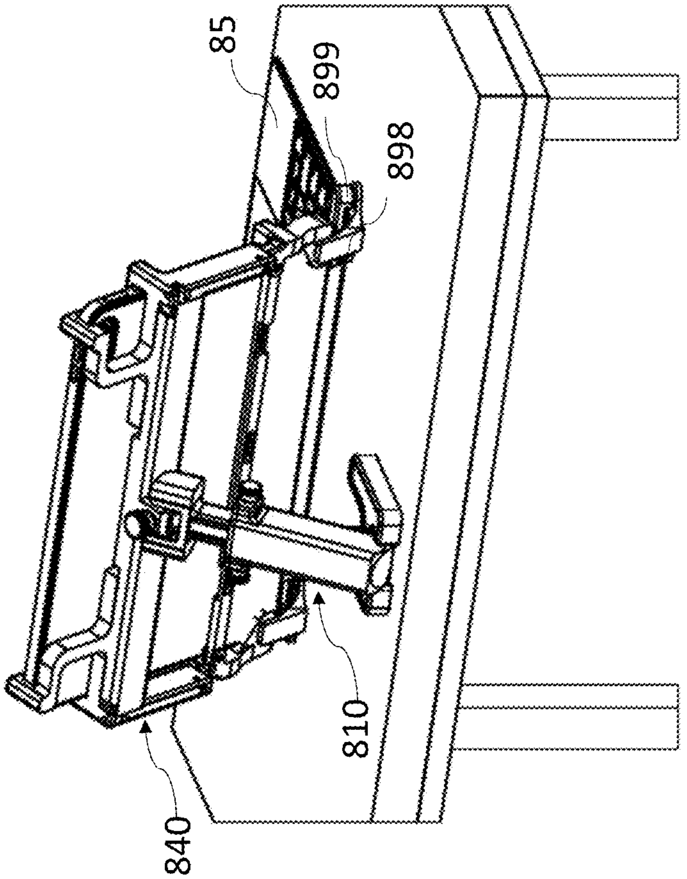
FIG. 64 illustrates a rear perspective view of the embodiment of FIG. 63.
Figure 65:
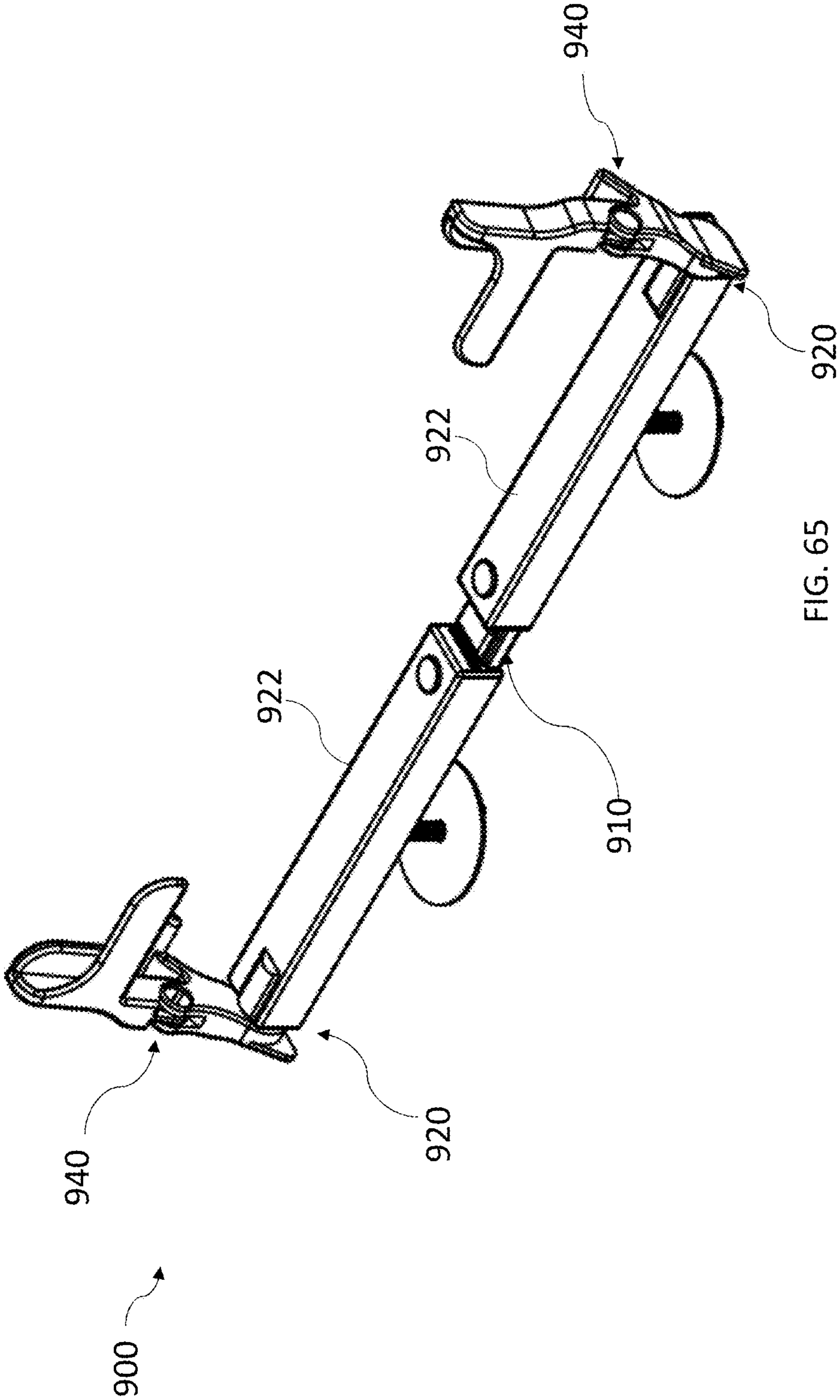
FIG. 65 illustrates a top perspective view of another embodiment of a security apparatus.

Referring to FIGS. 51, 55, 56, the securing of a portable electronic device in the In order secure a portable electronic device 40 in the security apparatus 800, the distance between the two retainers 852 is set to correspond to the width of the portable electronic device 40, such as a tablet 70. A first end of the tablet is inserted into the first body portion 850 such that the retaining members 845 retain a portion of the tablet 70. The mating portions 884 of the second body portion 880 are inserted into the second channels 867 of the first body portion 850. Once the second end of the portable electronic device 40 is captured by the retaining members 845 of the second body portion 880, the second securing member 868 is pivoted along the second pivot axis PA2 from the open or unlocked position shown in FIGS. 51 and 55 into the closed or locked position shown in FIGS. 53 and 57. When the second securing member 868 is in the locked position, the retaining member 865 interacts with the mating portion 884 to enable a sliding movement of the second body portion relative to the first body portion 850 in a first direction while inhibiting a sliding movement of the second body portion relative to the first body portion in a second direction. The sliding movement of the first body portion 850 relative to the second body portion 880 enables the height (or length) dimension of the body 840 to be adjustable from about 6.75 inches to about 8.5 inches to accommodate portable electronic devices of varying heights (or lengths). In an embodiment, the first direction represents a sliding movement of the body portion element 882 towards the retainers 852 and the second direction represents a sliding movement away from the retainers 852. The body 840 may then be pivotally coupled to the base assembly 810 as shown in FIGS. 58-60 and secured to a display fixture, or an anchor (not shown), such as a tether, may be coupled to the anchor member 878 at one end and then secured to the display fixture at an opposing end.

Referring to FIGS. 61-64, one or more accessory securing elements 898, 899 may be coupled to the second body portion 880 in order to configure the security apparatus 800 to secure an accessory for a portable electronic device, such as a detachable keyboard accessory 85. As shown, a first accessory securing element 898 may act as a support element and the second accessory securing element 899 may act as a clamping element to secure a portion of the detachable keyboard accessory 85 between the first securing element 898 and the second securing element 899. In this manner, the detachable keyboard accessory 85 is inhibited from being detached from the portable electronic device 40 while the portable electronic device 40 is secured the security apparatus 800.

Another embodiment of a security apparatus 900 is shown in FIGS. 65-80. This embodiment of the security apparatus 900 generally includes a base 910 or support and two or more body members 920 that are configured to slidably couple to the base 910.

Figure 66:
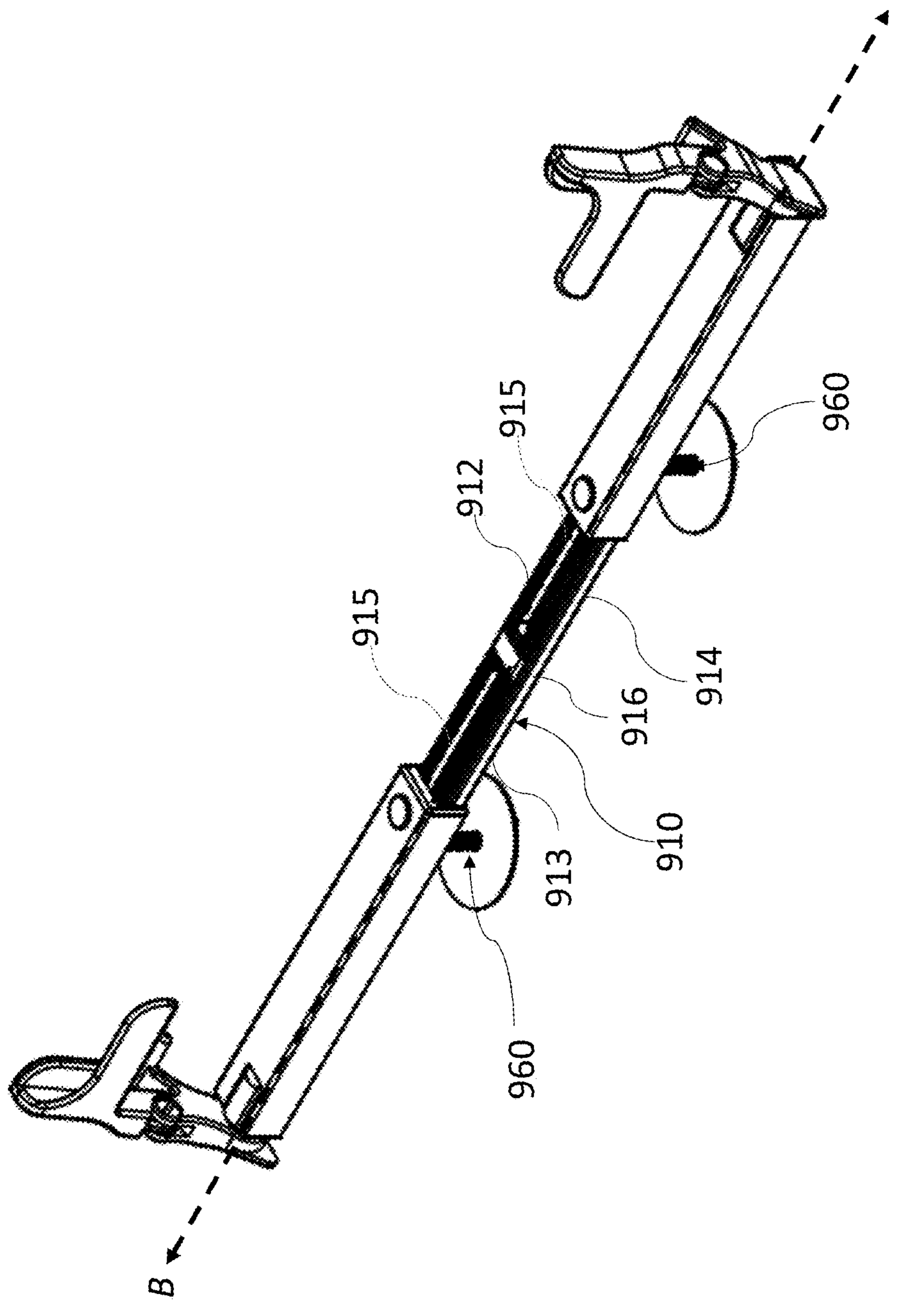
FIG. 66 illustrates another top perspective view of the embodiment of the security apparatus of FIG. 65.
Figure 67:
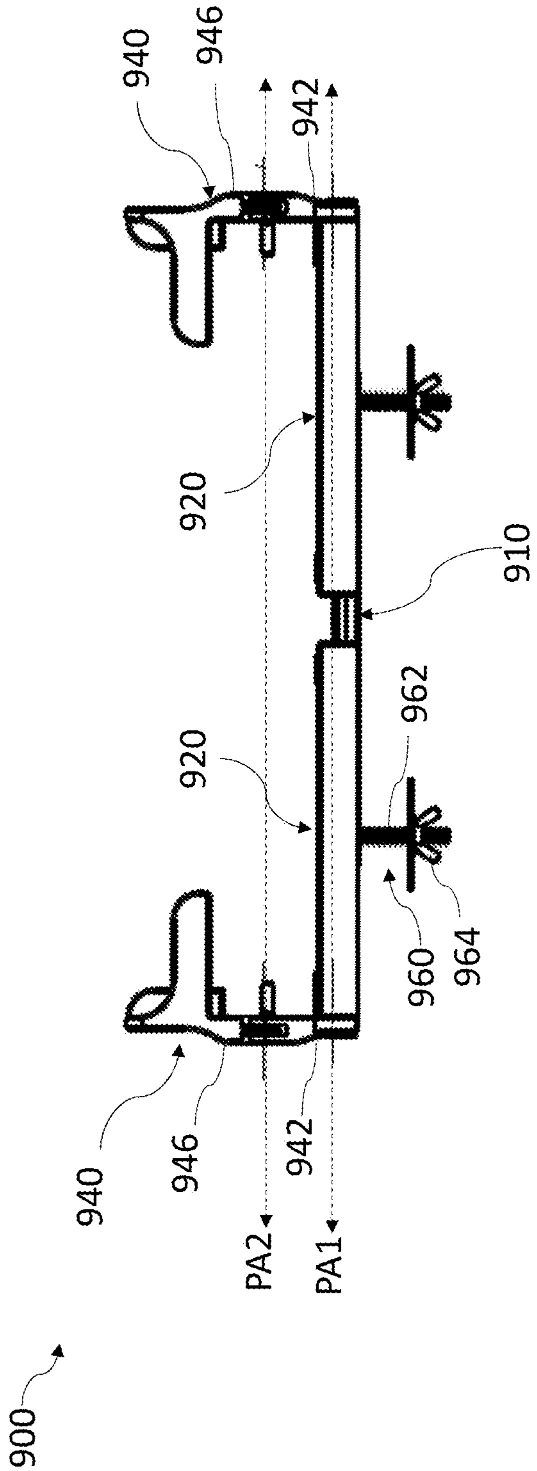
FIG. 67 illustrates a front view of the embodiment of FIG. 65.
Figure 68:
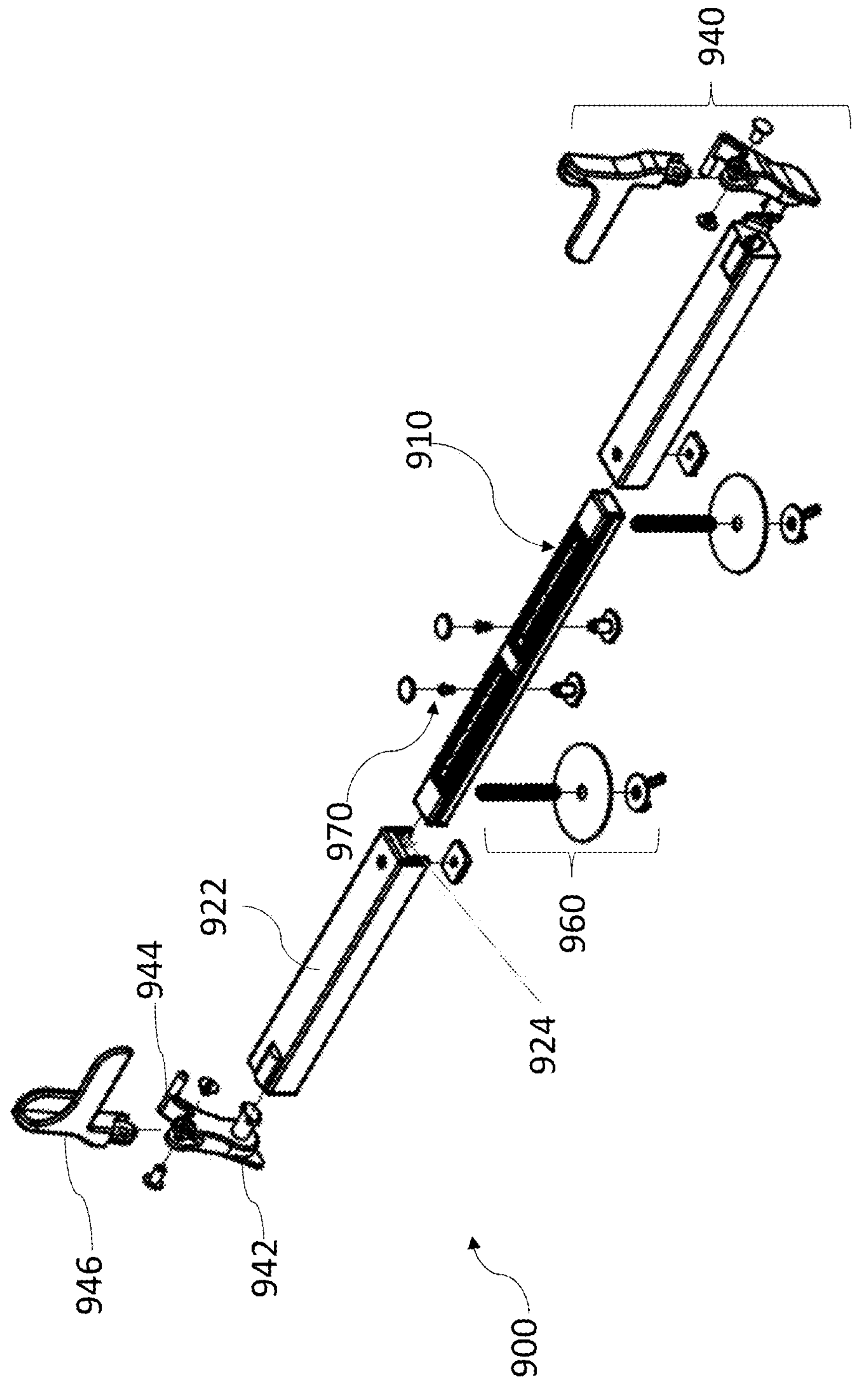
FIG. 68 illustrates an exploded view of the embodiment of FIG. 65.
Figure 69:
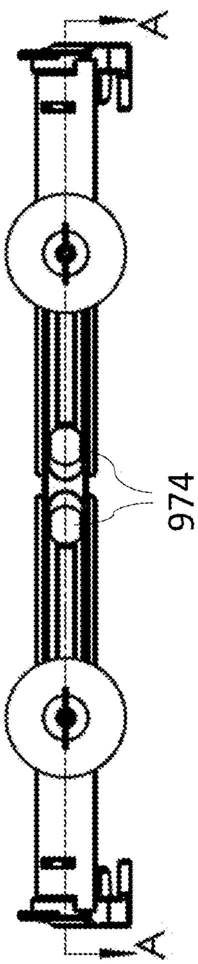
FIG. 69 illustrates a bottom view of the embodiment of FIG. 65.
Figure 70:
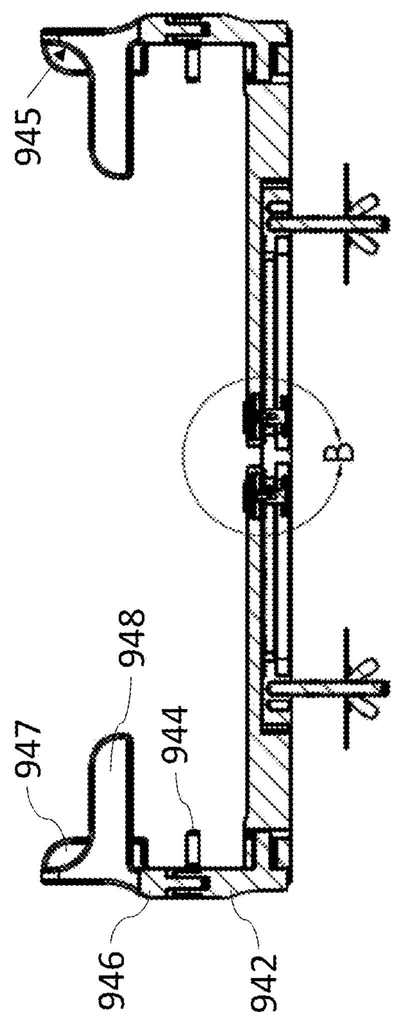
FIG. 70. Illustrates a rear view of the embodiment of FIG. 65.
Figure 71:
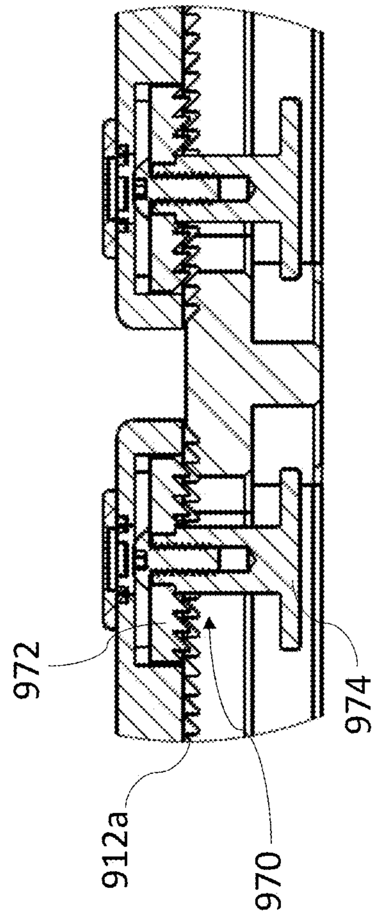
FIG. 71 illustrates a close-up enlarged view of area B of FIG. 70.
Figure 72A:
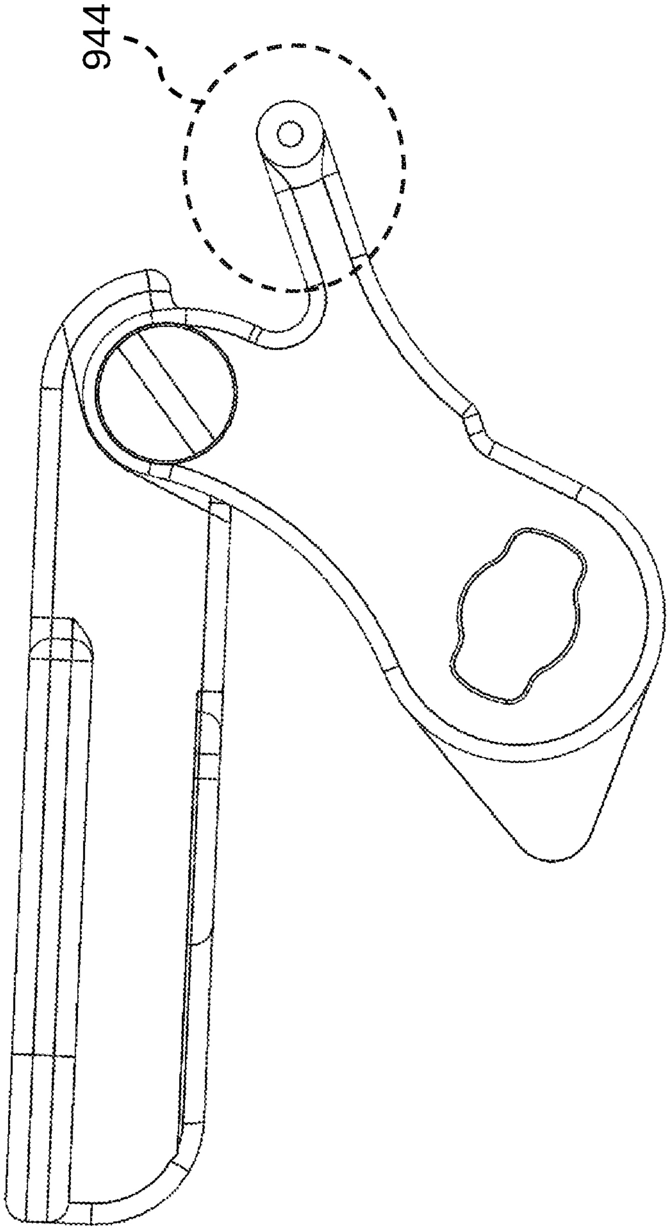
FIG. 72A illustrates a side view of an embodiment of a hinge of the security apparatus of FIG. 65 in a closed position.
Figure 72B:
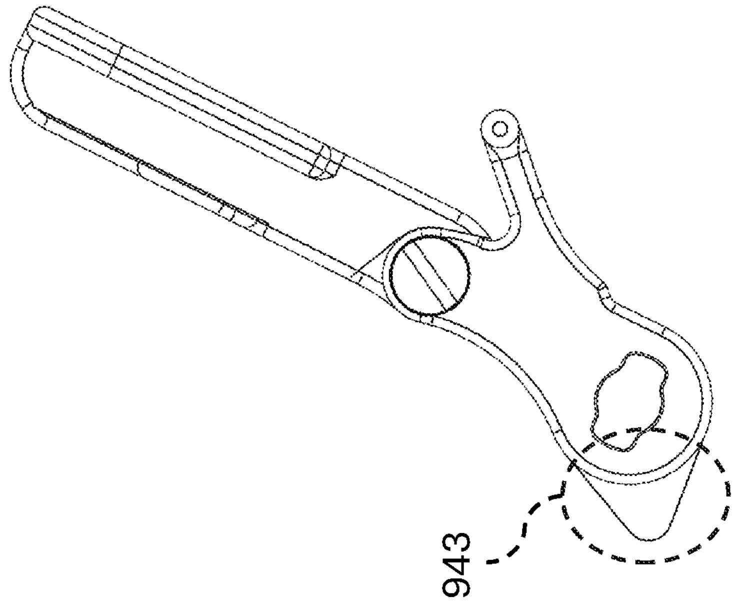
FIG. 72B illustrates a side view of an embodiment of a hinge of the security apparatus of FIG. 65 in an open position.
Figure 72C:
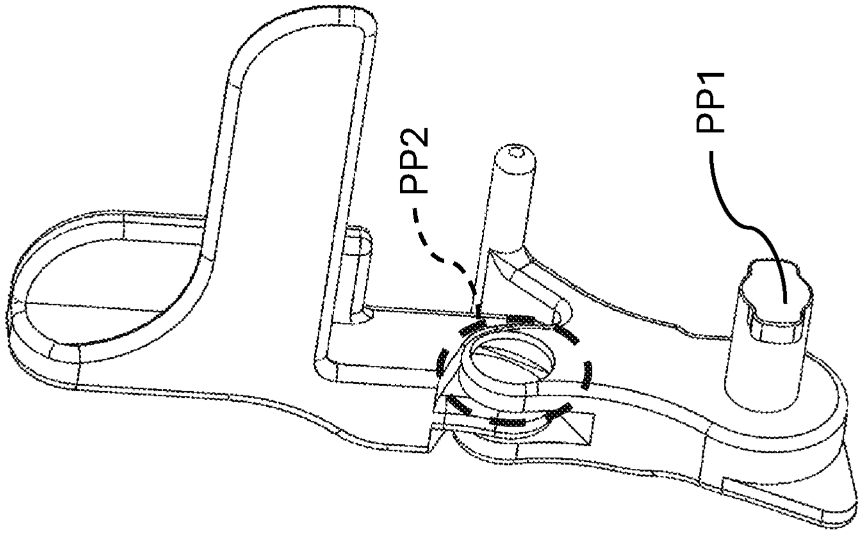
FIG. 72C illustrates a front perspective view of an embodiment of a hinge of the security apparatus of FIG. 65.
Figure 79:
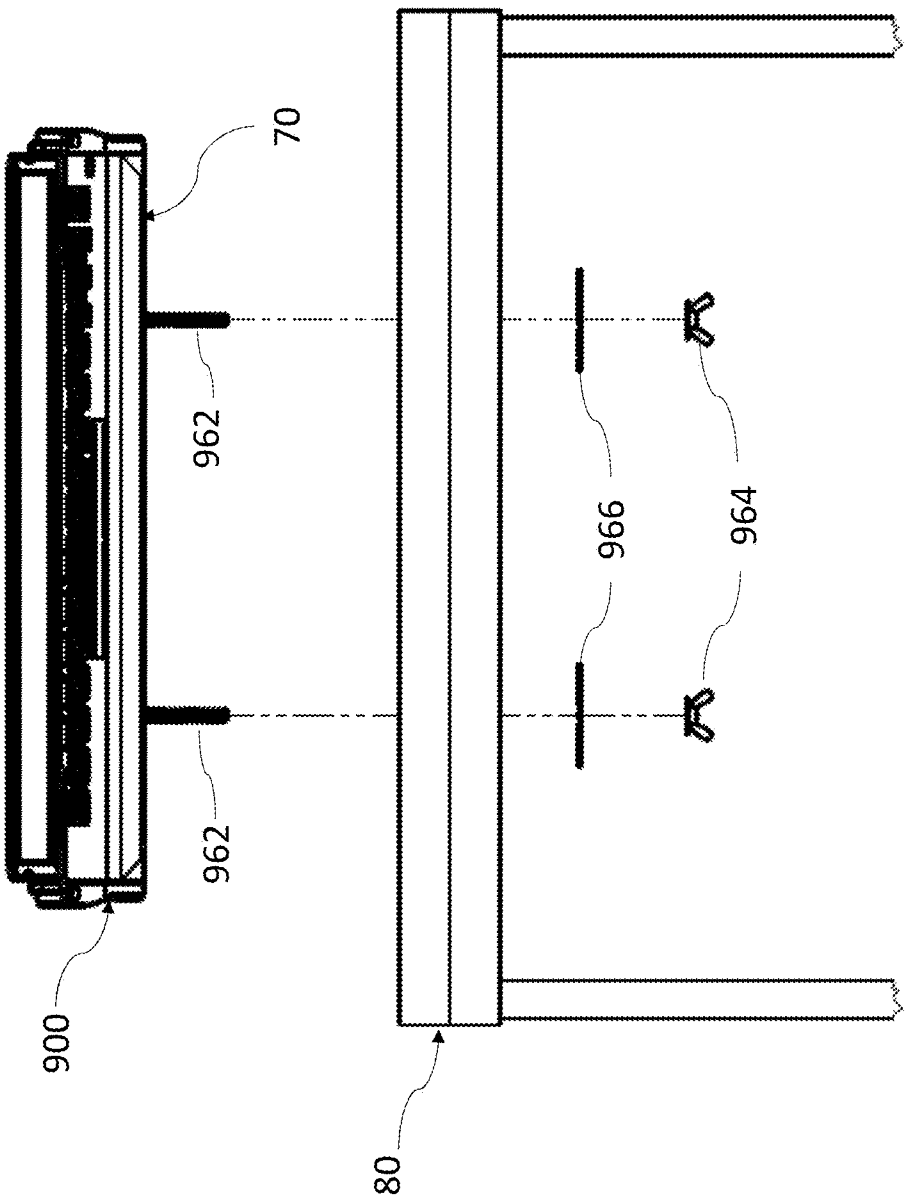
FIG. 79 illustrates a front view of the embodiment of FIG. 76 being coupled to a display surface.
Figure 80:
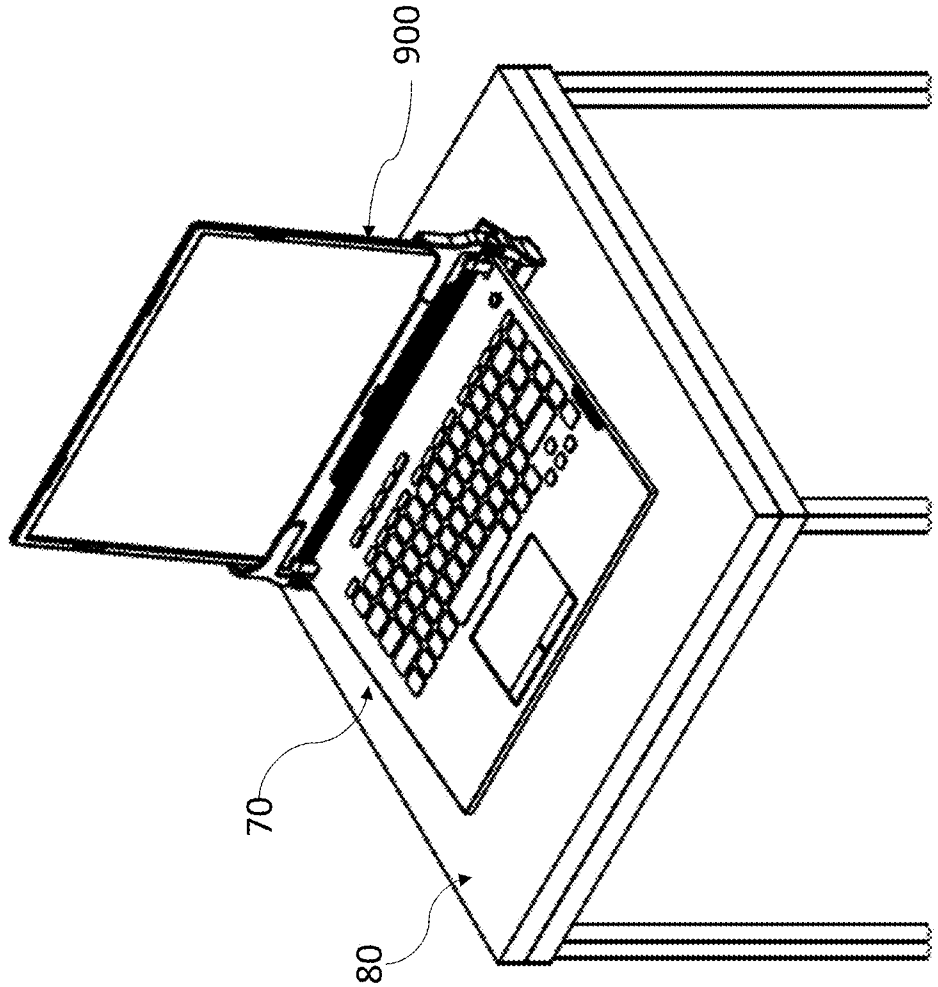
FIG. 80 illustrates the embodiment of 79 coupled to the display surface.

Referring specifically to FIG. 66, the base 910 extends along a base axis B and includes a top base surface 912, a bottom base surface 914 and side base surfaces 913. The top base surface 912 defines a plurality of surface features 912*a,* such as ridges and valleys or teeth. Two elongated openings 915 that traverse the base 910 and extend at least partially along the base axis B. as shown, the surface features 912*a* surround the elongated openings 915. In an embodiment, at least one of the plurality of side base surfaces 913 includes a body engagement element or 916 or guide that engages with and aids in guiding a sliding movement of the body members 920 relative to the base 910. The base 910 further includes one or more fastening members 960 configured to aid in securing the base 910 to a display fixture 80 (FIGS. 79 and 80). The one or more fasteners 960 may include any fasteners suitable to secure the security apparatus 900 to a display fixture. As shown, for example in FIG. 67, the one or more fasteners 960 include a threaded portion 962 and a securing element 964 including a portion that is complementary to the threaded portion 962. In an embodiment, one or more spacers 966 may abut the securing element 964 as shown in FIG. 79.

Each of the body members 920 includes a support or a sliding member 922 that is configured to slidably engage the base 910 and move along the base axis B (see FIG. 66). The sliding member 922 may further include a base engager 924 that is structured to engage the body engagement element 916 of the base 910 to guide a sliding motion of the body member 920 along the base 910. A lock assembly 970 couples the sliding member 922 to the base 910 through the elongated opening 915. The lock assembly 970 further includes a locking plate 972 that is structured to engage the surface features 912*a* of the top base surface 912 to define a locked state and is configured to be disengaged with the surface features 912*a* to define an unlocked state. In the unlocked state, the body members 920 are able to move in a first direction towards each other and a second direction away from each other. In the locked state, the body members 920 are able to move in the first direction but not the second direction.

Referring to FIGS. 67-73, a retainer 940 is pivotally coupled to an end of the body member 920 and is capable of pivoting at a first pivot point PP1 about a first pivot axis PA1 relative to the body member 920. In the embodiment shown in FIGS. 67, 68 and 73, the retainer 940 comprises a first retainer portion 942 and a second retainer portion 946 pivotally coupled to the first retainer portion 942 and structured to pivot at a second pivot point PP2 about a second pivot axis PA2. In an embodiment, the second pivot axis PA2 is parallel to the first pivot axis PA1. As shown specifically in FIG. 72C, the second pivot point PP2 is positioned relative to the first pivot point PP1 to accommodate different hinge points on different portable electronic devices, such as laptop computers. The first retainer portion 942 pivotally couples to an end of the sliding member 922 and includes a foot or support 943 structured to engage a surface such as a display fixture, and a backstop or knob 944. The support 943 is configured to position the backstop 944 to inhibit the keyboard portion 72 (FIGS. 73 and 74) of a gaming laptop 70 (FIGS. 73 and 74) from being slid in a rearward RW direction, thereby freeing the laptop 70 (FIGS. 73 and 74) from the security apparatus 900.

The second retainer portion 946 pivotally couples to the first retainer portion 942 and includes a retainer member 948 that is structured to contact a front or screen side of the display portion 74 of the gaming laptop 70. The second retainer portion 946 further includes a rear lip 947 such that a channel 945 is defined between the rear lip 947 and the retainer member 948.

Figure 73:
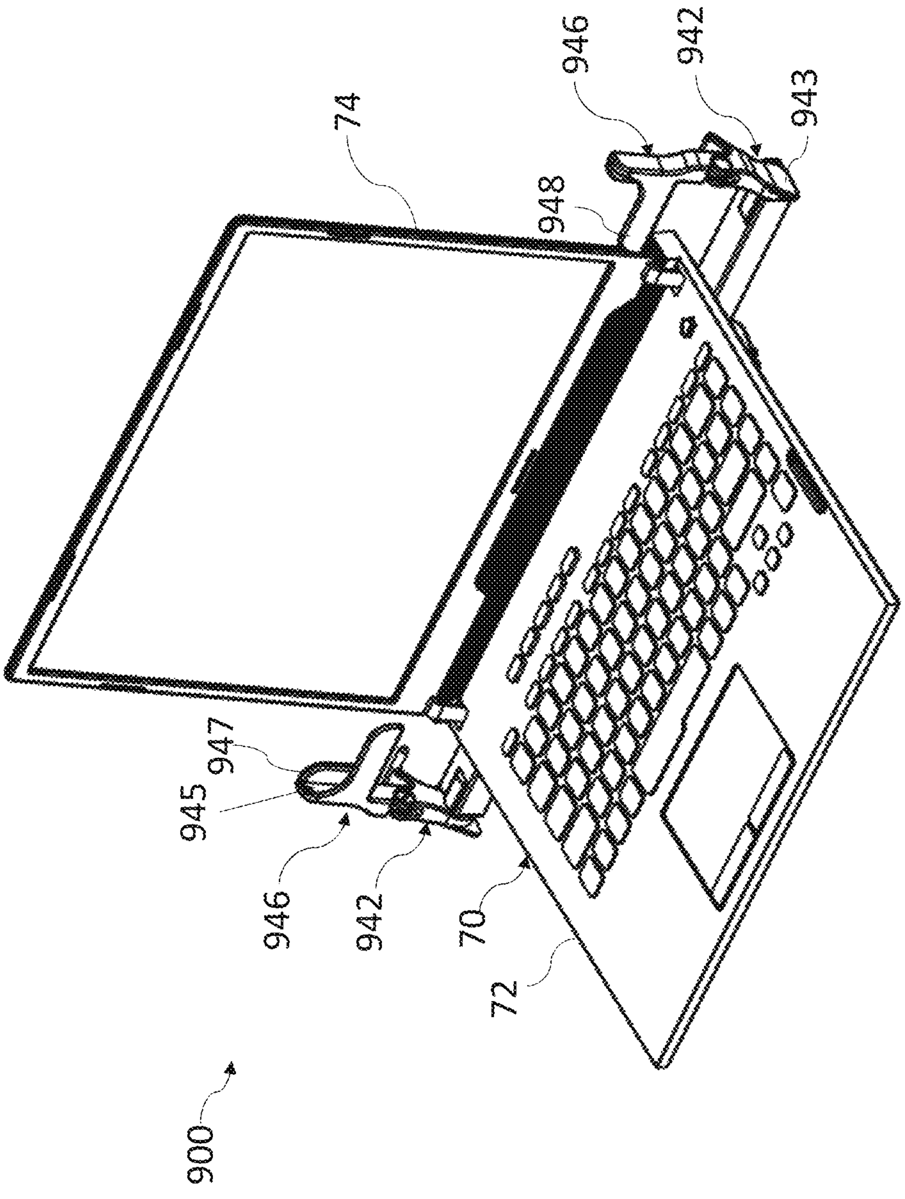
FIG. 73 illustrates the embodiment of FIG. 65 being secured to a portable electronic device.
Figure 74:
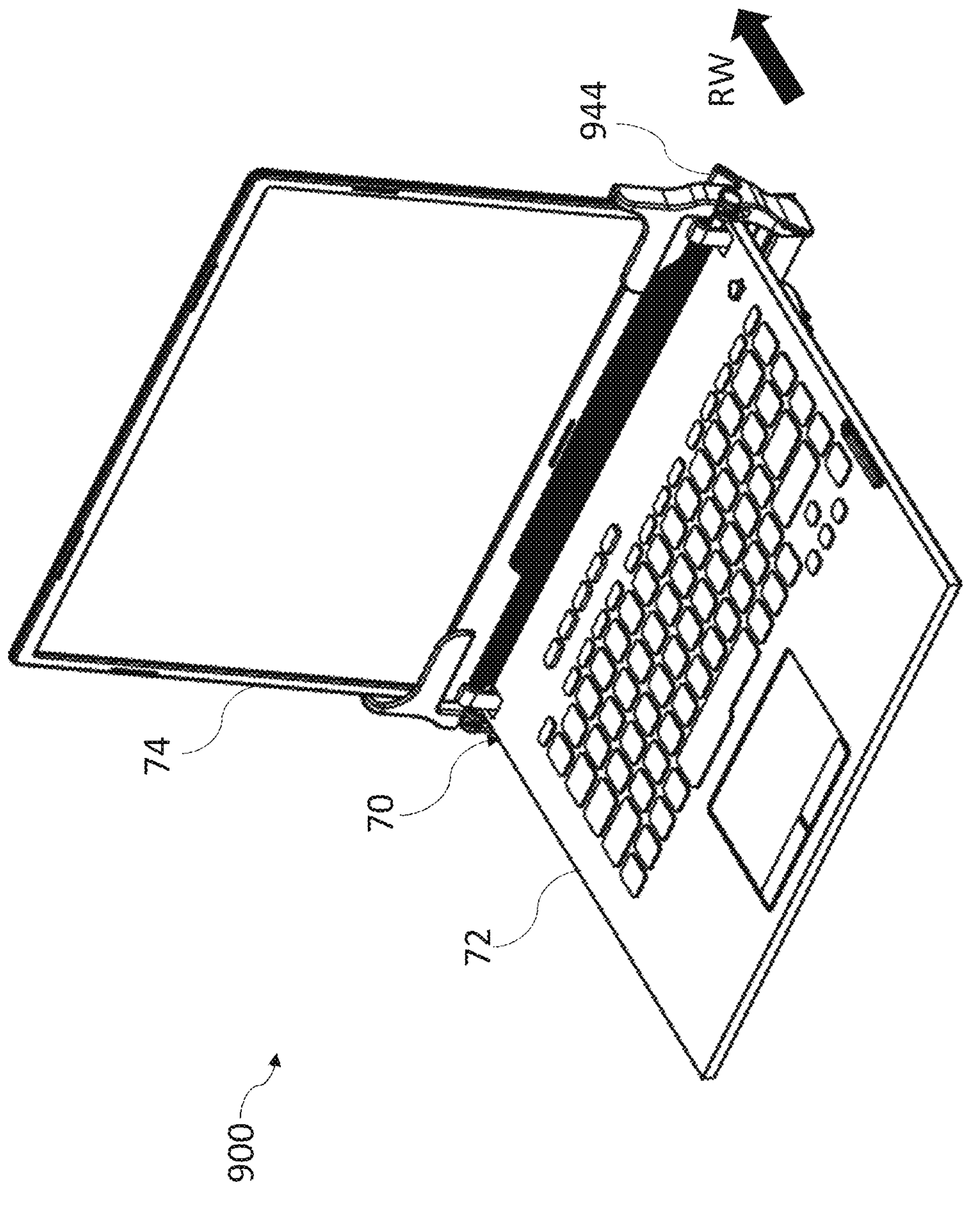
FIG. 74 illustrates the embodiment of FIG. 73 securing a portable electronic device.
Figure 75:
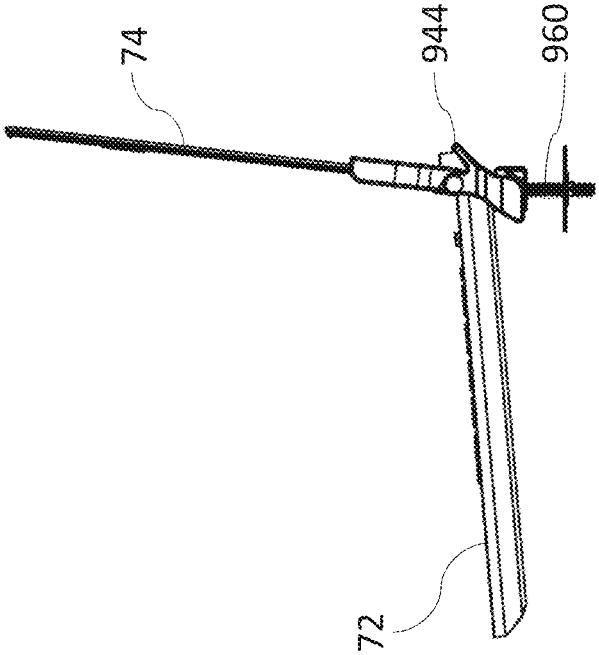
FIG. 75 illustrates a side view of the embodiment of FIG. 74 in an open position.
Figure 76:
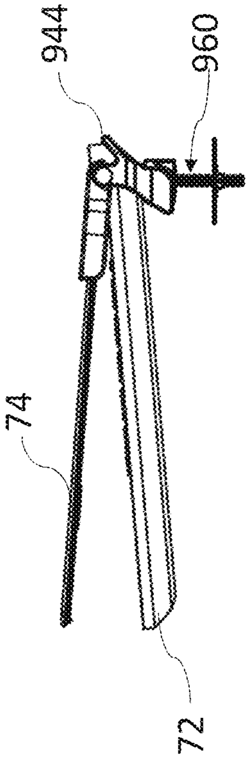
FIG. 76 illustrates a side view of the embodiment of FIG. 74 in a closed position.
Figure 77:
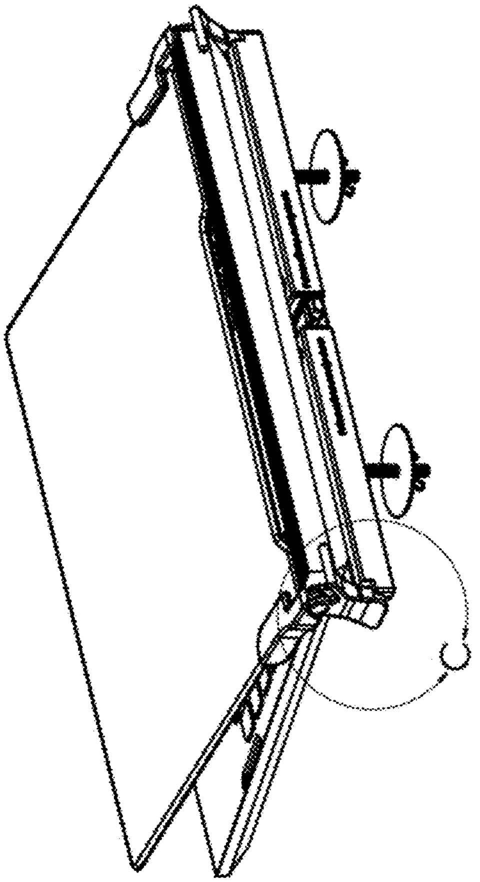
FIG. 77 illustrates a rear perspective view of the embodiment of FIG. 76.
Figure 78:
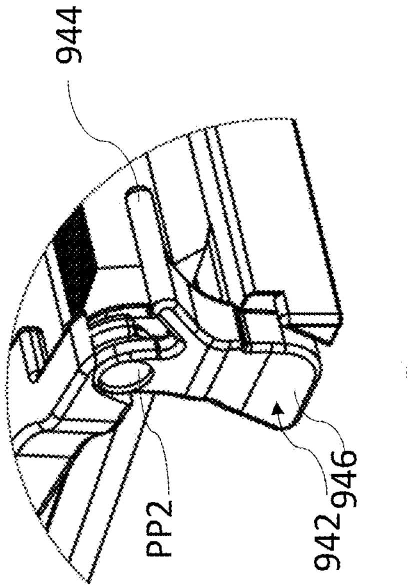
FIG. 78 illustrates a close-up enlarged view of area C of FIG. 77.

In order to install the laptop 70 into the security apparatus 900, the security apparatus 900 is detached from the display fixture 80 and the locking assembly 970 for each securing member 920 is unlocked. In the embodiment shown in FIG. 71, the lock assembly 970 is biased into the locked position and is unlocked by depressing a lock member 974, which is operatively coupled to the lock plate 972 to cause the lock plate to disengage from the surface features 912*a* of the top base surface 912. In the unlocked state, the body members 920 are moved in the second direction to open the security apparatus 900. Once the lock members 974 are released, the security apparatus 900 is in the locked state. The laptop 70 is then positioned as shown in FIG. 73 such that a portion of the keyboard portion 72 rests on the base 910 and/or body members 920. The body members 920 are then moved in the first direction (toward each other) as shown in FIG. 74 such that the retainers 940 trap and secure the laptop 70 within the security apparatus 900. Specifically, the display portion of the laptop 70 is retained in the retainer channel 945 and the keyboard portion is retained by the backstop 944 from each retainer 940. The security apparatus 900 is then secured to the display fixture 80 to enable functional, yet secure display of the laptop 70 in a retail setting. The second pivot point PP2 of the retainers 940 enable the retainers to pivot about the second pivot axis PA2 to enable the laptop 70 to be displayed in an open position as shown in FIGS. 73, 75, and 80, a closed position and any position in between, such as those of FIGS. 76, 77, and 79.

One or more components of the embodiments of security apparatus described above may be comprised of one or more types of metal, such as steel, zinc, or aluminum, or one or more types of plastic, such as PA6 (Nylon 6), ABS (Acrylonitrile butadiene styrene), or POM (Polyoxymethylene). In an embodiment, one or more components of the security apparatus 100 may be comprised of a combination of metallic and plastic components. One or more components of the embodiments of the disclosed security apparatus may be comprised of different sizes, thicknesses and shapes while still keeping with the spirit, function, and intent of each device. Moreover, one or more of the components of the embodiment of the security apparatus described may be formed together as single components.

In some embodiments of the security apparatus, a controller and a plurality of actuators that are operatively coupled to the securing portions. In these embodiments, the controller is programmed to receive instructions from an input interface or remote input device and control the plurality of actuators, an alarm and/or a controller status according to the received instructions. The controller may further be programmed to communicate to a remote input device and/or controllers of other security apparatuses using any known wireless communication protocol While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements, it will be understood that the exemplary embodiments can be practiced utilizing either less than or more than the certain number of elements.

The invention claimed is:

1. A security apparatus for securing a portable electronic device for retail display, comprising:

- a base assembly comprising a first end configured to couple to a display fixture, and a second end; and
- a body configured to pivotally couple to the second end of the base assembly, the body comprising,
  - a first body portion including,
    - two retainers, each retainer comprising a first retainer portion and a second retainer portion, wherein the first retainer portion comprises a first securing member pivotally coupled to the retainer and the second retainer portion comprises a second securing member pivotally coupled to the retainer, and
    - a first body support configured to slidably couple to the first retainer portions of the two retainers,
  - a second body portion including first and second body portion elements each comprising a mating portion and a retaining portion, wherein the mating portion is configured to slidably mate with the second retainer portion, wherein when the first securing member is pivoted to an unlocked position, the two retainers are enabled to move away from each other and towards each other in order to adjust a width dimension of the body, wherein when the second securing member is pivoted to an unlocked position, the retainer of the first body portion and the retaining portion of the second body portion are enabled to move away from each other and towards each other in order to adjust a height dimension of the body, wherein when the first securing member is pivoted to a locked position, the first body support is inhibited from being removed from the first retainer portion and the two retainers are inhibited from being moved away from each other, and wherein when the second securing member is pivoted to a locked position, the mating portion of the second body portion is inhibited from being removed from the second retainer portion and the retainer of the first body portion and the retaining portion of the second body portion are inhibited from being moved away from each other.

2. The security apparatus of claim 1, wherein the second body portion further comprises a second body support extending between opposing body support ends, wherein at least one body support end is coupled to a portion of the second body portion positioned between the retaining portion and the mating portion.

3. The security apparatus of claim 1, wherein the first securing member is configured to pivot about a first pivot axis and the second securing member is configured to pivot about a second pivot axis.

4. The security apparatus of claim 3, wherein the first pivot axis intersects the second pivot axis.

5. The security apparatus of claim 1, further comprising one or more retaining elements configured to retain a portion of the portable electronic device when at least one of the first securing member and the second securing member are in the locked position.

6. The security apparatus of claim 1, wherein the first body support includes at least one guide configured to interact with at least one guide element positioned on the first body portion to guide a sliding movement of the first body support relative to the first body portion.

7. The security apparatus of claim 1, wherein the second body portion further includes a support element and a clamp element configured to cooperate with the support element to retain an accessory of a portable electronic device.

8. A security apparatus for securing a portable electronic device for retail display, comprising:

a base assembly configured to couple to a display fixture; and a body configured to pivotally couple to the base assembly, the body comprising, a first body portion including, two retainers, each retainer comprising a first securing member pivotally coupled to the retainer and a second securing member pivotally coupled to the retainer, and a first body support configured to slidably couple to at least one of the two retainers, and a second body portion including first and second body portion elements that each comprise a mating portion and a retaining portion, wherein each mating portion is configured to slidably mate with one of the two retainers, wherein when the first securing member is pivoted to an unlocked position, a width dimension of the body is enabled to be increased and decreased, wherein when the second securing member is pivoted to an unlocked position, a height dimension of the body is enabled to be increased and decreased, wherein when the first securing member is pivoted to a locked position, the width dimension of the body is inhibited from being increased, and wherein when the second securing member is pivoted to a locked position, the height dimension of the body is inhibited from being increased.

9. The security apparatus of claim 8, wherein the first securing member is configured to pivot about a first pivot axis and the second securing member is configured to pivot about a second pivot axis.

10. The security apparatus of claim 9, wherein the first pivot axis intersects the second pivot 10. axis.

11. The security apparatus of claim 8, wherein when the first securing member is pivoted to a locked position, the first body support is inhibited from being removed from at least one of the two retainers.

12. The security apparatus of claim 8, wherein when the second securing member is pivoted to a locked position, the mating portion of the second body portion is inhibited from being removed from the first body portion.

13. The security apparatus of claim 8, wherein the first body support includes at least one guide configured to interact with at least one guide element of the retainer to guide a sliding movement of the first body support relative to the first body portion.

14. The security apparatus of claim 8, wherein the second body portion further includes at least one accessory securing element configured to secure a portion of an accessory of a portable electronic device.

15. The security apparatus of claim 8, further comprising one or more retaining elements configured to retain a portion of a portable electronic device when at least one of the first securing member and the second securing member are in the locked position.

* * * * *